(12) United States Patent
Fridman et al.

(10) Patent No.: US 12,112,736 B2
(45) Date of Patent: Oct. 8, 2024

(54) APPARATUS, SYSTEM, AND METHOD OF NEURAL-NETWORK (NN) BASED ACTIVE ACOUSTIC CONTROL (AAC)

(71) Applicant: SILENTIUM LTD., Nes Ziona (IL)

(72) Inventors: Tzvi Fridman, Nes Tziona (IL); Yochai Edlitz, Yavne (IL); Noam Bar, Givatayim (IL); Mordehay Elbaz, Tel Aviv (IL)

(73) Assignee: SILENTIUM LTD., Nes Ziona (IL)

( * ) Notice: Subject to any disclaimer, the term of this patent is extended or adjusted under 35 U.S.C. 154(b) by 0 days.

(21) Appl. No.: 18/215,055

(22) Filed: Jun. 27, 2023

(65) Prior Publication Data

US 2024/0161725 A1 May 16, 2024

Related U.S. Application Data

(60) Provisional application No. 63/356,395, filed on Jun. 28, 2022.

(51) Int. Cl.
*G10K 11/178* (2006.01)

(52) U.S. Cl.
CPC .. *G10K 11/17823* (2018.01); *G10K 11/17825* (2018.01); *G10K 11/17881* (2018.01);
(Continued)

(58) Field of Classification Search
CPC ............ G10K 2210/12; G10K 11/178; G10K 11/17857; G10K 11/17854
See application file for complete search history.

(56) References Cited

U.S. PATENT DOCUMENTS

| 5,129,003 A | 7/1992 | Saruta |
| 5,245,664 A | 9/1993 | Kinoshite et al. |

(Continued)

FOREIGN PATENT DOCUMENTS

| CN | 107424596 | 12/2017 |
| CN | 207068465 U | 3/2018 |

(Continued)

OTHER PUBLICATIONS

International Search Report and the Written Opinion for International Application No. PCT/IB2023/056647, mailed on Nov. 15, 2023, 34 pages.

(Continued)

*Primary Examiner* — Kile O Blair
(74) *Attorney, Agent, or Firm* — Shichrur & Co.

(57) ABSTRACT

For example, a controller of an Active Acoustic Control (AAC) system may be configured to process input information including AAC configuration information, and a plurality of noise inputs representing acoustic noise at a plurality of noise sensing locations. For example, the controller may be configured to process the input information to determine a sound control pattern to control sound within a sound control zone based on the plurality of noise inputs. For example, the controller may include a Neural-Network (NN) trained to generate an NN output based on an NN input, wherein the NN input is based on the AAC configuration information. For example, the controller may be configured to generate the sound control pattern based on the NN output, and to output the sound control pattern to one or more acoustic transducers.

22 Claims, 21 Drawing Sheets

(52) U.S. Cl.
CPC .............. *G10K 2210/12821* (2013.01); *G10K 2210/3026* (2013.01); *G10K 2210/3027* (2013.01); *G10K 2210/3038* (2013.01); *G10K 2210/3046* (2013.01); *G10K 2210/3055* (2013.01); *G10K 2210/506* (2013.01)

(56) References Cited

U.S. PATENT DOCUMENTS

| | | | |
|---|---|---|---|
| 5,416,844 | A | 5/1995 | Nakaji et al. |
| 9,431,001 | B2 | 8/2016 | Cherkassky et al. |
| 11,034,211 | B2 | 6/2021 | Fridman et al. |
| 11,328,702 | B1 | 5/2022 | Xiao et al. |
| 11,604,091 | B1 * | 3/2023 | Kim .................. G10K 15/00 |
| 2005/0075865 | A1 * | 4/2005 | Rapoport ............. G10L 15/02 704/207 |
| 2006/0269078 | A1 | 11/2006 | Sakamoto et al. |
| 2010/0080399 | A1 | 4/2010 | Pfau et al. |
| 2010/0082201 | A1 | 4/2010 | Pfau et al. |
| 2012/0257763 | A1 | 10/2012 | Bowden et al. |
| 2012/0288110 | A1 | 11/2012 | Cherkassky et al. |
| 2013/0204617 | A1 * | 8/2013 | Kuo ................. G10K 11/17885 704/233 |
| 2015/0193195 | A1 | 7/2015 | Lin et al. |
| 2015/0224848 | A1 | 8/2015 | Eisenhour |
| 2015/0300684 | A1 | 10/2015 | Mehta et al. |
| 2016/0086592 | A1 | 3/2016 | Saxman et al. |
| 2016/0111078 | A1 | 4/2016 | Barath et al. |
| 2016/0163303 | A1 | 6/2016 | Benattar et al. |
| 2017/0032806 | A1 | 2/2017 | Konjeti et al. |
| 2017/0213541 | A1 | 7/2017 | MacNeille et al. |
| 2017/0323639 | A1 | 11/2017 | Tzirkel-Hancock et al. |
| 2018/0012589 | A1 | 1/2018 | MacNeille et al. |
| 2018/0070191 | A1 | 3/2018 | Chang |
| 2018/0190258 | A1 | 7/2018 | Mohammad et al. |
| 2018/0206055 | A1 | 7/2018 | Di Censo et al. |
| 2019/0189103 | A1 | 6/2019 | Biermeier |
| 2019/0232867 | A1 | 8/2019 | Bednar et al. |
| 2020/0074975 | A1 | 3/2020 | Torres |
| 2020/0193956 | A1 | 6/2020 | Kim et al. |
| 2020/0218501 | A1 | 7/2020 | Fridman et al. |
| 2021/0014600 | A1 | 1/2021 | Neumaier et al. |
| 2021/0221196 | A1 | 7/2021 | Fridman et al. |
| 2022/0324290 | A1 | 10/2022 | Fridman et al. |
| 2024/0177703 | A1 | 5/2024 | Fridman et al. |

FOREIGN PATENT DOCUMENTS

| | | | |
|---|---|---|---|
| CN | 111091805 | | 5/2020 |
| CN | 111968613 | | 11/2020 |
| EP | 1 577 879 | | 9/2005 |
| JP | 2010156826 | | 7/2010 |
| KR | 20190047976 A | | 5/2019 |
| WO | WO-2007028922 A1 * | 3/2007 | .......... G10K 11/178 |
| WO | 2008090544 | | 7/2008 |
| WO | 2019124772 | | 6/2019 |
| WO | 2021250237 | | 12/2021 |

OTHER PUBLICATIONS

Search Report for European Patent Application No. 20881145.5, mailed on Nov. 15, 2023, 12 pages.
International Preliminary Report on Patentability for International Application No. PCT/IB2022/056026, mailed on Jan. 11, 2024, 8 pages.
International Search Report and the Written Opinion for International Application No. PCT/IB2020/060034, mailed on Feb. 25, 2021, 11 pages.
Notice of Allowance for U.S. Appl. No. 17/080,047, mailed on Feb. 9, 2021, 14 pages.
Corrected Notice of Allowability for U.S. Appl. No. 17/080,047, mailed on Mar. 26, 2021, 8 pages.
International Preliminary Report on Patentability for International Application No. PCT/IB2020/060034, mailed on May 12, 2022, 7 pages.
Office Action for U.S. Appl. No. 17/852,104, mailed on Jan. 19, 2023, 30 pages.
Kuo et al.; "Active noise control: a tutorial review", Jul. 1999, Proceedings of the IEEE, vol. 87, No. 6, pp. 943-973.
International Search Report and the Written Opinion for International Application No. PCT/IB2022/056026, mailed on Oct. 20, 2022, 18 pages.
Hyundai Motor Company Showcases Next-Generation Separated Sound Zone Technology. (Retrieved on Oct. 6, 2022). Retrieved from the Internet: < https://www.hyundai.com/worldwide/en/company/newsroom/hyundai-motor-company-showcases-next-generationseparated-sound-zone-technology-0000016024> Hyundai Motor Company, Aug. 13, 2018 (Aug. 13, 2018), 2 pages.
Office Action for U.S. Appl. No. 17/852,104, mailed on May 22, 2023, 33 pages.
Advisory Action for U.S. Appl. No. 17/852,104, mailed on Aug. 21, 2023, 4 pages.
Notice of Allowance for U.S. Appl. No. 17/852,104, mailed on Sep. 5, 2023, 10 pages.
Office Action for U.S. Appl. No. 17/225,891, mailed on Sep. 18, 2023, 52 pages.
Office Action for U.S. Appl. No. 17/225,891, mailed on Jan. 31, 2024, 18 pages.
Notice of Allowance for U.S. Appl. No. 17/225,891, mailed on Apr. 12, 2024, 15 pages.
Notice of Allowance for U.S. Appl. No. 17/225,891, mailed on Apr. 24, 2024, 6 pages.

* cited by examiner

1320

APPARATUS, SYSTEM, AND METHOD OF NEURAL-NETWORK (NN) BASED ACTIVE ACOUSTIC CONTROL (AAC)

CROSS-REFERENCE

This application claims the benefit of and priority from U.S. Provisional Patent Application No. 63/356,395 entitled "APPARATUS, SYSTEM, AND METHOD OF NEURAL-NETWORK (NN) BASED ACTIVE ACOUSTIC CONTROL (AAC)", filed Jun. 28, 2022, the entire disclosure of which is incorporated herein by reference.

TECHNICAL FIELD

Aspects described herein generally relate to Neural-Network (NN) based Active Acoustic Control (AAC).

BACKGROUND

Active Noise Control (ANC) is a technology using digitally generated noise to reduce unwanted noise. It is based on the principle of superposition of sound waves. Generally, sound is a wave, which is traveling in space. If another, second sound wave having the same amplitude but opposite phase to the first sound wave can be created, the first wave can be totally cancelled.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
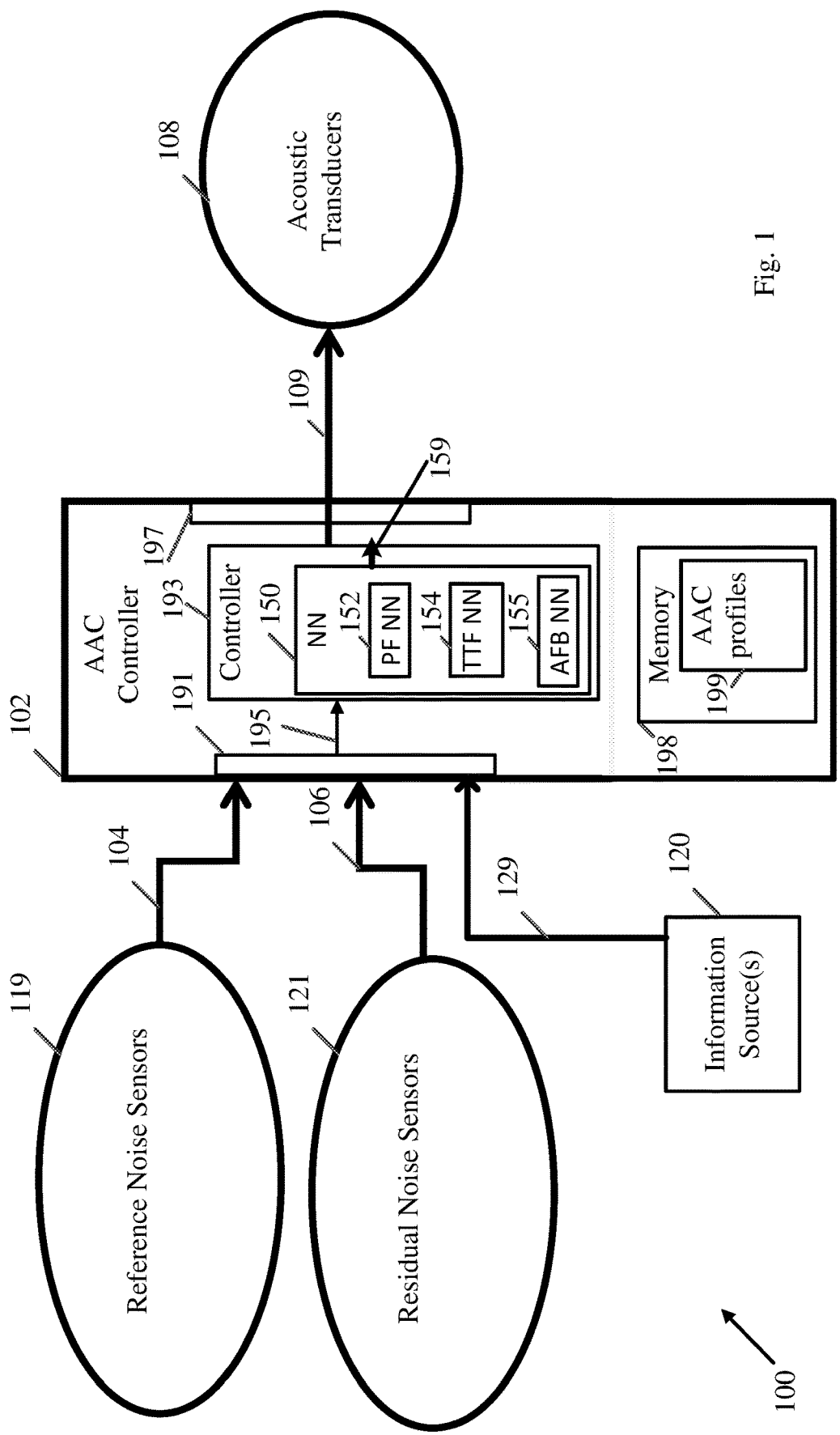
FIG. 1 is a schematic block diagram illustration of an Active Acoustic Control (AAC) system, in accordance with some demonstrative aspects.

In the following detailed description, numerous specific details are set forth to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., processor circuitry, control circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Some demonstrative aspects include apparatuses, systems and methods, which may be efficiently implemented for controlling noise, for example, reducing or eliminating undesirable noise, for example, noise in one or more frequency ranges, e.g., generally low, mid and/or high frequencies, as described below.

Some demonstrative aspects may include apparatuses, methods and/or systems of Active Acoustic Control (AAC) configured to control acoustic energy and/or wave amplitude at one or more locations, e.g., as described below.

In some demonstrative aspects, an AAC system may be configured to control acoustic energy and/or a wave amplitude of one or more acoustic patterns produced by one or more acoustic sources, which may include known and/or unknown acoustic sources, e.g., as described below.

In some demonstrative aspects, an AAC system may be configured as, and/or may perform one or more functionalities of, an Active Noise Control (ANC) system, and/or an Active Sound Control (ASC) system, which may be configured to control, reshape, reduce and/or eliminate the noise energy and/or wave amplitude of one or more acoustic patterns ("primary patterns") produced by one or more noise sources, which may include known and/or unknown noise sources, e.g., as described below.

In some demonstrative aspects, an AAC system may be configured to produce an acoustic control pattern (also referred to as "sound control pattern" or "secondary pattern"), e.g., including a destructive noise pattern and/or any other sound control pattern, e.g., as described below.

In some demonstrative aspects, the AAC system may be configured to generate the acoustic control pattern, for example, based on one or more of the primary patterns, for example, such that a controlled sound zone, for example, a reduced noise zone, e.g., a quiet zone, may be created by a combination of the secondary and primary patterns, e.g., as described below.

In some demonstrative aspects, the AAC system may be configured to control, reduce, reshape, and/or eliminate acoustic energy and/or noise within a predefined location, area or zone (also referred to as "the sound control zone, "the acoustic control zone", "the noise-control zone", the "quiet zone", and/or the "Quiet Bubble™"), e.g., as described below.

In some demonstrative aspects, the AAC system may be configured to control, reduce, reshape, and/or eliminate acoustic energy and/or noise within a sound control zone, for example, even without, for example, regardless of, and/or without using, a-priori information regarding the primary patterns and/or the one or more noise sources, e.g., as described below.

For example, the AAC system may be configured to control, reduce, reshape, and/or eliminate acoustic energy and/or noise within the acoustic control zone (sound control zone), e.g., independent of, regardless of and/or without knowing in advance one or more attributes of one or more of the noise sources and/or one or more of the primary patterns, for example, the number, type, location and/or other attributes of one or more of the primary patterns and/or one or more of the noise sources, e.g., as described below.

Some demonstrative aspects are described herein with respect to AAC systems and/or methods configured to reshape, reduce and/or eliminate the noise energy and/or wave amplitude of one or more acoustic patterns within a quiet zone, e.g., as described below.

However, in other aspects, the AAC and/or sound control systems and/or methods may be configured to control in any other manner any other acoustic energy and/or wave amplitude of one or more acoustic patterns within an acoustic control zone (sound control zone), for example, to affect, alter and/or modify the sound energy and/or wave amplitude of one or more acoustic patterns within a predefined zone, e.g., as described below.

In one example, the AAC systems and/or methods may be configured to selectively reshape, reduce and/or eliminate the acoustic energy and/or wave amplitude of one or more types of acoustic patterns within the acoustic control zone (sound control zone) and/or to selectively increase and/or amplify the acoustic energy and/or wave amplitude of one or more other types of acoustic patterns within the acoustic control zone; and/or to selectively maintain and/or preserve the acoustic energy and/or wave amplitude of one or more other types of acoustic patterns within the acoustic control zone, e.g., as described below.

In some demonstrative aspects, an AAC system may be configured as, and/or may perform or more functionalities of, a sound control system, for example, a personal sound control system (also referred to as a "Personal Sound Bubble (PSB)™ system"), which may be configured to produce a sound control pattern, which may be based on at least one audio input, for example, such that at least one personal sound zone, may be created based on the audio input, e.g., as described below.

In some demonstrative aspects, the AAC system may be configured to control sound within at least one predefined location, area or zone, e.g., at least one PSB™, for example, based on audio to be heard by a user. In one example, the PSB™ may be configured to include an area around a head and/or ears of the user, e.g., as described below.

In some demonstrative aspects, the AAC system may be configured to control a sound contrast between one or more first sound patterns and one or more second sound patterns in the PSB™, e.g., as described below.

In some demonstrative aspects, for example, the AAC system may be configured to control a sound contrast between one or more first sound patterns of audio to be heard by the user, and one or more second sound patterns, e.g., as described below.

In some demonstrative aspects, for example, the AAC system may be configured to selectively increase and/or amplify the sound energy and/or wave amplitude of one or more types of acoustic patterns within the PSB™, e.g., based on the audio to be heard in the PSB™; to selectively reshape, reduce and/or eliminate the sound energy and/or wave amplitude of one or more types of acoustic patterns within the PSB™, e.g., based on acoustic signals which are to be reduced and/eliminated; and/or to selectively and/or to selectively maintain and/or preserve the sound energy and/or wave amplitude of one or more other types of acoustic patterns within the PSB™, e.g., as described below.

In some demonstrative aspects, the AAC system may be configured to control the sound within the PSB™ based on any other additional or alternative input or criterion.

In some demonstrative aspects, the AAC system may be configured to control, reshape, reduce, and/or eliminate the acoustic energy and/or wave amplitude of one or more of the primary patterns within the sound control zone.

In some demonstrative aspects, the AAC system may be configured to control, reshape, reduce, and/or eliminate noise within the sound control zone in a selective and/or configurable manner, e.g., based on one or more predefined noise pattern attributes, such that, for example, the noise energy, wave amplitude, phase, frequency, direction and/or statistical properties of one or more first primary patterns may be affected by the secondary pattern, while the secondary pattern may have a reduced effect or even no effect on the noise energy, wave amplitude, phase, frequency, direction and/or statistical properties of one or more second primary patterns, e.g., as described below.

In some demonstrative aspects, the AAC system may be configured to control, reshape, reduce and/or eliminate the acoustic energy and/or wave amplitude of the primary patterns, for example, on a predefined envelope or enclosure surrounding and/or enclosing the acoustic control zone (sound control zone) and/or at one or more predefined locations within the acoustic control zone (sound control zone).

In one example, the acoustic control zone (sound control zone) may include a two-dimensional zone, e.g., defining an area in which the acoustic energy and/or wave amplitude of one or more of the primary patterns is to be controlled, reshaped, reduced and/or eliminated.

According to this example, the AAC system may be configured to control, reshape, reduce and/or eliminate the acoustic energy and/or wave amplitude of the primary patterns along a perimeter surrounding the acoustic control zone (sound control zone) and/or at one or more predefined locations within the acoustic control zone (sound control zone).

In one example, the acoustic control zone (sound control zone) may include a three-dimensional zone, e.g., defining a volume in which the acoustic energy and/or wave amplitude of one or more of the primary patterns is to be controlled, reshaped, reduced and/or eliminated. According to this example, the AAC system may be configured to control, reshape, reduce and/or eliminate the acoustic energy and/or wave amplitude of the primary patterns on a surface enclosing the three-dimensional volume.

In one example, the acoustic control zone (sound control zone) may include a spherical volume and the AAC system may be configured to control, reshape, reduce and/or eliminate the acoustic energy and/or wave amplitude of the primary patterns on a surface of the spherical volume.

In another example, the acoustic control zone (sound control zone) may include a cubical volume and the AAC system may be configured to control, reshape, reduce and/or eliminate the acoustic energy and/or wave amplitude of the primary patterns on a surface of the cubical volume.

In other aspects, the acoustic control zone (sound control zone) may include any other suitable volume, which may be defined, for example, based on one or more attributes of a location at which the acoustic control zone is to be maintained.

Reference is now made to FIG. 1, which schematically illustrates an AAC system 100, in accordance with some demonstrative aspects.

Figure 2:
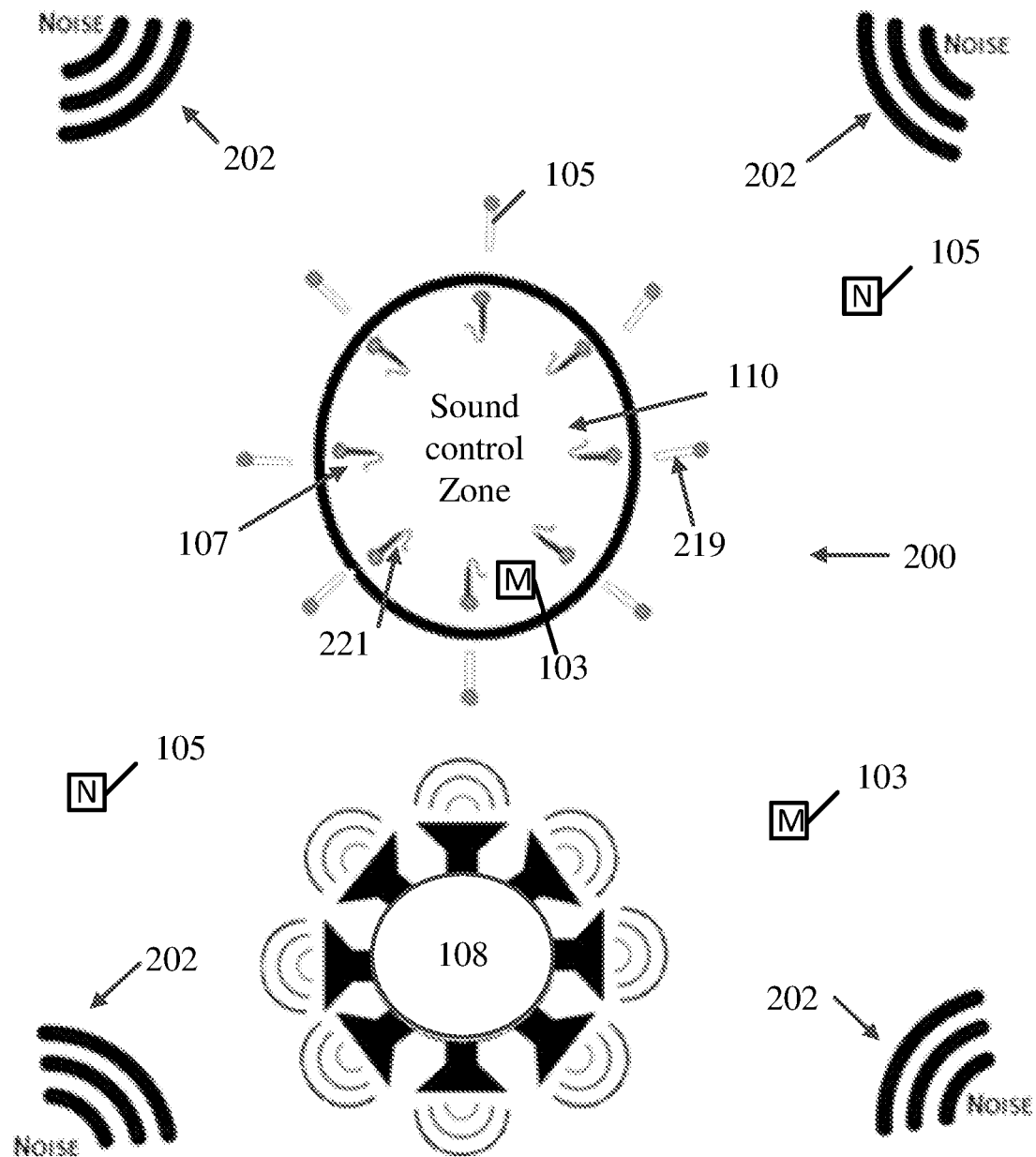
FIG. 2 is a schematic illustration of a deployment scheme of components of the AAC system of FIG. 1, in accordance with some demonstrative aspects.

Reference is also made to FIG. 2, which schematically illustrates a deployment scheme 200 of components of an AAC system, in accordance with some demonstrative aspects. For example, deployment scheme 200 may include a deployment of one or more elements, e.g., some or all elements, of the AAC system 100 of FIG. 1.

In some demonstrative aspects, AAC system 100 may include, operate as, and/or perform functionalities of, an AAC system, an Active Noise Cancelation (ANC) system, an acoustic control system, a sound control system, a PSB™ system, and/or a Quiet Bubble™ system, e.g., as described below.

In some demonstrative aspects, AAC system 100 may include a controller 102 (also referred to as "AAC controller") to control sound within at least one AAC zone (also referred to as "sound-control zone" or "acoustic control zone") 110, e.g., as described in detail below.

In some demonstrative aspects, controller 102 may include, or may be implemented, partially or entirely, by circuitry and/or logic, e.g., one or more processors including circuitry and/or logic, and/or memory circuitry and/or logic. Additionally or alternatively, one or more functionalities of controller 102 may be implemented by logic, which may be executed by a machine and/or one or more processors, e.g., as described below.

In one example, controller 102 may include at least one memory 198, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, at least part of the functionality of controller 102 may be implemented by an integrated circuit, for example, a chip, e.g., a System on Chip (SoC).

In other aspects, controller 102 may be implemented by any other logic and/or circuitry, and/or according to any other architecture.

In some demonstrative aspects, the AAC zone 110 may include an enclosed space, e.g., as described below.

In some demonstrative aspects, the enclosed space may include part of, or an entirety of, a cabin of a vehicle, for example, a car, a bus, and/or a truck, e.g., as described below.

In some demonstrative aspects, the AAC zone 110 may include part of a space in cabin of a vehicle.

In one example, the AAC zone 110 may include a space defined with respect to a person in the vehicle.

In one example, the AAC zone 110 may include a space defined with respect to a seat in the vehicle.

For example, an AAC zone 110 may be defined to include a space around a driver seat of a vehicle, a space around a headrest of the driver seat of the vehicle, and/or a space around a head and/or an ear of a driver of the vehicle.

For example, another AAC zone 110 may be defined to include a space around another seat, e.g., a passenger seat or a backseat, of a vehicle, and/or a space around a headrest of the other seat of the vehicle, and/or a space around a head and/or an ear of a passenger of the vehicle.

In other aspects, the AAC zone 110 may include substantially an entire space of a cabin of a vehicle.

In some demonstrative aspects, the enclosed space may include any other cabin, e.g., a cabin of an airplane, a cabin of a train, a cabin of a medical system, an area of a room, and the like.

In other aspects, the enclosed space may include any other enclosed part or area of a space, e.g., vehicular or non-vehicular.

In some demonstrative aspects, sound-control zone 110 may be located inside a vehicle, and AAC system 100 may be deployed as part of the vehicle. In other aspects, sound-control zone 110 may be located at any non-vehicular area or location.

In some demonstrative aspects, sound control zone 110 may include a three-dimensional (3D) zone. For example, sound control zone 110 may include a spherical zone.

In another example, sound control zone 110 may include any other 3D zone.

In some demonstrative aspects, AAC system 100 may be configured to control sound and/or noise within zone 110, for example, to provide an improved driving experience for a driver and/or one or more passengers of the vehicle, for example, by controlling sound and/or noise within zone 110 in a way which provide an improved music and/or sound experience within the vehicle, an improved quality of phone conversations, and/or the like.

In some demonstrative aspects, AAC controller 102 may include, or may be implemented with, an input 191, which may be configured to receive input information 195, e.g., as described below.

In some demonstrative aspects, AAC controller 102 may include a controller 193 configured to determine the sound control pattern to control sound within the at least one sound control zone 110, e.g., in the vehicle, for example, based on the input information 195, e.g., as described below.

In some demonstrative aspects, controller 193 may include, or may be implemented, partially or entirely, by circuitry and/or logic, e.g., one or more processors including circuitry and/or logic, and/or memory circuitry and/or logic. Additionally or alternatively, one or more functionalities of controller 193 may be implemented by logic, which may be executed by a machine and/or one or more processors, e.g., as described below.

In some demonstrative aspects, the input information 195 may include a plurality of noise inputs 104, e.g., from one or more acoustic sensors (also referred to as "primary sensors", "noise sensors" or "reference sensors") 119, representing acoustic noise at a plurality of predefined noise sensing locations 105, e.g., as described below.

In some demonstrative aspects, AAC controller 102 may receive noise inputs 104 from one or more acoustic sensors 119, which may include one or more physical sensors, e.g., microphones, accelerometers, tachometers and the like, located at one or more of locations 105, denoted "N", and/or one or more virtual sensors configured to estimate the acoustic noise at one or more of locations 105, e.g., as described below.

In some demonstrative aspects, the noise inputs 104 may be based on monitoring information, which may be sensed by one or more monitoring sensors, denoted "M", e.g., microphones, accelerometers, tachometers and the like, at one or more monitoring locations 103, e.g., as described below.

In some demonstrative aspects, a noise input 104 may include a noise input corresponding to a virtual sensor at a virtual sensor location 105. For example, the noise input corresponding to the virtual sensor at a virtual sensor location 105 may be based on monitoring information sensed by one or more sensors at the one or more monitoring locations 103, e.g., as described below.

In some demonstrative aspects, the one or more monitoring locations 103 may include one or more locations different from the noise sensing locations 105, e.g., as described below.

In some demonstrative aspects, as shown in FIG. 2, the monitoring locations 103 may include one or more monitoring locations 103 outside the sound control zone 110, and/or one or more monitoring locations 103 inside the sound control zone 110.

In one example, in a vehicular implementation of AAC system 100, the one or more monitoring locations 103 may include, for example, a monitoring location in a cabin of a vehicle, a monitoring location on a roof of a vehicle, a monitoring location on a chassis of a vehicle, a monitoring location on an external surface of a vehicle, a monitoring location on a wheel of a vehicle, and/or any other additional or alternative location.

In some demonstrative aspects, the input information 195 may include a plurality of residual-noise inputs 106, e.g., from one or more, physical and/or virtual, residual-noise acoustic sensors (also referred to as "error sensors", or "secondary sensors") 121, representing acoustic residual-noise at a plurality of predefined residual-noise sensing locations 107. For example, residual-noise sensing locations 107 may be located within sound-control zone 110, e.g., as described below.

In some demonstrative aspects, the input information 195 may include the plurality of residual-noise inputs 106, e.g., as described below.

In other aspects, one or more, e.g., some or all, of the plurality of residual-noise inputs 106 may be optional and/or excluded. For example, in some demonstrative aspects, AAC controller 102 may be configured to provide a technical solution to control sound within the at least one AAC zone 110, for example, even without using one or more, e.g., some or all, of the plurality of residual-noise inputs 106, e.g., as described below.

In some demonstrative aspects, AAC controller 102 may receive residual-noise inputs 106 from one or more acoustic sensors 121, which may include one or more physical sensors, e.g., microphones, accelerometers, tachometers, and/or the like, located at one or more of locations 107, and/or from one or more virtual sensors configured to estimate the residual-noise at one or more of locations 107, e.g., as described below.

In some demonstrative aspects, a residual-noise input 104 may include a residual-noise input corresponding to a virtual sensor at a virtual sensor location 107. For example, the residual-noise input corresponding to the virtual sensor at a virtual sensor location 107 may be based on monitoring information sensed by one or more sensors at the one or more monitoring locations 103, e.g., as described below.

In some demonstrative aspects, AAC system 100 may include at least one acoustic transducer 108, e.g., a speaker, a shaker, and/or any other actuator. For example, AAC controller 102 may control acoustic transducer 108 to generate an acoustic sound control pattern configured to control the sound within sound control zone 110, e.g., as described in detail below.

In some demonstrative aspects, the at least one acoustic transducer 108 may include, for example, an array of one or more acoustic transducers, e.g., at least one suitable speaker, to produce the sound control pattern based on sound control signal 109.

In some demonstrative aspects, the at least one acoustic transducer 108 may be positioned at one or more locations, which may be determined based on one or more attributes of sound control zone 110, e.g., a size and/or shape of zone 110, one or more expected attributes inputs 104, one or more expected attributes of one or more potential actual noise sources 202, e.g., an expected location and/or directionality of noise sources 202 relative to sound control zone 110, a number of noise sources 202, and the like.

In one example, acoustic transducer 108 may include a speaker array including a predefined number, denoted Mspk, of speakers or a multichannel acoustical source. In some demonstrative aspects, acoustic transducer 108 may include an array of speakers implemented using a suitable "compact acoustical source" positioned at a suitable location, e.g., external to zone 110.

In another example, the array of speakers may be implemented using a plurality of speakers distributed in space, e.g., around sound control zone 110.

In some demonstrative aspects, one or more of locations 105 may be distributed in any combination of locations on and/or external to the spherical volume, e.g., one or more locations surrounding the spherical volume, e.g., as described below.

In some demonstrative aspects, one or more locations 105 may be distributed externally to sound control zone 110. For example, one or more of locations 105 may be distributed on, or in proximity to, an envelope or enclosure surrounding sound control zone 110.

For example, if sound control zone 110 is defined by a spherical volume, then one or more of locations 105 may be distributed on a surface of the spherical volume and/or external to the spherical volume.

In some demonstrative aspects, one or more of locations 105 may be distributed at one or more other additional or alternative locations relative to sound control zone 110. In one example, in a vehicular implementation of AAC system 100, the one or more noise sensing locations 105 may include, for example, a noise sensing location 105 in a cabin of a vehicle, a noise sensing location 105 on a chassis of a vehicle, a noise sensing location 105 on an external surface of a vehicle, a noise sensing location 105 on a wheel of a vehicle, and/or any other additional or alternative location.

In some demonstrative aspects, locations 107 may be distributed within sound control zone 110. In one example, one or more of the locations 107 may be in proximity to the envelope of sound control zone 110. In one example, one or more of the locations 107 may be in proximity to a head and/or an ear of a user of the sound control zone 110.

For example, if zone 110 is defined by a spherical volume, then locations 107 may be distributed on a spherical surface having a radius, which is lesser than a radius of sound control zone 110.

In some demonstrative aspects, AAC system 100 may include one or more first acoustic sensors ("primary sensors") 119 to sense the acoustic noise at one or more of the plurality of noise sensing locations 105, and/or to sense the monitoring acoustic information at one or more monitoring locations 103.

In some demonstrative aspects, AAC system 100 may include one or more second acoustic sensors ("error sensors") 121 to sense the acoustic residual-noise at one or more of the plurality of residual-noise sensing locations 107, e.g., as escribed below.

In other aspects, some, or even all, of the acoustic sensors 121 may be optional or excluded, e.g., as escribed below.

In some demonstrative aspects, one or more of the error sensors and/or one or more of the primary sensors may be implemented using one or more "virtual sensors" ("virtual microphones"). A virtual microphone corresponding to a particular microphone location may be implemented by any suitable algorithm and/or method capable of evaluating an acoustic pattern, which would have been sensed by an actual acoustic sensor located at the particular microphone location.

In some demonstrative aspects, AAC controller 102 may be configured to simulate and/or perform the functionality of the virtual microphone, e.g., by estimating and/or evaluating the acoustic noise pattern at the particular location of the virtual microphone.

In some demonstrative aspects, an AAC system, e.g., AAC system 100 (FIG. 1), may include a first array 219 of one or more primary sensors, e.g., microphones, accelerometers, tachometers and the like, configured to sense the primary patterns at one or more of locations 105 and/or locations 103. For example, array 219 may include a plurality of acoustic sensors 119 (FIG. 1). For example, array 219 may include a microphone to output a noise signal 104 (FIG. 1) including, for example, a sequence of Nmic samples per second. For example, Nmic may be 48000 samples per second, e.g., if the microphone operates at a sampling rate of about 48 KHz. The noise signal 104 (FIG. 1) may include any other suitable signal having any other suitable sampling rate and/or any other suitable attributes.

In some demonstrative aspects, one or more of the sensors of array 219 may be implemented using one or more "virtual sensors". For example, array 219 may be implemented by a combination of at least one microphone and at least one virtual microphone. A virtual microphone corresponding to a particular microphone location of locations 105 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 119 (FIG. 1) of array 219.

In some demonstrative aspects, AAC controller 102 may be configured to simulate and/or perform the functionality of a virtual primary sensor at a primary sensor location 105, for example, based on monitoring information sensed by the one or more monitoring sensors at the one or more monitoring locations 103.

In some demonstrative aspects, AAC system 100 (FIG. 1) may include a second array 221 of one or more error sensors, e.g., microphones, configured to sense the acoustic residual-noise at one or more of locations 107. For example, array 221 may include a plurality of acoustic sensors 121 (FIG. 1). For example, the error sensors may include one or more sensors to sense the acoustic residual-noise patterns on a spherical surface within spherical sound control zone 110. In other aspects, some, or even all, of the acoustic sensors 221 may be optional or excluded.

In some demonstrative aspects, one or more of the sensors of array 221 may be implemented using one or more "virtual sensors". For example, array 221 may include a combination of at least one microphone and at least one virtual microphone. A virtual microphone corresponding to a particular microphone location of locations 107 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 121 (FIG. 1) of array 221.

In some demonstrative aspects, AAC controller 102 may be configured to simulate and/or perform the functionality of a virtual primary sensor at an error sensor location 107, for example, based on monitoring information sensed by the one or more monitoring sensors at the one or more monitoring locations 103.

In some demonstrative aspects, the number, location and/or distribution of the locations 103, 105 and/or 107, and/or the number, location and/or distribution of one or more acoustic sensors at one or more of locations 103, 105 and 107 may be determined based on a size of sound control zone 110 and/or of an envelope of sound control zone 110, a shape of sound control zone 110 or of the envelope of sound control zone 110, one or more attributes of the acoustic sensors to be located at one or more of locations 103, 105 and/or 107, e.g., a sampling rate of the sensors, and the like.

In one example, one or more acoustic sensors, e.g., microphones, accelerometers, tachometers and the like, may be deployed at locations 103, 105 and/or 107 according to the Spatial Sampling Theorem, e.g., as defined below by Equation 1.

For example, a number of the primary sensors, a distance between the primary sensors, a number of the error sensors and/or a distance between the error sensors may be determined in accordance with the Spatial Sampling Theorem, e.g., as defined below by Equation 1.

In one example, the primary sensors and/or the error sensors may be distributed, e.g., equally or non-equally distributed, with a distance, denoted d, from one another. For example, the distance d may be determined as follows:

$$d \le \frac{c}{2 \cdot f} \tag{1}$$

wherein c denotes the speed of sound and f max denotes a maximal frequency at which sound control is desired.

In one example, in case the maximal frequency of interest is fmax=100 (Hz), the distance d may be determined as d<=(343)/(2*100)=1.7 (m).

As shown in FIG. 2 deployment scheme 200 is configured with respect to a circular or spherical sound control zone 110. For example, one or more locations 105 are distributed, e.g., substantially evenly distributed, in a spherical or circular manner around sound control zone 110, and locations 107 are distributed, e.g., substantially evenly distributed, in a spherical or circular manner within sound control zone 110.

However in other aspects, components of AAC system 100 may be deployed according to any other deployment scheme including any suitable distribution of locations 103, 105 and/or 107, e.g., configured with respect a sound control zone of any other suitable form and/or shape.

In some demonstrative aspects, AAC controller 102 may be configured to determine the sound control pattern to according to at least one acoustic parameter, e.g., energy, amplitude, phase, frequency, direction, and/or statistical properties within sound control zone 110, e.g., as described in detail below.

In some demonstrative aspects, AAC controller 102 may determine the sound control pattern to selectively reduce one or more predefined first acoustic patterns, e.g., noise patterns, within sound control zone 110, while not reducing one or more second acoustic patterns, e.g., noise patterns, within sound control zone 110, e.g., as described below.

In some demonstrative aspects, sound control zone 110 may be located within an interior of a vehicle, and AAC controller 102 may determine the sound control pattern to selectively reduce one or more first acoustic patterns, e.g., including a road noise pattern, a wind noise pattern, and/or an engine noise pattern, while not reducing one or more second acoustic patterns, e.g., including an audio pattern of an audio device located within the vehicle, a horn noise pattern, a siren noise pattern, a hazard acoustic pattern of a hazard, an alarm acoustic pattern of an alarm signal, an acoustic pattern of an informational signal, and/or the like.

In other aspects, sound control zone 110 may be in any other location and/or area, e.g., vehicular or non-vehicular, and AAC controller 102 may be configured to determine the sound control pattern to selectively reduce any other one or more first acoustic patterns, while substantially not reducing or affecting any other one or more second acoustic patterns.

In some demonstrative aspects, AAC controller 102 may be configured to determine the sound control pattern, e.g., even without having information relating to one or more noise-source attributes of one or more of actual noise sources 202 generating the acoustic noise at the noise sensing locations 105.

For example, the noise-source attributes may include a number of noise sources 202, a location of noise sources 202, a type of noise sources 202 and/or one or more attributes and/or characteristics of one or more noise patterns generated by one or more of noise sources 202.

In some demonstrative aspects, AAC controller 102 may be configured to determine the sound control pattern, for example, while taking into account one or more factors, for example, one or more acoustic transfer-functions between elements of AAC system 100, e.g., acoustic transfer-functions between the at least one acoustic transducer 108 and one or more acoustic sensing locations, e.g., as described below.

In some demonstrative aspects, the acoustic transfer-functions may represent and/or describe an acoustic medium through which the sound waves travel. For example, a transfer-function between a source point and a destination point may include a direct path, e.g., defined by a straight line (if exists) connecting the source point and the destination point, and/or one or more multipaths, e.g., indirect paths which contain reflections from objects in the environment surrounding the source point and the destination point.

In some demonstrative aspects, the one or more acoustic sensing locations may include a physical-sensing location of an acoustic sensor. For example, the one or more acoustic transfer-functions may include an acoustic transfer function between an acoustic transducer 108 and an acoustic sensor physically located at an acoustic sensing location, e.g., as described below.

In some demonstrative aspects, the one or more acoustic sensing locations may include a virtual-sensing location of a virtual acoustic sensor. For example, the one or more acoustic transfer-functions may include an acoustic transfer function between an acoustic transducer 108 and a virtual acoustic sensor at a virtual acoustic sensing location, e.g., as described below.

In some demonstrative aspects, the one or more acoustic sensing locations may include a residual-noise sensing location 107 of a residual-noise sensor 121, for example, a physical residual-noise sensor 121 or a virtual residual-noise sensor 121, e.g., as described below. For example, the one or more acoustic transfer-functions may include an acoustic transfer function between an acoustic transducer 108 and a residual-noise sensing location 107, e.g., as described below.

In some demonstrative aspects, the one or more acoustic sensing locations may include a noise sensing location 105 of a noise sensor 119, for example, a physical noise sensor 119 or a virtual noise sensor 119, e.g., as described below. For example, the one or more acoustic transfer-functions may include an acoustic transfer function between an acoustic transducer 108 and a noise sensing location 105, e.g., as described below.

In some demonstrative aspects, the one or more acoustic sensing locations may include a monitoring sensing location 103 of a monitoring sensor 119, e.g., as described below. For example, the one or more acoustic transfer-functions may include an acoustic transfer function between an acoustic transducer 108 and a monitoring sensing location at a monitoring location 103, e.g., as described below.

In some demonstrative aspects, AAC controller 102 may be configured to determine the sound control pattern, for example, while taking into account statistical characteristics of acoustic signals, e.g., noise, to be handled by the AAC system 100, e.g., as described below.

In some demonstrative aspects, the statistical characteristics of acoustic signals, e.g., noise, to be handled by the AAC system 100 may be based on the spectral distribution of the acoustic signals, e.g., how the energy of an acoustic signal is distributed across a pertinent frequency range.

In other aspects, AAC controller 102 may be configured to determine the sound control pattern based on any other additional or alternative factors, criteria, attributes, and/or parameters.

In some demonstrative aspects, the acoustic transfer functions in sound control zone 110 and/or in an environment of sound control zone 110 may be prone to physical changes of the environment of sound control zone 110.

In some demonstrative aspects, the acoustic transfer functions in a vehicle environment may be prone to physical changes of the vehicle environment, such as, for example, positions and/or angles of the vehicle seats, the number of passengers within the vehicle, one or more open/closed windows, and/or any other additional or alternative attribute of the vehicle environment, e.g., as described below.

In some demonstrative aspects, the spectral distribution of the acoustic signals, e.g., noise signals, in a vehicle environment may be sensitive to one or more factors including, for example, a road surface, a type of the vehicle tires, a velocity of the vehicle, an engine speed (RPM) of the vehicle, wind induced noise, operation of an air conditioning system in the vehicle, and/or one or more additional or alternative factors, e.g., as described below.

In some demonstrative aspects, AAC controller 102 may be configured to determine and/or set the sound control pattern, for example, based on predefined transfer functions and/or the spectral distribution of the noise, for example, to set an operation of the AAC system 100 to predefined conditions, e.g., as described below.

In some demonstrative aspects, AAC controller 102 may be configured to determine and/or set the sound control pattern, for example, based on current or real-time estimated transfer functions and/or the spectral distribution of the noise, for example, to set an operation of the AAC system 100 to current, or real-time conditions, e.g., as described below.

In some demonstrative aspects, AAC controller 102 may be configured to determine and/or set the sound control pattern, for example, based on one or more changes in the transfer functions and/or the spectral distribution of the noise, for example, to set an operation of the AAC system 100 to new conditions, e.g., as described below.

In some demonstrative aspects, AAC controller 102 may be configured to set parameters of the AAC system 100, for example, in real-time and/or in a continuous manner, for example, in a manner which may address one or more technical issues, e.g., as described below.

In some demonstrative aspects, AAC controller 102 may include, and/or may be configured to perform one or more operations of, and/or the functionality of, a state-machine, which may be configured to receive input from one or more sources, e.g., an in-vehicle computer and/or from one or more detectors, which may monitor one or more environmental conditions, e.g., as described below.

In one example, in a vehicular implementation, the input from the one or more sources may include, for example, information indicative of a position of the vehicle seats, the number of passengers, the velocity of the vehicle, the engine speed, or the like, e.g., as described below.

In another example, the input from the one or more sources may include, for example, information indicative of the temperature and/or pressure in an environment of the sound control zone 110, e.g., the cabin of the vehicle.

In some demonstrative aspects, AAC controller 102 may be configured to determine a mode of operation of the AAC system 100, for example, by programming the AAC system 100 with an adequate set of parameters, e.g., as described below.

In some demonstrative aspects, the input information 195 may include AAC information 129 (also referred to as "AAC support information", "AAC assistance information", or "AAC configuration information"), which may be received from one or more information sources 120.

For example, in a vehicular implementation, the information sources 120 may include one or more information sources in the vehicle, e.g., as described below.

In one example, the AAC information may include environmental information corresponding to an environment of the vehicle.

In another example, the AAC information may include cabin information corresponding to a cabin of the vehicle.

In another example, the AAC information may include vehicle information corresponding to physical parameters of the vehicle.

In other aspects, the AAC information may include any other additional and/or alternative information of one or more parameters affecting the sound control zone 110, and/or information corresponding to an environment of the sound control zone 110.

In some demonstrative aspects, controller 193 may be configured to receive and process the AAC information 129, for example, via input 191, e.g., as described below.

In some demonstrative aspects, controller 193 may be configured to determine the sound control signal 109, for example, based on AAC information 129, for example, in addition to noise inputs 104 and/or residual-noise inputs 106, e.g., as described below.

In some demonstrative aspects, the AAC information 129 may include information corresponding to a configuration of AAC in the sound control zone 110 and/or one or more other sound control zones, e.g., as described below.

In some demonstrative aspects, the AAC information 129 may include information of one or more parameters and/or attributes affecting an AAC configuration corresponding to the sound control zone 110, e.g., as described below.

In some demonstrative aspects, the AAC configuration information 129 may include information representing a spectral distribution of acoustic signals in the sound control zone 110 and/or in an environment of the sound control zone 110, e.g., as described below.

In some demonstrative aspects, the AAC configuration information 129 may include information representing one or more parameters affecting a real-time configuration of AAC in the sound control zone 110, e.g., as described below.

In some demonstrative aspects, the AAC configuration information 129 may include information representing one or more physical properties of the sound control zone 110, e.g., as described below.

In some demonstrative aspects, the AAC configuration information 129 may include information representing one or more acoustic properties of the sound control zone 110, e.g., as described below.

In some demonstrative aspects, the AAC configuration information 129 may include information from one or more information sources 120, which are different from the one or more acoustic sensors of system 100, e.g., the noise sensors 119, residual noise sensors 121, and/or the monitoring sensors.

In some demonstrative aspects, the AAC configuration information 129 may include information from one or more information sources 120, which are independent from the one or more acoustic sensors of system 100, e.g., the noise sensors 119, residual noise sensors 121, and/or the monitoring sensors.

In some demonstrative aspects, the AAC assistance information 129 may include information which may be utilized by AAC controller 193, for example, to assist AAC controller 193, in configuration of one or more AAC settings and/or AAC parameters, e.g., as described below.

In some demonstrative aspects, the AAC assistance information 129 may include real-time input information, which may be received from the one or more information sources 120 in real-time, for example, during operation of the AAC system 100, e.g., as described below.

In some demonstrative aspects, the AAC configuration information 129 may include real-time information corresponding to a real-time acoustic configuration of the sound control zone 110 and/or other sound control zones, e.g., as described below.

In some demonstrative aspects, the AAC information 129 may include information, which may correspond to, may represent, and/or may affect, one or more sound control parameters of a sound control setting of the sound control zone 110, e.g., as described below.

In some demonstrative aspects, the AAC information 129 may include acoustic configuration information corresponding to an acoustic configuration of the sound control zone 110, e.g., as described below.

In some demonstrative aspects, the AAC configuration information 129 may include information representing one or more parameters affecting a real-time configuration of AAC in the sound control zone 110, e.g., as described below.

In some demonstrative aspects, the AAC configuration information 129 may be different from the plurality of noise inputs 104, e.g., as described below.

In some demonstrative aspects, the AAC configuration information 129 may be received separately from the plurality of noise inputs 104, e.g., as described below.

In some demonstrative aspects, the AAC configuration information 129 may be received from one or more information sources 120, which may be separate from and/or different from the reference noise sensors 119, e.g., as described below.

In some demonstrative aspects, the AAC assistance information 129 may include acoustic configuration information, for example, including information related to one or more parameters of the acoustic configuration of the sound control zone 110, e.g., as described below.

In some demonstrative aspects, the AAC information 129 may include acoustic configuration information, for example, including information defining one or more parameters of the acoustic configuration of the sound control zone 110, e.g., as described below.

In some demonstrative aspects, the AAC information 129 may include acoustic configuration information, for example, including information affecting one or more parameters of the acoustic configuration of the sound control zone 110, e.g., as described below.

In some demonstrative aspects, the AAC assistance information 129 may include acoustic configuration information, for example, including information representing one or more parameters of the acoustic configuration of the sound control zone 110, e.g., as described below.

In some demonstrative aspects, the AAC assistance information 129 may include information corresponding to an AAC configuration affecting a sound control zone 110 implemented in a vehicle, e.g., as described below.

In some demonstrative aspects, the AAC assistance information 129 may include vehicular system configuration information corresponding to a configuration of a mode of operation of one or more vehicular systems of a vehicle including the sound control zone 110, e.g., as described below.

In some demonstrative aspects, the AAC assistance information 129 may include vehicular type information corresponding to a type of a vehicle including the sound control zone 110, e.g., as described below.

In some demonstrative aspects, the AAC assistance information 129 may include vehicular sensor information from one or more vehicular sensors of a vehicle including the sound control zone 110, e.g., as described below.

In some demonstrative aspects, the AAC assistance information 129 may include vehicle speed information corresponding to a speed of a vehicle including the sound control zone 110, e.g., as described below.

In some demonstrative aspects, the AAC assistance information 129 may include engine information corresponding to an engine of a vehicle including the sound control zone 110, e.g., as described below.

In some demonstrative aspects, the AAC assistance information 129 may include braking system information corresponding to a braking system of a vehicle including the sound control zone 110, e.g., as described below.

In some demonstrative aspects, the AAC assistance information 129 may include road detection information from a road detection system of a vehicle including the sound control zone 110, e.g., as described below.

In some demonstrative aspects, the AAC assistance information 129 may include steering information corresponding to a steering system of a vehicle including the sound control zone 110, e.g., as described below.

In some demonstrative aspects, the AAC assistance information 129 may include tire information corresponding to one or more tires of a vehicle including the sound control zone 110, e.g., as described below.

In some demonstrative aspects, the AAC assistance information 129 may include seat position information corresponding to one or more seats of a vehicle including the sound control zone 110, e.g., as described below.

In some demonstrative aspects, the AAC assistance information 129 may include passenger information corresponding to one or more passengers of a vehicle including the sound control zone 110, e.g., as described below.

In some demonstrative aspects, the AAC assistance information 129 may include opening-state information corresponding to a state of an opening of a vehicle including the sound control zone 110, e.g., as described below.

In some demonstrative aspects, the AAC assistance information 129 may include audio-system information corresponding to an audio-system of a vehicle including the sound control zone 110, e.g., as described below.

In some demonstrative aspects, the AAC assistance information 129 may include climate information corresponding to at least one of a climate inside the sound control zone 110 or a climate outside the sound control zone 110, e.g., as described below.

In some demonstrative aspects, the AAC assistance information 129 may include user position information corresponding to a position of at least one of a head or an ear of a user in the sound control zone 110, e.g., as described below.

In some demonstrative aspects, the AAC assistance information 129 may include user identity information corresponding to an identity of a user to control a user preference with respect to the sound control zone 110, e.g., as described below.

In one example, the AAC assistance information 129 may include user identity information corresponding to an identity of a user of the sound control zone 110. For example, the AAC assistance information 129 may include user identity information corresponding to an identity of a driver of a vehicle, for example, to control a user preference with respect to the sound control zone 110 implemented with respect to a driver seat of the vehicle.

In another example, the AAC assistance information 129 may include user identity information corresponding to an identity of a user to control a user preference with respect to the sound control zone 110, which may be used by another user. For example, the AAC assistance information 129 may include user identity information corresponding to an identity of a driver of a vehicle, for example, to control a user preference with respect to the sound control zone 110 implemented with respect to one or more passenger seats of the vehicle.

In some demonstrative aspects, the AAC assistance information 129 may include acoustic configuration information, for example, including any other additional or alternative information, which may be related to the acoustic configuration of the sound control zone 110, e.g., as described below.

In some demonstrative aspects, input 191 may be configured to receive the AAC assistance information 129 via system bus information received via a system bus of a vehicle including the sound control zone 110, e.g., as described below.

In some demonstrative aspects, input 191 may be configured to receive the AAC assistance information 129 via Controller Area Network (CAN) bus information received via a CAN bus of the vehicle.

In some demonstrative aspects, input 191 may be configured to receive the AAC assistance information 129 via A to B (A2B) bus information received via an A2B bus of the vehicle.

In some demonstrative aspects, input 191 may be configured to receive the AAC assistance information 129 via Media Oriented Systems Transport (MOST) bus information received via a MOST bus of the vehicle.

In some demonstrative aspects, input 191 may be configured to receive the AAC assistance information 129 via wireless communication information received over a wireless communication link.

In some demonstrative aspects, input 191 may be configured to receive the AAC assistance information 129 via Ethernet bus information received via an Ethernet bus of the vehicle.

In other aspects, input 191 may be configured to receive the AAC information 129 via any other wired link or connection, wireless link or connection, and/or any other communication mechanism, connection, link, bus and/or interface.

In some demonstrative aspects, the AAC information 129 may include sensor information from one or more sensors, e.g., as described below. For example, information sources 120 may include one or more sensors, e.g., as described below.

In some demonstrative aspects, the AAC assistance information 129 may include sensor information from one or more acoustic sensors, e.g., as described below. For example, information sources 120 may include one or more acoustic sensors, e.g., as described below.

In some demonstrative aspects, information sources 120 may include one or more acoustic sensors, which may be different from, and/or independent of, the monitoring sensors at monitoring locations 103, noise acoustic sensors 119, and/or the residual-noise acoustic sensors 121, e.g., as described below.

In some demonstrative aspects, information sources 120 may include one or more acoustic sensors, which may be included as part of, and/or may utilize one or more functionalities of, the monitoring sensors at monitoring locations 103, the noise acoustic sensors 119 and/or the residual-noise acoustic sensors 121, e.g., as described below.

In some demonstrative aspects, the AAC information 129 may be based, partially or entirely, on acoustic information from one or more of the noise acoustic sensors 119 and/or the residual-noise acoustic sensors 121, e.g., as described below.

In some demonstrative aspects, information sources 120 may include one or more environment sensors, which may be configured to sense one or more parameters and/or an attribute of an environment of the sound control zone 110, e.g., as described below.

In some demonstrative aspects, for example, the environment sensors may include acoustic sensors, image sensors, optic sensors, light sensors, temperature sensors, accelerometers, pressure sensors, humidity sensors, and/or any other type of sensor.

In some demonstrative aspects, the AAC information 129 may include sensor information from one or more optic and/or image sensors, e.g., as described below. For example, information sources 120 may include one or more optic and/or image sensors, for example, cameras, e.g., as described below.

In some demonstrative aspects, the AAC information 129 may include any other sensor information from any other additional or alternative sensor.

In some demonstrative aspects, information sources 120 may include one or more state information sources, which may be configured to provide the AAC information 129 corresponding to a state of one or more elements and/or settings affecting an AAC configuration, e.g., as described below.

In some demonstrative aspects, the AAC information 129 may include vehicular system configuration information corresponding to the configuration of an operation of one or more vehicular systems of a vehicle including sound control zone 110, e.g., as described below.

In some demonstrative aspects, the AAC information 129 may include vehicular system configuration information from one or more vehicular systems of the vehicle, e.g., as described below. For example, information sources 120 may include one or more vehicular systems of the vehicle, and/or a system controller of the vehicle, e.g., as described below.

In some demonstrative aspects, AAC information 129 may include vehicle type information corresponding to a type of the vehicle, e.g., as described below.

For example, AAC information 129 may include vehicle type information representing a vehicle type, e.g., Sport Utility Vehicle (SUV), hatchback, crossover, convertible, sedan, coupe, sports, minivan, van, station-wagon, pickup truck, or the like.

For example, AAC information 129 may include vehicle type information representing a vehicle size type, e.g., mini, mid-size, large, wide, medium-width, narrow, high, medium-height, low, or the like.

For example, AAC information 129 may include vehicle type information representing a vehicle manufacturer of the vehicle.

In some demonstrative aspects, AAC information 129 may include vehicle sensor information, which may be received from one or more sensors of the vehicular systems of the vehicle, e.g., as described below.

In some demonstrative aspects, AAC information 129 may include vehicle speed information corresponding to a speed of the vehicle, e.g., as described below.

In some demonstrative aspects, AAC information 129 may include engine information corresponding to an engine of the vehicle, e.g., as described below.

For example, AAC information 129 may include Revolutions Per Minute (RPM) information corresponding to an RPM of the engine of the vehicle, e.g., as described below.

In some demonstrative aspects, AAC information 129 may include braking system information corresponding to a braking system of the vehicle, e.g., as described below.

For example, AAC information 129 may include braking system information to indicate an operational state of a main braking system, an emergency braking system, and/or an Anti-lock braking system (ABS), and/or any other braking system, e.g., as described below.

In some demonstrative aspects, AAC information 129 may include road detection information corresponding to a road detection system of the vehicle, e.g., as described below.

For example, AAC information 129 may include road detection information to indicate a road type, for example, a smooth road, a bumpy road, a rough road, a highway, a paved road, a dirt road, a gravel road, or the like, e.g., as described below.

In some demonstrative aspects, AAC information 129 may include steering information corresponding to a steering system of the vehicle, e.g., as described below.

For example, AAC information 129 may include steering wheel information to indicate an angle of a steering wheel of the vehicle, e.g., as described below.

In some demonstrative aspects, AAC information 129 may include tire information corresponding to a tire system of the vehicle, e.g., as described below.

For example, AAC information 129 may include tire pressure information to indicate pressure of one or more tires of the vehicle, and/or tire type information to indicate a type and/or size of one or more tires of the vehicle, e.g., as described below.

In some demonstrative aspects, AAC information 129 may include seat information corresponding to one or more seats in the vehicle, e.g., as described below.

For example, AAC information 129 may include seat position information corresponding to a positioning of a driver seat and/or a positioning of one or more passenger seats in the vehicle, e.g., as described below.

For example, AAC information 129 may include seat occupancy information corresponding to an occupancy of one or more seats in the vehicle, e.g., as described below. For example, the seat occupancy information may include information to indicate how many seats are occupied, how many seats are unoccupied, which specific seats are occupied, or the like.

In some demonstrative aspects, AAC information 129 may include passenger information corresponding to one or more passengers in the vehicle, e.g., as described below.

For example, AAC information 129 may include passenger information to indicate a count, a position, a location, a size, and/or measurements of one or more passengers in the vehicle, e.g., as described below.

In some demonstrative aspects, AAC information 129 may include opening state information corresponding to one or more openings of the vehicle, e.g., as described below.

In some demonstrative aspects, AAC information 129 may include window/roof information corresponding to a window, a door, a trunk, and/or a roof of the vehicle, e.g., as described below.

For example, AAC information 129 may include window information to indicate a fully open position of one or more windows, a partially open position, how much a window is open (e.g., % window open), or a closed position of one or more windows; door information to indicate an open door or a closed door; and/or roof information to indicate a roof type, e.g., a metal roof or a panoramic roof, a roof position, for example, an open position, a partially open position, how much a roof is open (e.g., % roof open), or a closed position of a roof of the vehicle, e.g., as described below.

In some demonstrative aspects, AAC information 129 may include audio system information corresponding to an audio system of the vehicle, e.g., as described below.

For example, AAC information 129 may include audio system information to indicate one or more audio parameters of an operation of the audio system, for example, an audio level, an audio input, an equalizer setting, a music level, or the like, e.g., as described below.

In some demonstrative aspects, AAC information 129 may include climate information corresponding to a climate inside the vehicle and/or a climate outside the vehicle, e.g., as described below.

For example, AAC information 129 may include temperature information corresponding to a temperature inside the vehicle and/or a temperature outside the vehicle, e.g., as described below.

For example, AAC information 129 may include humidity information corresponding to humidity inside the vehicle and/or humidity outside the vehicle, e.g., as described below.

For example, AAC information 129 may include precipitation information corresponding to a situation of rain, snow and/or ice outside the vehicle, e.g., as described below.

In some demonstrative aspects, AAC information 129 may include any other additional or alternative information.

In some demonstrative aspects, controller 193 may be configured to determine the sound control pattern to control sound within the sound control zone 110, for example, based on the AAC information 129, the plurality of noise inputs 104 and/or the plurality of residual-noise inputs 106, e.g., as described below.

In some demonstrative aspects, AAC controller 102 may include an output 197 to output the sound control pattern to a plurality of acoustic transducers. For example, output 197 may be configured to output the sound control pattern in the form of sound control signal 109 to control acoustic transducer 108, e.g., as described below.

In one example, the sound control signal 109 may include a plurality of transducer-input signals to be provided to the plurality of acoustic transducers 108, respectively. For example, a transducer-input signal for an acoustic transducer 108 may be configured to cause the acoustic transducer 108 to output an acoustic signal according to the sound control pattern. For example, plurality of transducer-input signals may be configured such that the sound control pattern may be generated by a combination of acoustic signals outputted by the plurality of acoustic transducers 108.

In some demonstrative aspects, AAC controller 102 may be configured to determine an AAC parameter setting based on the AAC configuration information 129, and to determine the sound control pattern for sound control signal 109, for example, by applying the AAC parameter setting to at least one of the plurality of noise inputs 104, and/or the plurality of residual-noise inputs 106, e.g., as described below.

In some demonstrative aspects, the AAC parameter setting may include a setting of a prediction filter, a setting of a path transfer function, a setting of an extractor (also referred to as "acoustic pattern extractor") to extract a plurality of reference acoustic patterns, e.g., including disjoint reference acoustic patterns, and/or a setting of any other parameter, which may be utilized for determining, generating, updating, configuring, and/or setting the sound control pattern to control acoustic transducer 108, e.g., as described below.

In some demonstrative aspects, AAC controller 102 may be configured to determine a prediction filter setting of at least one prediction filter based, for example, on the AAC configuration information 129, and to determine the sound control pattern based, for example, on the prediction filter setting, e.g., as described below.

In some demonstrative aspects, the prediction filter setting may include, for example, a plurality of prediction filter coefficients to configure the prediction filter, e.g., as described below.

In some demonstrative aspects, the plurality of prediction filter coefficients may be represented by a prediction filter weight vector, e.g., as described below.

In some demonstrative aspects, the prediction filter setting may include, for example, a prediction filter weight vector to be applied by the prediction filter for determining the sound control pattern for sound control signal 109, for example, based on at least one of the plurality of noise inputs 104 and/or the plurality of residual-noise inputs 106, e.g., as described below.

In other aspects, the AAC controller 102 may be configured to determine any other additional or alternative prediction filter setting based, for example, on the AAC configuration information 129.

In some demonstrative aspects, AAC controller 102 may be configured to determine a path transfer function setting of one or more path transfer functions based, for example, on the AAC configuration information 129, and to apply the path transfer function setting for determining the sound control pattern for sound control signal 109, for example, based on at least one of the plurality of noise inputs 104 and/or the plurality of residual-noise inputs 106, e.g., as described below.

In some demonstrative aspects, the path transfer function setting may include a setting of a path transfer function between an acoustic transducer 108 and an acoustic sensing location, e.g., as described below.

In some demonstrative aspects, the path transfer function setting may include a setting of a path transfer function between an acoustic transducer 108 and a physical acoustic sensing location of a physical acoustic sensor, e.g., as described below.

In some demonstrative aspects, the path transfer function setting may include a setting of a path transfer function between an acoustic transducer 108 and a virtual acoustic sensing location of a virtual acoustic sensor, e.g., as described below.

In some demonstrative aspects, the path transfer function setting may include a setting of a path transfer function between an acoustic transducer 108 and a noise sensing location 105, e.g., as described below.

In some demonstrative aspects, the path transfer function setting may include a setting of a path transfer function between an acoustic transducer 108 and a residual-noise sensing location 107, e.g., as described below.

In some demonstrative aspects, the path transfer function setting may include a setting of a path transfer function between an acoustic transducer 108 and a monitoring location 103. For example, at least one of the one or more residual-noise inputs 106 may be based, for example, on a monitoring input sensed at the monitoring location 103.

For example, the AAC controller 102 may be configured to determine a setting of a path transfer function between an acoustic transducer 108 and a monitoring location 103 of a monitoring sensor, which is used to determine a residual-noise input 106.

For example, the AAC controller 102 may be configured to determine the sound control pattern to control sound within the sound control zone 110, for example, based on the setting of the path transfer function between the acoustic transducer 108 and the monitoring location 103 of the monitoring sensor.

In one example, the monitoring location 103 of the monitoring sensor, which is used to determine the residual-noise input 106 may be in the sound control zone 110, e.g., as described above.

In another example, the monitoring location 103 of the monitoring sensor, which is used to determine the residual-noise input 106 may be outside of the sound control zone 110, e.g., as described above.

In some demonstrative aspects, AAC controller 102 may be configured to determine a path transfer function setting of a path transfer function between acoustic transducer 108 and a noise sensing location 105, e.g., as described below.

In some demonstrative aspects, AAC controller 102 may be configured to determine a path transfer function setting of a path transfer function between acoustic transducer 108 and a residual-noise sensing location 107, e.g., as described below.

In some demonstrative aspects, AAC controller 102 may be configured to determine a noise extraction function based, for example, on the AAC configuration information 129, e.g., as described below.

In some demonstrative aspects, AAC controller 102 may be configured to determine one or more extracted acoustic patterns, for example, by applying the noise extraction function to at least one of the plurality of noise inputs 104 and/or the plurality of residual-noise inputs 106, and to determine the sound control pattern for sound control signal 109, for example, based on the one or more extracted acoustic patterns, e.g., as described below.

In some demonstrative aspects, AAC controller 102 may be configured to determine a sound control profile based on the AAC configuration information 129, and to determine the sound control pattern based on the sound control profile, e.g., as described below.

In some demonstrative aspects, the sound control profile may include a setting of one or more sound control parameters, and the AAC controller 102 may be configured to determine the sound control pattern for sound control signal 109, for example, based on the setting of the one or more sound control parameters according to the sound control profile, e.g., as described below.

In some demonstrative aspects, memory 198 may be configured, e.g., by controller 193, to store a plurality of sound control profiles corresponding to a plurality of sound control configurations, e.g., as described below.

In some demonstrative aspects, controller 193 may be configured to select and retrieve from the plurality of sound control profiles in memory 198 a selected sound control profile based, for example, on the AAC configuration information 129, e.g., as described below.

In some demonstrative aspects, controller 193 may be configured to determine the sound control pattern for sound control signal 109, for example, based on the selected sound control profile, e.g., as described below.

In some demonstrative aspects, the plurality of sound control profiles may include one or more user-based profiles corresponding to one or more users, e.g., as described below.

In some demonstrative aspects, the user-based profile corresponding to a user may include, for example, a setting of one or more sound control parameters based on a preference of the user, e.g., as described below.

For example, the user-based profile corresponding to the user may include, for example, a setting of a noise mitigation, e.g., a noise-mitigation "on" setting to set noise-mitigation to an active state, a noise-mitigation "off" setting to set noise-mitigation to an inactive state, a noise-mitigation "low" setting to set a low level of noise-mitigation, a noise-mitigation "high" setting to set a high level of noise-mitigation, or the like.

For example, the user-based profile corresponding to the user may include a setting of a noise mitigation targeted per user, for example, per a configured, e.g., predefined, user seat position, a noise mitigation targeted to be optimized for a specific seat or seats, e.g., front or rear seats, a noise mitigation optimized to one or more specific frequency bands, or the like.

For example, the user-based profile corresponding to the user may include, for example, an audio setting of audio to be heard in the sound control zone 110, e.g., a sound level of the audio, an equalizer setting of the audio, or the like.

In some demonstrative aspects, the user-based profile may correspond to a user, which may be allowed to control a user preference with respect to the sound control zone 110, e.g., as described below.

In one example, a user-based profile may correspond to a user of the sound control zone 110. For example, a user-based profile of a driver of a vehicle may include, for example, a setting of one or more sound control parameters based on a preference of the driver with respect to the sound control zone 110 implemented with respect to a driver seat of the vehicle.

In another example, a user-based profile may correspond to a first user to control a user preference with respect to the sound control zone 110, which may be used by a second user. For example, the user-based profile of the driver of the vehicle may include, for example, a setting of one or more sound control parameters based on a preference of the driver with respect to the sound control zone 110 implemented with respect to one or more passenger seats of the vehicle.

In some demonstrative aspects, the AAC configuration information 129 may include, for example, user identity information corresponding to an identity of the user. For example, controller 193 may be configured to select and retrieve from the plurality of sound control profiles in memory 198 a selected sound control profile based, for example, on the user identity information in AAC configuration information 129.

In some demonstrative aspects, AAC controller 102 may be configured to selectively mute the sound control pattern for sound control signal 109, for example, based on the AAC configuration information 129, e.g., as described below.

In some demonstrative aspects, AAC controller 102 may be configured to adjust a level of the sound control pattern for sound control signal 109, for example, based on the AAC configuration information 129, e.g., as described below.

In some demonstrative aspects, AAC controller 102 may be configured to determine setting of at least one AAC parameter, for example, based on the AAC information 129, and to determine the sound control pattern for sound control signal 109, for example, based on the AAC parameter setting, e.g., as described below.

In some demonstrative aspects, the AAC parameter setting may include a setting of a prediction filter, a setting of a path transfer function, a setting of an adaptive AAC parameter, a setting of an extractor (also referred to as "acoustic pattern extractor") to extract a plurality of reference acoustic patterns, e.g., disjoint reference acoustic patterns, and/or a setting of any other parameter, which may be utilized for determining, generating, updating, configuring, and/or adapting the sound control pattern to control acoustic transducer 108, e.g., as described below.

In some demonstrative aspects, AAC controller 102 may be configured to determine a prediction filter setting of at least one prediction filter based on the AAC information 129, and to determine the sound control pattern for sound control signal 109, for example, based on the prediction filter setting, e.g., as described below.

In some demonstrative aspects, the prediction filter setting may include a plurality of prediction filter coefficients and/or a prediction filter weight vector, for example, to be applied by the prediction filter for determining the sound control pattern based on the plurality of noise inputs 104 and/or the plurality of residual-noise inputs 106, e.g., as described below.

In some demonstrative aspects, AAC controller 102 may be configured to determine a path transfer function setting of one or more path transfer functions based on the AAC information 129, and to apply the path transfer function setting for determining the sound control pattern for sound control signal 109, for example, based on the plurality of noise inputs 104 and/or the plurality of residual-noise inputs 106, e.g., as described below.

In some demonstrative aspects, AAC controller 102 may be configured to determine a path transfer function setting of a path transfer function between acoustic transducer 108 and a noise sensing location 105, for example, based on the AAC information 129, e.g., as described below.

In some demonstrative aspects, AAC controller 102 may be configured to determine a path transfer function setting of a path transfer function between acoustic transducer 108 and a residual-noise sensing location 107, for example, based on the AAC information 129, e.g., as described below.

In some demonstrative aspects, AAC controller 102 may be configured to determine a path transfer function setting of a path transfer function between acoustic transducer 108 and a monitoring location 103, for example, based on the AAC information 129, e.g., as described below.

In some demonstrative aspects, AAC controller 102 may be configured to extract from the plurality of noise inputs 104 a plurality of reference acoustic patterns, e.g., including a plurality of disjoint reference acoustic patterns, which are statistically independent.

In some demonstrative aspects, AAC controller 102 may be configured to extract from residual-noise inputs 106 a plurality of residual-noise acoustic patterns, e.g., including a plurality of disjoint residual-noise acoustic patterns, which are statistically independent.

For example, controller 193 may include an extractor (also referred to as "acoustic pattern extractor" or "feature extractor") to extract the plurality of reference acoustic patterns and/or the plurality of residual-noise acoustic patterns.

The phrase "disjoint acoustic patterns" as used herein may refer to a plurality of acoustic patterns, which are independent with respect to at least one feature and/or attribute, e.g., energy, amplitude, phase, frequency, direction, one or more statistical signal properties, and the like.

In some demonstrative aspects, controller 193 may extract the plurality of reference acoustic patterns by applying a predefined reference-noise extraction function to the plurality of reference noise inputs 104.

In some demonstrative aspects, the extraction of the plurality of acoustic patterns may be used, for example, to model the primary pattern of inputs 104 as a combination of a predefined number of, e.g., disjoint, acoustic patterns, e.g., corresponding to a respective number of, e.g., disjoint, modeled acoustic sources.

In one example, it may be assumed that one or more expected noise patterns, which are expected to affect sound control zone 110, may be generated by one or more of road noise, wind noise, engine noise and the like. Accordingly, controller 193 may be configured to select one or more reference acoustic patterns based on one or more attributes of the road noise pattern, the wind noise pattern, the engine noise pattern, and/or any other noise pattern.

In some demonstrative aspects, controller 193 may extract the plurality of residual-noise acoustic patterns by applying a predefined residual-noise extraction function to the plurality of residual-noise inputs 106.

In some demonstrative aspects, AAC controller 102 may be configured to determine an acoustic pattern extractor setting of the acoustic pattern extractor based on the AAC information 129, and to determine the sound control pattern for sound control signal 109, for example, based on the acoustic pattern extractor setting, e.g., as described below.

In some demonstrative aspects, the acoustic pattern extractor setting may include one or more acoustic pattern extractor coefficients to be applied by the acoustic pattern extractor for determining the plurality of reference acoustic patterns and/or the plurality of residual-noise acoustic patterns, e.g., as described below.

In some demonstrative aspects, controller 193 may be configured to determine, update, and/or adjust, e.g., in real-time, a setting of at least one acoustic pattern extractor parameter based on the AAC information 129, and to determine the sound control pattern for sound control signal 109, for example, based on the acoustic pattern extractor parameter setting, e.g., as described below.

In some demonstrative aspects, the acoustic pattern extractor parameter setting may include a setting of one or more coefficients, one or more weight parameters, and/or any other parameters, which may be utilized by the acoustic pattern extractor in extracting the plurality of disjoint reference acoustic patterns and/or the plurality of disjoint residual-noise acoustic patterns.

In some demonstrative aspects, the AAC information 129 may include passenger tracking information to indicate a position of a head and/or an ear of a passenger.

For example, the information sources 120 may include a camera, an image sensor, an optical sensor, and/or any other sensor, which may be configured to track the position of the head and/or ears of the passenger. For example, AAC controller 102 may be configured to determine and/or set one or more AAC parameters, for example, a prediction filter setting, a path transfer function setting, and/or an acoustic pattern extractor setting, for example, based on the passenger tracking information.

In one example, AAC controller 102 may be configured to set, e.g., in real time, one or more AAC parameters, for example, a prediction filter setting, a path transfer function setting, and/or an acoustic pattern extractor setting, for example, based on changes in the position of the head and/or the ear of a passenger in the sound control zone 110, e.g., in real time.

In one example, AAC controller 102 may be configured to set, e.g., in real time, a path transfer function setting of a path transfer function between acoustic transducer 108 and one or more residual-noise sensing locations 107, a path transfer function setting of a path transfer function between acoustic transducer 108 and one or more noise sensing locations 105, and/or a path transfer function setting of a path transfer function between acoustic transducer 108 and one or more monitoring locations 103, for example, based on changes in the position of the head and/or the ear of a passenger in the sound control zone 110, e.g., in real time.

In some demonstrative aspects, the AAC information 129 may include seat position information corresponding to a positioning of one or more seats in the vehicle. For example, AAC information 129 may include seat position information corresponding to a positioning of a driver seat and/or a positioning of one or more passenger seats in the vehicle.

In one example, AAC controller 102 may be configured to set, e.g., in real time, one or more AAC parameters, for example, a prediction filter setting, a path transfer function setting, and/or an acoustic pattern extractor setting, for example, based on the seat position information.

In one example, AAC controller 102 may be configured to set, e.g., in real time, a path transfer function setting of a path transfer function between acoustic transducer 108 and one or more residual-noise sensing locations 107, a path transfer function setting of a path transfer function between acoustic transducer 108 and one or more noise sensing locations 105, and/or a path transfer function setting of a path transfer function between acoustic transducer 108 and one or more monitoring locations 103, for example, based on changes in the seat position of the driver and/or the passenger, e.g., in real time.

In some demonstrative aspects, the AAC information 129 may include passenger information corresponding to one or more passengers in the vehicle. For example, AAC information 129 may include passenger information to indicate a count, a position, a location, a size, and/or measurements of one or more passengers in the vehicle.

In one example, AAC controller 102 may be configured to set, e.g., in real time, one or more AAC parameters, for example, a prediction filter setting, a path transfer function setting, and/or an acoustic pattern extractor setting, for example, based on the passenger information.

In one example, AAC controller 102 may be configured to set, e.g., in real time, a path transfer function setting of a path transfer function between acoustic transducer 108 and one or more residual-noise sensing locations 107, a path transfer function setting of a path transfer function between acoustic transducer 108 and one or more noise sensing locations 105, a path transfer function setting of a path transfer function between acoustic transducer 108 and one or more monitoring locations 103, an acoustic pattern extractor setting, and/or a prediction filter setting, for example, based on the count, position, location, size, and/or measurements of one or more passengers in the vehicle, e.g., in real time.

In some demonstrative aspects, the AAC information 129 may include climate information corresponding to a climate inside the vehicle.

In one example, AAC controller 102 may be configured to set, e.g., in real time, one or more AAC parameters, for example, a prediction filter setting, a path transfer function setting, and/or an acoustic pattern extractor setting, for example, based on changes in the climate inside the vehicle, e.g., in real time.

In one example, AAC controller 102 may be configured to set, e.g., in real time, a path transfer function setting of a path transfer between acoustic transducer 108 and one or more residual-noise sensing locations 107, a path transfer function setting of a path transfer between acoustic transducer 108 and one or more noise sensing locations 105, a path transfer function setting of a path transfer function between acoustic transducer 108 and one or more monitoring locations 103, an acoustic pattern extractor setting, and/or a prediction filter setting, for example, based on changes in the climate in the vehicle, e.g., in real time. For example, AAC controller 102 may be configured to set, e.g., in real time, a path transfer function setting of a path transfer between acoustic transducer 108 and one or more residual-noise sensing locations 107, a path transfer function setting of a path transfer between acoustic transducer 108 and one or more noise sensing locations 105, a path transfer function setting of a path transfer function between acoustic transducer 108 and one or more monitoring locations 103, an acoustic pattern extractor setting, and/or a prediction filter setting, for example, based on a detected change, indicated by AAC information 129, in a temperature and/or a humidity level in the vehicle.

In some demonstrative aspects, AAC information 129 may include vehicular system information corresponding to a noise generating vehicular system of the vehicle, and AAC controller 102 may be configured to determine the sound control pattern for sound control signal 109, for example, based on the vehicular system information, e.g., as described below.

In some demonstrative aspects, AAC controller 102 may be configured to determine the sound control pattern for sound control signal 109, for example, based on the vehicular system information such that the sound control pattern is to reduce or eliminate noise from noise generating vehicular system in the sound control zone 110, e.g., as described below.

In some demonstrative aspects, the noise generating vehicular system may include, for example, an engine of the vehicle, tires of the vehicle, a braking system of the vehicle, a steering system of the vehicle, an air conditioning system of the vehicle, and/or any other system of the vehicle.

In some demonstrative aspects, AAC information 129 may include vehicular system setting information representing a setting of a vehicular system of the vehicle, e.g., as described below.

In some demonstrative aspects, AAC controller 102 may be configured to determine the sound control pattern based on the vehicular system setting information, e.g., as described below.

In some demonstrative aspects, AAC controller 102 may be configured to determine a first sound control pattern for sound control signal 109, for example, based on AAC information 129 including first vehicular system setting information representing a first setting of the vehicular system, e.g., as described below.

In some demonstrative aspects, AAC controller 102 may be configured to determine a second sound control pattern, different from the first sound control pattern, for sound control signal 109, for example, based on AAC information 129 including second vehicular system setting information representing a second setting of the vehicular system different from the first setting of the vehicular system, e.g., as described below.

In some demonstrative aspects, AAC controller 102 may be configured to determine and/or set the sound control pattern for sound control signal 109, for example, based on a change in the vehicular system setting information representing a change in the setting of the vehicular system, e.g., as described below.

In some demonstrative aspects, AAC information 129 may include mode of operation information representing a mode of operation of a vehicular system of the vehicle, e.g., as described below.

In some demonstrative aspects, AAC controller 102 may be configured to determine the sound control pattern for sound control signal 109, for example, based on the mode of operation information, e.g., as described below.

In some demonstrative aspects, AAC controller 102 may be configured to determine a first sound control pattern for sound control signal 109, for example, based on AAC information 129 including first mode of operation information representing a first mode of operation of the vehicular system, e.g., as described below.

In some demonstrative aspects, AAC controller 102 may be configured to determine a second sound control pattern, different from the first sound control pattern, for sound control signal 109, for example, based on the AAC information 129 including second mode of operation information representing a second mode of operation of the vehicular system different from the first mode of operation of the vehicular system, e.g., as described below.

In some demonstrative aspects, AAC controller 102 may be configured to set the sound control pattern for sound control signal 109, for example, based on a change in the mode of operation information representing a change in the mode of operation of the vehicular system, e.g., as described below.

In some demonstrative aspects, AAC controller 102 may be configured to determine a sound control profile based on the AAC information 129, and to determine the sound control pattern for sound control signal 109, for example, based on the sound control profile, e.g., as described below.

In some demonstrative aspects, the sound control profile may include a setting of one or more sound control parameters, and AAC controller 102 may be configured to determine the sound control pattern for sound control signal 109, for example, based on the setting of the one or more sound control parameters, e.g., as described below.

In some demonstrative aspects, memory 198 may be configured to store a plurality of sound control profiles (AAC profiles) 199 corresponding to a plurality of sound control configurations, respectively, e.g., as described below.

In some demonstrative aspects, an AAC profile 199 corresponding to a particular sound control configuration may include, for example, a setting of one or more AAC parameters, for example, a prediction filter setting, a path transfer function setting, and/or an acoustic pattern extractor setting, corresponding to the particular sound control configuration, e.g., as described below.

In some demonstrative aspects, AAC controller 102 may be configured to select from the plurality of sound control profiles 198 a selected sound control profile based on the AAC information 129, and to determine the sound control pattern based on the selected sound control profile, e.g., as described below.

In some demonstrative aspects, controller 193 may be configured to determine the sound control pattern for sound control signal 109 based on the AAC information 129, for example, such that the sound control pattern is to control, reshape, reduce or eliminate in the at least one sound control zone 110 noise from one or more noise sources, e.g., as described below.

In one example, the AAC information 129 may include RPM information of the engine of the vehicle.

In one example, controller 193 may be configured to determine the sound control pattern for sound control signal 109, for example, based on the RPM information, for example, such that the sound control pattern is to reduce or eliminate noise from the engine and/or modify sound control pattern to improve the reduction of other noise sources in the at least one sound control zone 110.

In another example, controller 193 may be configured to determine and/or modify the sound control pattern for sound control signal 109, for example, based on the RPM information based on any other additional or alternative criteria, for example, to support control and/or reduction of one or more other sound patterns, e.g., to support reduction and/or elimination of noise from one or more other noise sources.

In another example, controller 193 may be configured to selectively and/or dynamically turn on/off, mute, and/or slow-down and/or halt (freeze) one or more AAC functionalities, for example, based on the AAC information 129, e.g., as described below.

In another example, controller 193 may be configured to selectively and/or dynamically turn on/off, mute, and/or slow-down and/or halt (freeze) one or more AAC functionalities, for example, based on the RPM information and/or any other type of information in AAC information 129, e.g., as described below.

In another example, the AAC information 129 may include window/roof information to indicate an open/close state of the windows and/or roof of the vehicle, and/or a roof type of the roof, e.g., a metal roof or a panoramic roof. For example, controller 193 may be configured to determine the sound control pattern for sound control signal 109, for example, based on the window/roof information, for example, such that the sound control pattern is to reduce or eliminate in the at least one sound control zone 110 external noise from an environment of the vehicle, e.g., wind noise, road noise and the like.

In another example, the AAC information 129 may include road detection information corresponding to a road detection system of the vehicle. For example, controller 193 may be configured to determine the sound control pattern for sound control signal 109, for example, based on the road detection information, for example, such that the sound control pattern is to reduce or eliminate in the at least one sound control zone 110 external noise from an environment of the vehicle, e.g., based on a road type indicated by the road detection information.

In another example, the AAC information 129 may include tire information corresponding to a tire system of the vehicle. For example, controller 193 may be configured to determine the sound control pattern for sound control signal 109, for example, based on the tire information, for example, such that the sound control pattern is to reduce or eliminate noise from the tires in the at least one sound control zone 110, for example, based on pressure of one or more tires of the vehicle, and/or a type and/or size of one or more tires of the vehicle.

In another example, the AAC information 129 may include climate information corresponding to a climate outside the vehicle. For example, controller 193 may be configured to determine the sound control pattern for sound control signal 109, for example, based on the climate information, for example, such that the sound control pattern is to reduce or eliminate in the at least one sound control zone 110 external noise from an environment of the vehicle, e.g., rain noise, wind noise, road noise, and/or any other noise.

In another example, the AAC information 129 may include steering information corresponding to a steering system of the vehicle. For example, controller 193 may be configured to determine the sound control pattern for sound control signal 109, for example, based on the steering information, for example, such that the sound control pattern is to reduce or eliminate in the at least one sound control zone 110 external noise from an environment of the vehicle, for example, based on an angle of a steering wheel of the vehicle, e.g., a left/right steering angle.

In another example, the AAC information 129 may include braking system information to indicate an operational state of a main braking system, an emergency braking system, an Anti-lock braking system (ABS), and/or any other breaking system of the vehicle. For example, controller 193 may be configured to determine the sound control pattern for sound control signal 109, for example, based on the braking system information, for example, such that the sound control pattern is to reduce or eliminate in the at least one sound control zone 110 external noise from an environment of the vehicle, for example, based on the operational state of the breaking system.

In some demonstrative aspects, AAC controller 193 may be configured to determine and/or set, e.g., in real time, the sound control pattern to be provided to acoustic transducer 108, e.g., via sound control signal 109, for example, based on the AAC information 129, e.g., as described below.

In some demonstrative aspects, AAC controller 193 may be configured to determine and/or set, e.g., in real time, the sound control pattern to be provided to acoustic transducer 108, e.g., via sound control signal 109, for example, by selectively generating the sound control signal 109 and/or selectively providing the sound control signal 109 to acoustic transducer 108, e.g., as described below.

In some demonstrative aspects, AAC controller 193 may be configured to determine and/or set, e.g., in real time, the sound control pattern to be provided to acoustic transducer 108, e.g., via sound control signal 109, for example, by selecting whether or not to provide the sound control signal 109 to acoustic transducer 108, e.g., as described below.

In some demonstrative aspects, AAC controller 193 may be configured to mote, for example to dynamically and/or selectively mute, e.g., in real time, the sound control pattern to be provided to acoustic transducer 108, e.g., via sound control signal 109, and/or to reduce, for example to dynamically and/or selectively dynamically reduce, e.g., in real time, the level of the sound control pattern to be provided to acoustic transducer 108, e.g., via sound control signal 109, for example, based on the AAC information 129, e.g., as described below.

In some demonstrative aspects, AAC controller 193 may be configured to dynamically identify based on AAC information 129, e.g., in real time, one or more predefined situations ("mute situations") in which the sound control pattern to be provided to acoustic transducer 108, e.g., via sound control signal 109, is to be muted or to be set to a reduced level, e.g., as described below.

In some demonstrative aspects, AAC controller 193 may be configured to mute or reduce a level of the sound control pattern to be provided to acoustic transducer 108, e.g., via sound control signal 109, for example, based on identification of a predefined mute situation, e.g., as described below.

In some demonstrative aspects, AAC controller 193 may be configured to mute the sound control pattern to be provided to acoustic transducer 108, e.g., via sound control signal 109, for example, by setting a Prediction Filter (PF) to zero, e.g., as described below.

In some demonstrative aspects, AAC controller 193 may be configured to mute the sound control pattern to be provided to acoustic transducer 108, e.g., via sound control signal 109, for example, by setting the input from the reference sensors 104 to zero, e.g., as described below.

In some demonstrative aspects, AAC controller 193 may be configured to mute the sound control pattern to be provided to acoustic transducer 108, e.g., via sound control signal 109, for example, by setting the sound control signal 109 to zero, e.g., as described below.

In some demonstrative aspects, AAC controller 193 may be configured to mute the sound control pattern to be provided to acoustic transducer 108, e.g., via sound control signal 109, for example, by selecting not to call an AAC function for generating the sound control pattern, e.g., as described below.

In some demonstrative aspects, AAC controller 193 may be configured to mute the sound control pattern to be provided to acoustic transducer 108, e.g., via sound control signal 109, for example, by selectively zeroing some or all of the inputs and/or outputs of the acoustic pattern extractor, e.g., as described below.

In some demonstrative aspects, AAC controller 193 may be configured to mute the sound control pattern to be provided to acoustic transducer 108, e.g., via sound control signal 109, for example, based on any other additional or alternative setting and/or mechanism.

In some demonstrative aspects, AAC information 129 may include speech detection information to indicate detected speech of one or more passengers in the vehicle.

In some demonstrative aspects, information sources 120 may include a speech detector to generate the speech detection information.

In one example, the speech detector may be configured to generate the speech detection information, for example, based on acoustic information from the reference acoustic sensors 104 and/or the monitoring acoustic sensors.

In another example, the speech detector may be configured to generate the speech detection information, for example, based on acoustic information from one or more other acoustic sensors, e.g., dedicated speech detection sensors and/or any other dedicated or non-dedicated sensors.

In some demonstrative aspects, AAC controller 193 may be configured to mute the sound control pattern to be provided to acoustic transducer 108, e.g., via sound control signal 109, for example, based on identifying that AAC information 129 indicates the detection of speech.

In some demonstrative aspects, AAC information 129 may include audio information corresponding to audio to be heard in the vehicle.

In some demonstrative aspects, information sources 120 may include an audio source or audio controller to provide and/or control the audio to be heard in the vehicle.

In some demonstrative aspects, AAC controller 193 may be configured to selectively set one or more AAC parameters for generating the sound control signal 109, for example, based on the audio information.

In some demonstrative aspects, AAC controller 193 may be configured to selectively set one or more AAC parameters for generating the sound control signal 109, for example, based on an audio level and/or equalization level of the audio to be heard in the vehicle.

In some demonstrative aspects, AAC controller 193 may be configured to mute the sound control pattern to be provided to acoustic transducer 108, e.g., via sound control signal 109, for example, based on a level of an output of the acoustic transducer 108. For example, AAC controller 193 may be configured to mute the sound control pattern to be provided to acoustic transducer 108, e.g., via sound control signal 109, for example, based on a detection that the output level of the acoustic transducer 108 is greater than a predefined threshold ("max speaker threshold"), and/or based on a detection that the output level of the acoustic transducer 108 is less than a predefined threshold ("min speaker threshold").

In some demonstrative aspects, AAC controller 193 may be configured to mute the sound control pattern to be provided to acoustic transducer 108, e.g., via sound control signal 109, for example, based on a level of a noise input 104. For example, AAC controller 193 may be configured to mute the sound control pattern to be provided to acoustic transducer 108, e.g., via sound control signal 109, for example, based on a detection that the level of the noise input 104 is greater than a predefined threshold ("max ref. threshold"), and/or based on a detection that the level of the noise input 104 is less than a predefined threshold ("min ref. threshold").

In some demonstrative aspects, AAC controller 193 may be configured to mute the sound control pattern to be provided to acoustic transducer 108, e.g., via sound control signal 109, for example, based on a level of a residual-noise input 106. For example, AAC controller 193 may be configured to mute the sound control pattern to be provided to acoustic transducer 108, e.g., via sound control signal 109, for example, based on a detection that the level of the residual-noise input 106 is greater than a predefined threshold ("max residual threshold"), and/or based on a detection that the level of the residual-noise input 106 is less than a predefined threshold ("min residual threshold").

In some demonstrative aspects, AAC controller 193 may be configured to mute the sound control pattern to be provided to acoustic transducer 108, e.g., via sound control signal 109, for example, based on a level of a monitoring input corresponding to monitoring location 103. For example, AAC controller 193 may be configured to mute the sound control pattern to be provided to acoustic transducer 108, e.g., via sound control signal 109, for example, based on a detection that the level of the monitoring is greater than a predefined threshold ("max monitoring threshold"), and/or based on a detection that the level of the monitoring input is less than a predefined threshold ("min monitoring threshold").

In some demonstrative aspects, AAC controller 193 may be configured to mute the sound control pattern to be provided to acoustic transducer 108, e.g., via sound control signal 109, for example, based on a determination that one or more acoustic sensors are faulty and/or malfunctioning.

In some demonstrative aspects, AAC controller 193 may be configured to detect that one or more acoustic sensors are faulty and/or malfunctioning, for example, based on AAC information 129.

In some demonstrative aspects, AAC controller 193 may be configured to mute the sound control pattern to be provided to acoustic transducer 108, e.g., via sound control signal 109, for example, based on a determination that one or more reference acoustic sensors 119 are faulty and/or malfunctioning.

In some demonstrative aspects, AAC controller 193 may be configured to detect the one or more reference acoustic sensors 119, which are faulty and/or malfunctioning, for example, based on the noise inputs 104 and/or based on any other information in AAC information 129.

In some demonstrative aspects, AAC controller 193 may be configured to mute the sound control pattern to be provided to acoustic transducer 108, e.g., via sound control signal 109, for example, based on a determination that one or more residual-noise acoustic sensors 121 are faulty and/or malfunctioning.

In some demonstrative aspects, AAC controller 193 may be configured to detect the one or more residual-noise acoustic sensors 121, which are faulty and/or malfunctioning, for example, based on the residual noise inputs 106 and/or based on any other information in AAC information 129.

In some demonstrative aspects, AAC controller 193 may be configured to mute the sound control pattern to be provided to acoustic transducer 108, e.g., via sound control signal 109, for example, based on the speed information corresponding to the speed of a vehicle including the sound control zone 110.

In one example, AAC controller 193 may be configured to mute the sound control pattern to be provided to acoustic transducer 108, e.g., via sound control signal 109, for example, based on a detection that the speed information indicates that the speed of the vehicle is above a predefined vehicle speed threshold and/or out of a predefined vehicle speed range.

In some demonstrative aspects, AAC controller 193 may be configured to mute the sound control pattern to be provided to acoustic transducer 108, e.g., via sound control signal 109, for example, based on the opening state information corresponding to the one or more openings of the vehicle including the sound control zone 110.

In one example, AAC controller 193 may be configured to mute the sound control pattern to be provided to acoustic transducer 108, e.g., via sound control signal 109, for example, based on a detection that the opening state information indicates that a door of the vehicle is open, a window is open, e.g., more than a predefined opening percentage, that the trunk of the vehicle is open, and/or that the roof of the vehicle is open, e.g., more than a predefined opening percentage.

In some demonstrative aspects, AAC controller 193 may be configured to mute the sound control pattern to be provided to acoustic transducer 108, e.g., via sound control signal 109, for example, based on the tire information corresponding to the tire system of the vehicle including the sound control zone 110.

In one example, AAC controller 193 may be configured to mute the sound control pattern to be provided to acoustic transducer 108, e.g., via sound control signal 109, for example, based on a detection that the tire information indicates that a tire pressure of one or more tires is not in a predefined range of tire pressures.

In some demonstrative aspects, AAC controller 193 may be configured to mute the sound control pattern to be provided to acoustic transducer 108, e.g., via sound control signal 109, for example, based on climate information corresponding to the climate in the vehicle including the sound control zone 110.

In one example, AAC controller 193 may be configured to mute the sound control pattern to be provided to acoustic transducer 108, e.g., via sound control signal 109, for example, based on a detection that the climate information indicates that the temperature in the vehicle is not in a predefined range of temperatures, and/or that a humidity level in the vehicle is not in a predefined range of humidity levels.

In some demonstrative aspects, AAC controller 193 may be configured to mute the sound control pattern to be provided to acoustic transducer 108, e.g., via sound control signal 109, for example, based on climate information corresponding to the climate outside the vehicle including the sound control zone 110.

In one example, AAC controller 193 may be configured to mute the sound control pattern to be provided to acoustic transducer 108, e.g., via sound control signal 109, for example, based on a detection that the climate information indicates that the temperature outside the vehicle is not in a predefined range of temperatures, and/or that a humidity level outside the vehicle is not in a predefined range of humidity levels.

In some demonstrative aspects, AAC controller 193 may be configured to mute the sound control pattern to be provided to acoustic transducer 108, e.g., via sound control signal 109, for example, based on the vehicular system information corresponding to the vehicular systems of the vehicle including the sound control zone 110.

In one example, AAC controller 193 may be configured to mute the sound control pattern to be provided to acoustic transducer 108, e.g., via sound control signal 109, for example, based on a detection that the vehicular system information indicates that an operation condition of a vehicular system is not in a predefined range of operation conditions.

In one example, AAC controller 193 may be configured to mute the sound control pattern to be provided to acoustic transducer 108, e.g., via sound control signal 109, for example, based on a detection that the vehicular system information indicates that the engine RPM is not in a predefined range of RPMs.

In one example, AAC controller 193 may be configured to mute the sound control pattern to be provided to acoustic transducer 108, e.g., via sound control signal 109, for example, based on a detection that the vehicular system information indicates that an operational condition of an air conditioning system of the vehicle is not in a predefined operational condition range and/or a blower speed of the air conditioning system of the vehicle is not in a predefined blower operational range.

In some demonstrative aspects, controller 193 may be configured to set the sound control pattern for sound control signal 109, for example, based on a change in the AAC information 129 representing a change in the acoustic configuration of the operation of the AAC system, e.g., as described below.

For example, controller 193 may be configured to monitor, e.g., to dynamically and/or continuously monitor, the AAC input 129 to detect, e.g., in real time, changes in the AAC information 129.

For example, controller 193 may be configured to update, e.g., to dynamically and/or continuously update, the sound control pattern for sound control signal 109, e.g., in real time, for example, based on the detected changes in the AAC information 129.

In some demonstrative aspects, AAC system 100 may include a Neural-Network-based (NN-based) AAC system, e.g., as described below.

In some demonstrative aspects, the NN-based AAC system may utilize one or more NNs, for example, to estimate and/or determine one or more parameters, outputs, functions, and/or the like, which may be used for determining, setting, and/or generating the sound control signal 109, e.g., as described below.

In some demonstrative aspects, AAC controller 102 may include a NN 150, which may be trained to generate an NN output 159 based on an NN input including the AAC configuration information 129, e.g., as described below.

In some demonstrative aspects, NN 150 may include a Deep NN (DNN), e.g., as described below. In other aspects, any other NN type, architecture, and/or topology may be used.

In some demonstrative aspects, AAC controller 102 may be configured to generate the sound control signal 109, for example, based on the NN output 159 of NN 150, e.g., as described below.

In some demonstrative aspects, NN 150 may be trained to generate the sound control pattern to control sound within the sound control zone 110, for example, based on the AAC information 129, e.g., as described below.

In some demonstrative aspects, NN 150 may be trained to generate the sound control pattern to control sound within the sound control zone 110, for example, based on the AAC information 129 and/or the plurality of the noise inputs 104, e.g., as described below.

In some demonstrative aspects, NN 150 may be trained to generate an NN output 159 based on an NN input including the AAC configuration information 129 and the plurality of noise inputs 104, e.g., as described below.

In some demonstrative aspects, NN 150 may be trained to generate the sound control pattern to control sound within the sound control zone 110, for example, based on the AAC information 129, the plurality of the noise inputs 104 and, optionally, the plurality of residual-noise inputs 106, e.g., as described below.

In some demonstrative aspects, NN 150 may be trained to generate the sound control pattern to control sound within the sound control zone 110, for example, based acoustic information corresponding to a plurality of acoustic sensing locations, e.g., as described below.

In some demonstrative aspects, the plurality of acoustic sensing locations may include one or more physical sensing locations of one or more physical acoustic sensors, e.g., as described below.

In some demonstrative aspects, the plurality of acoustic sensing locations may include one or more virtual sensing locations of one or more virtual acoustic sensors, e.g., as described below.

In some demonstrative aspects, the plurality of acoustic sensing locations may include one or more noise sensing locations, e.g., as described below.

In some demonstrative aspects, the plurality of acoustic sensing locations may include one or more residual noise sensing locations, e.g., as described below.

In some demonstrative aspects, the plurality of acoustic sensing locations may include one or more monitoring sensing locations, e.g., as described below.

In some demonstrative aspects, AAC controller 102 may be configured to apply a pre-calibrated canceling noise to the sound control pattern generated by NN 150. For example, the pre-calibrated canceling noise may be based on a filter calibration, e.g., an optimal filter calibration, for example, to reduce noise in the noise-control zone 110 (FIG. 2).

In some demonstrative aspects, NN 150 may be trained to generate the sound control pattern to control sound within the sound control zone 110, for example, based on the AAC information 129, the plurality of the noise inputs 104, e.g., corresponding to the noise sensing locations 105 and/or the monitoring locations 103, and/or the plurality of residual-noise inputs 106, e.g., corresponding to the residual-noise sensing locations 105, e.g., as described below.

In other aspects, NN 150 may be trained to generate the NN output 159 including a setting of one or more sound control parameters, which may be used for generating the sound control pattern to control sound within the sound control zone 110, e.g., as described below.

In some demonstrative aspects, NN 150 may be trained to generate the NN output 159 including a setting of one or more PF parameters and/or Transducer Transfer Function (TTF) parameters, e.g., Speaker Transfer Function (STF) parameters, for example, based on the AAC information 129, e.g., as described below.

Some demonstrative aspects are described herein with respect to an STF and/or STF parameters, e.g., corresponding to a speaker. These aspects may be implemented with respect to any other TTF and/or TTF parameters, e.g., corresponding to any other transducer.

In some demonstrative aspects, controller 193 may be configured to generate the sound control signal 109, for example, based on the setting of the one or more PF parameters and/or TTF parameters, e.g., STF parameters, e.g., as described below.

In some demonstrative aspects, an NN-based AAC system, e.g., AAC system 100, may be implemented to provide a technical solution to improve ANC performance, for example, at various conditions, for example, while supporting the use of a reduced, e.g., minimal, set of measured Transfer Functions (TFs), e.g., as described below.

In some demonstrative aspects, an NN-based AAC system, e.g., AAC system 100, may be implemented to provide a technical solution to enable a fast adaptation of new ANC configurations, for example, by exploiting existing databases.

In some demonstrative aspects, an NN-based AAC system, e.g., AAC system 100, may be implemented to provide a technical solution to reduce, e.g., minimize, a number of required calibration tests of the NN-based AAC system, for example, by extrapolating estimated transfer functions from a minimal set of measured TFs.

In some demonstrative aspects, an NN-based AAC system, e.g., AAC system 100, may be implemented to provide a technical solution, which may be suitable for implementation with respect to a generic vehicle cabin configuration, e.g., a seat implementation, and/or to enable improvement of the NN-based AAC system, for example, by constant training.

In some demonstrative aspects, an NN-based AAC system, e.g., AAC system 100, may be implemented to provide a technical solution to utilize an activation function to extract performance from Non-Linear parts of a TF, for example, compared to other AAC systems, which may perform only on linear parts of the TFs between the reference microphones 119 and the error microphones 121.

In some demonstrative aspects, an NN-based AAC system, e.g., AAC system 100, may provide a technical solution to support robustness for dynamic scenarios. For example, the NN-based AAC system may be trained by multiple scenarios, e.g., even without increasing a size and/or complexity of the NN-based AAC system, for example, in terms of memory and/or space, e.g., compared to other AAC systems, which may require a different PF for each different scenario, e.g., different road types, temperatures, seat positions and/or the like.

In some demonstrative aspects, an NN-based AAC system, e.g., AAC system 100, may be implemented to provide a technical solution utilizing a number of parameters, which may be linearly-related to a number of input features and/or parameters, e.g., in AAC information 129. AAC systems implementing this linear-dependency may be advantageous, e.g., compared to other AAC systems, which may have a non-linear dependency, e.g., an exponential dependency, on the number of input features and/or parameters.

In some demonstrative aspects, an NN-based AAC system, e.g., AAC system 100, may be implemented to provide a technical solution, which may be used in real time environments, e.g., a real-time vehicle environment and/or any other environment, for example, to determine one or more parameters and/or settings of AAC system 100, e.g., as described below.

In some demonstrative aspects, an NN-based AAC system, e.g., AAC system 100, may be implemented to provide a technical solution, which may be configured to adapt to dynamic MTFs and/or dynamic TTFs, e.g., STFs, of the AAC system, e.g., as described below.

In some demonstrative aspects, an NN-based AAC system, e.g., AAC system 100, may be implemented to provide a technical solution, which may be based on a neural network architecture, which may, for example, span an acoustic space with input parameters and/or measured parameters as its axis, e.g., based on AAC information 129.

In one example, the NN 150 may be configured to utilize a NN input including the AAC information 129, an NN outer layer including an impulse response of noise sources, and/or an NN target function including, for example, a mean square error of an error microphone, e.g., in target zone 110, as described below.

In other aspects, any other NN architecture, NN outer layer, and/or NN target function may be utilized.

In some demonstrative aspects, NN 150 may be trained, for example, in a training/learning phase, for example, to determine the sound control signal 109, e.g., as described below.

In some demonstrative aspects, NN 150 may be trained, for example, in a training/learning phase, for example, to determine one or more parameters and/or functions, which may be utilized to determine the sound control signal 109, e.g., as described below.

In some demonstrative aspects, NN 150 may be trained, for example, in a training/learning phase, for example, to determine one or more parameters of a PF, which may be utilized to the sound control signal 109, e.g., as described below.

In some demonstrative aspects, NN 150 may be trained, for example, in a training/learning phase, for example, to determine one or more parameters of a TTF, e.g., an STF, of a transducer, e.g., transducer 108, e.g., as described below.

In some demonstrative aspects, NN 150 may be trained, for example, in a training/learning phase, for example, to determine a microphone transfer function of an error microphone, e.g., an error sensor 121, as described below.

In some demonstrative aspects, NN 150 may be trained, for example, in a training/learning phase, for example, to determine a microphone transfer function of a monitoring microphone, e.g., at a monitoring location 103, as described below.

In some demonstrative aspects, NN 150 may be trained, for example, in a training/learning phase, for example, to determine any other additional or alternative parameters, functions, and/or settings, which may be utilized to determine the sound control signal 109, e.g., as described below.

In some demonstrative aspects, NN 150 may be trained, for example, using real time training, for example, based on reinforcement learning, e.g., as described below.

In one example, the real-time training utilizing the reinforcement learning may be used, for example, to determine when to update the sound control pattern for sound control signal 109, e.g., as described below.

In another example, the real-time training utilizing the reinforcement learning may be used, for example, to provide a technical solution, which may be configured for production calibration and/or operation. For example, the real-time training utilizing the reinforcement learning may be used for one or more predictions, and/or to update the NN 150.

In some demonstrative aspects, an NN-based AAC system, e.g., AAC system 100, may be trained, configured and/or updated during one or more phases, e.g., as described below.

In some demonstrative aspects, an NN-based AAC system, e.g., AAC system 100, may be trained, configured and/or updated during a development phase, e.g., as described below.

In one example, the NN-based AAC system may be trained, e.g., during the development phase, for example, to determine one or more MTF and/or TTF, e.g., STF, parameters and/or settings, for example, based on one or more predefined and/or recorded signals, e.g., of a vehicle setting, for example, assuming a constant TTF, e.g., STF.

In one example, the NN-based AAC system may be tuned, for example, using reinforcement learning, e.g., for fine tuning of the NN-based AAC system during operation, e.g., during field and/or real time operation.

In some demonstrative aspects, the configuration of a NN of the NN-based AAC system, e.g., NN 150, may be set as a production NN, e.g., "frozen", for example, for production, e.g., after the fine tuning.

In some demonstrative aspects, an NN-based AAC system, e.g., AAC system 100, may be trained, configured and/or updated during a production phase, e.g., as described below.

In one example, the frozen NN configuration may be used as an initial NN for the ANC system, e.g., during the production phase. For example, an ANC system, e.g., ANC system 100, may be configured with an initial NN setting, e.g., which may include, or may be based on, a copy of the "frozen" NN, e.g., post fine tuning.

In some demonstrative aspects, an NN-based AAC system, e.g., AAC system 100, may be trained, configured and/or updated during real-time use, e.g., by a customer. In one example, weights of NN 150 may be updated, e.g., slowly, for example, using reinforcement learning. For example, the weights of the NN 150 may be updated to compensate for changes in one or more TFs during the lifetime of an installed NN-based AA system, e.g., deformations, speaker degradations, and/or the like.

In some demonstrative aspects, NN 150 may be trained, for example, based on one or more AAC parameters corresponding to the NN-based AAC system 100, e.g., as described below.

In some demonstrative aspects, the AAC parameters for training the NN 150 may include one or more of the parameters described above with respect to AAC information 129.

In one example, the AAC parameters for training the NN 150 for a vehicular deployment of AAC system 100 may include, for example, one or more seat positions, seat occupation, back seat recline, a number of people in the vehicle, a road type, speed, climate information, and/or any other additional or alternative parameters.

In some demonstrative aspects, an NN-based AAC system, e.g., AAC system 100, may be implemented to provide a technical solution, which may be configured to support AAC with respect to multiple acoustic state scenarios, for example, to mitigate noise in a noise control zone, e.g., noise-control zone 110 (FIG. 2), e.g., as described below.

In one example, an AAC system may be configured to generate a noise canceling pattern for a given acoustic state. However, in some cases and/or scenarios, for example, in real-time implementations, there may be a need to provide a technical solution to support generation of the noise canceling pattern, e.g., with relatively high accuracy, for example, even with respect to multiple acoustic state scenarios, e.g., in which one or more acoustic setting may change.

In some demonstrative aspects, an NN-based AAC system, e.g., AAC system 100, may be implemented to provide a technical solution utilizing a NN, e.g., NN 150, which may be trained, for example, based on a relatively large amount of measured data. For example, in a vehicular implementation, a relatively large amount of measurements corresponding to an acoustic configuration in a car cabin may be easily accessible.

In some demonstrative aspects, changes in measured data corresponding to an acoustic configuration of an AAC system may be quantized to a final number of filters, for example, to support training of an NN-based AAC system, e.g., AAC system 100, in a feasible and/or relatively easy manner.

In some demonstrative aspects, an NN-based AAC system, e.g., AAC system 100, may be configured to provide a technical solution to support fast integration of one or more sensing abilities to be utilized as AAC assistance information, e.g., information 129, to the NN, e.g., NN 150. In one example, the sensing abilities may include, for example, input from a camera, CAN data, and/or any other sensor information, e.g., from one or more sensors in a car cabin.

Figure 3:
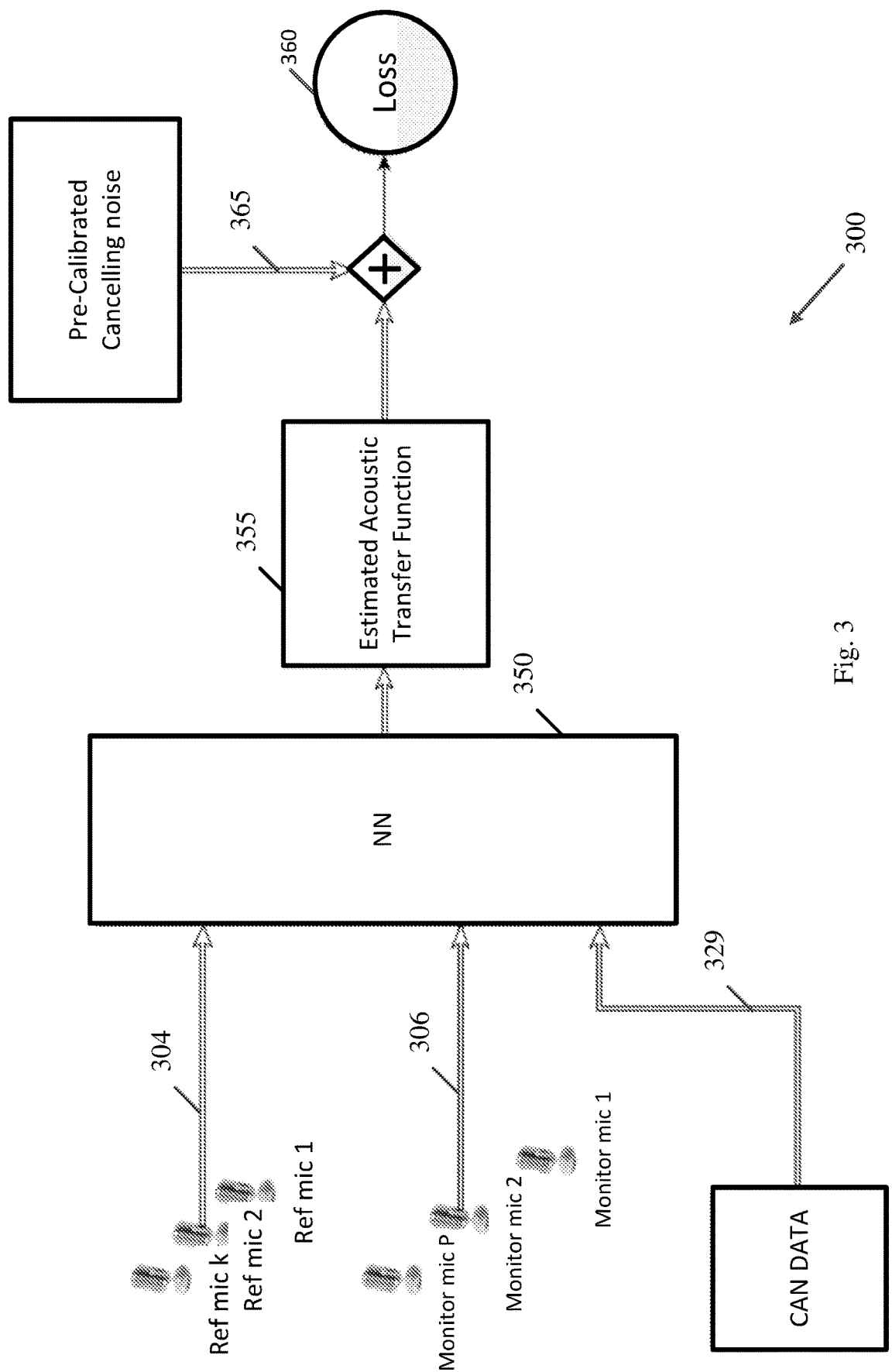
FIG. 3 is a schematic illustration of a training scheme to train a Neural-Network (NN) based AAC system, in accordance with some demonstrative aspects.

Reference is made to FIG. 3, which schematically illustrates a training scheme 300 to train an NN-based AAC system, in accordance with some demonstrative aspects.

In some demonstrative aspects, one or more settings of NN 150 (FIG. 1) may be trained according to one or more, e.g., some or all, operations of training scheme 300.

In some demonstrative aspects, as shown in FIG. 3, an NN 350 may be trained to generate a sound control pattern 355, e.g., as described below.

In some demonstrative aspects, as shown in FIG. 3, NN 350 may be trained to generate the sound control pattern 355, for example, based on AAC information 329, e.g., CAN data in a vehicle, a plurality of residual-noise inputs 306, and/or a plurality of noise inputs 304.

In some demonstrative aspects, as shown in FIG. 3, a loss function 360 may be determined, for example, based on the sound control pattern 355 and a predetermined sound control pattern 365. For example, the predetermined sound control pattern 365 may include a pre-calibrated canceling noise pattern, which may be set at a production and/or calibration phase of the NN-based ANC system, e.g., as described above.

In some demonstrative aspects, the loss function 360 may be determined, for example, based on a difference between the sound control pattern 355 and the predetermined sound control pattern 365, for example, based on a subtraction of the predetermined sound control pattern 365 from the sound control pattern 355. For example, the may include, and/or may represent, a calibration error to be utilized for training the NN 350.

Referring back to FIG. 1, in some demonstrative aspects, controller 193 may be configured to process the input information 195 to determine a sound control pattern to control sound within sound control zone 110, or example, based on the plurality of noise inputs 104, e.g., as described below.

In some demonstrative aspects, NN 150 may be trained to generate NN output 159 based on an NN input, which is based on the AAC configuration information 129, e.g., as described below.

In some demonstrative aspects, controller 193 may be configured to generate the sound control pattern to control acoustic transducers 108, for example, based on the NN output 159, e.g., as described below.

In some demonstrative aspects, input 191 may be configured to receive the AAC configuration information 129, for example, via a system bus of a vehicle including the sound control zone 110, e.g., as described above.

In some demonstrative aspects, input 191 may be configured to receive the AAC configuration information 129, for example, via at least one of CAN bus information received via a CAN bus of the vehicle, A2B bus information received via an A2B bus of the vehicle, MOST bus information received via a MOST bus of the vehicle, wireless communication information received over a wireless communication link, or Ethernet bus information received via an Ethernet bus of the vehicle, e.g., as described above. In other aspects, input 191 may be configured to receive the AAC configuration information 129 via any other additional or alternative input interface, network interface, and/or bus interface.

In some demonstrative aspects, NN 150 may be trained to generate NN output 159 based on the AAC configuration information 129 including information corresponding to a configuration of AAC in the sound control zone 110, e.g., as described below.

In some demonstrative aspects, NN 150 may be trained to generate NN output 159 based on the AAC configuration information 129 including information representing a spectral distribution of acoustic signals in at least one of the sound control zone 110 and/or an environment of the sound control zone 110, e.g., as described below.

In some demonstrative aspects, NN 150 may be trained to generate NN output 159 based on the AAC configuration information 129 including information representing one or more parameters affecting a real-time configuration of AAC in the sound control zone 110, e.g., as described below.

In some demonstrative aspects, NN 150 may be trained to generate NN output 159 based on the AAC configuration information 129 including information representing one or more physical properties of the sound control zone 110, e.g., as described below.

In some demonstrative aspects, NN 150 may be trained to generate NN output 159 based on the AAC configuration information 129 including information representing one or more acoustic properties of the sound control zone 110, e.g., as described below.

In some demonstrative aspects, NN 150 may be trained to generate NN output 159 based on the AAC configuration information 129 including information from one or more information sources 120, which are different from the one or more acoustic sensors of AAC system 100, for example, the acoustic sensors at noise sensing locations 105, residual-noise sensing location 107, and/or monitoring locations 103, e.g., as described below.

In some demonstrative aspects, NN 150 may be trained to generate NN output 159 based on the AAC configuration information 129 including information from one or more information sources 120, which are independent of the one or more acoustic sensors of AAC system 100, for example, the acoustic sensors at noise sensing locations 105, residual-noise sensing location 107, and/or monitoring locations 103, e.g., as described below.

In some demonstrative aspects, NN 150 may be trained to generate NN output 159 based on the AAC configuration information 129 including vehicle speed information corresponding to a speed of a vehicle including the sound control zone 110, e.g., as described below.

In some demonstrative aspects, NN 150 may be trained to generate NN output 159 based on the AAC configuration information 129 including engine information corresponding to an engine of a vehicle including the sound control zone 110, e.g., as described below.

In some demonstrative aspects, NN 150 may be trained to generate NN output 159 based on the AAC configuration information 129 including at least one of braking system information, road detection information, steering information, tire information, seat information, vehicle type information, and/or opening-state information, e.g., as described below.

For example, the braking system information may include information corresponding to a braking system of a vehicle including the sound control zone 110, e.g., as described above.

For example, the road detection information may include information from a road detection system of the vehicle including the sound control zone 110, e.g., as described above.

For example, the steering information may include information corresponding to a steering system of the vehicle including the sound control zone 110, e.g., as described above.

For example, the tire information may include information corresponding to one or more tires of the vehicle including the sound control zone 110, e.g., as described above.

For example, the seat information may include information corresponding to at least one of a position, for example, a location and/or an orientation, e.g., an angle, and/or occupancy of one or more seats of the vehicle including the sound control zone 110, e.g., as described above.

For example, the vehicle type information may include information corresponding to a type of the vehicle including the sound control zone 110, e.g., as described above.

For example, the opening-state information may include information corresponding to a state of an opening of the vehicle including the sound control zone 110, e.g., as described above.

In some demonstrative aspects, NN 150 may be trained to generate NN output 159 based on the AAC configuration information 129 including passenger information corresponding to one or more passengers of a vehicle including the sound control zone 110, e.g., as described below.

In some demonstrative aspects, NN 150 may be trained to generate NN output 159 based on the AAC configuration information 129 including audio-system information corresponding to an audio-system of a vehicle including the sound control zone 110, e.g., as described below.

In some demonstrative aspects, NN 150 may be trained to generate NN output 159 based on the AAC configuration information 129 including climate information corresponding to at least one of a climate inside the sound control zone 110 or a climate outside the sound control zone 110, e.g., as described below.

In some demonstrative aspects, NN 150 may be trained to generate NN output 159 based on the AAC configuration information 129 including user position information corresponding to a position of at least one of a head or an ear of a user in the sound control zone 110, e.g., as described below.

In some demonstrative aspects, NN 150 may be trained to generate NN output 159 based on the AAC configuration information 129 including user identity information corresponding to an identity of a user to control a user preference with respect to the sound control zone 110, e.g., as described below.

In some demonstrative aspects, NN 150 may be trained to generate NN output 159 based on the AAC configuration information 129 including vehicular system configuration information corresponding to a configuration of a mode of operation of one or more vehicular systems of a vehicle including the sound control zone 110, e.g., as described below.

In some demonstrative aspects, NN 150 may be trained to generate NN output 159 based on the AAC configuration information 129 including vehicular sensor information from one or more vehicular sensors of a vehicle including the sound control zone 110, e.g., as described below.

In some demonstrative aspects, NN 150 may be trained to generate the NN output 159 based, for example, on the NN input including the AAC configuration information 129 and noise information based on the plurality of noise inputs 104, e.g., as described below.

In some demonstrative aspects, NN 150 may be trained to generate the NN output 159 including, for example, a setting of one or more AAC parameters, e.g., as described below.

In some demonstrative aspects, controller 193 may be configured to generate the sound control pattern to control the acoustic transducers 108, for example, based on the setting of the one or more AAC parameters, e.g., as described below.

In some demonstrative aspects, the setting of the one or more AAC parameters may include a setting of at least one of a prediction filter, and/or a path transfer function, e.g., as described below. In other aspects, the setting of the one or more AAC parameters may include a setting of any other additional or alternative parameters.

In some demonstrative aspects, NN 150 may include a Prediction Filter (PF) NN 152, which may be trained to generate the NN output 159 including a PF setting, for example, based on the NN input, e.g., as described below.

In some demonstrative aspects, controller 193 may be configured to generate the sound control pattern to control the acoustic transducers 108, for example, by applying to noise information a PF, which is configured according to the PF setting determined by PF NN 152, e.g., as described below.

In some demonstrative aspects, the noise information may be based, for example, on the plurality of noise inputs 104, e.g., as described below.

In some demonstrative aspects, controller 195 may be configured to generate the sound control pattern to control the acoustic transducers 108, for example, based on the input information 195 including noise error information, e.g., the residual noise input 106, representing a noise error at one or more error sensing locations, e.g., as described below.

In some demonstrative aspects, controller 193 may be configured to determine the noise information to which the PF is to be applied, for example, based on the noise error information 106, e.g., as described below.

In some demonstrative aspects, PF NN 152 may be trained to generate the NN output 159 including the PF setting, which may include, for example, a plurality of PF coefficients, e.g., as described below.

In some demonstrative aspects, PF NN 152 may be trained to generate the NN output 159 including the PF setting, which may include, for example, a weight vector representing the plurality of coefficients, e.g., as described below.

In other aspects, the PF NN 152 may be trained to generate the NN output 159 including other additional or alternative information to define the PF setting.

In some demonstrative aspects, controller 193 may include a parameter extractor, which may be configured to determine extracted AAC parameter information, for example, based on sensor information from one or more sensors, e.g., as described below.

In some demonstrative aspects, NN 150 may be trained to generate the NN output 159 based on the NN input including the extracted AAC parameter information, e.g., as described below.

In some demonstrative aspects, the parameter extractor may include a Principal Component Analysis (PCA) extractor, which may be configured to determine the extracted AAC parameter information, for example, based on PCA of the sensor information and/or based on PCA of AAC information 129, for example, in a time domain or in a frequency domain, e.g., as described below.

In some demonstrative aspects, controller 193 may include a parameter extractor, which may be configured to determine the extracted AAC parameter information, for example, based on acoustic sensor information from one or more acoustic sensors, e.g., as described below.

In some demonstrative aspects, the PCA extractor may be configured to determine the extracted AAC parameter information, for example, based on PCA of noise sensor information from one or more noise sensors, e.g., as described below.

In some demonstrative aspects, the PCA extractor may be configured to determine the extracted AAC parameter information, for example, based on PCA of residual noise sensor information from one or more residual noise sensors, e.g., as described below.

In some demonstrative aspects, the PCA extractor may be configured to determine the extracted AAC parameter information, for example, based on PCA of monitoring sensor information from one or more monitoring sensors, e.g., as described below.

In some demonstrative aspects, the PCA extractor may be configured to determine the extracted AAC parameter information, for example, based on PCA of virtual sensor information from one or more virtual sensors, e.g., as described below.

In some demonstrative aspects, the PCA extractor may be configured to determine the extracted AAC parameter information including, for example, at least one of road type information, cabin state information, passenger position information, vehicle system state information, noise characteristic information, and/or noise state information, e.g., as described below. In other aspects, the PCA extractor may be configured to determine the extracted AAC parameter information including any other additional or alternative type of information.

For example, the road type information may include information corresponding to a type of road traveled by a vehicle including the sound control zone 110.

For example, the cabin state information may include information corresponding to a state of a cabin of the vehicle including the sound control zone 110.

For example, the passenger position information may include information corresponding to a position of one or more passengers in the cabin of the vehicle including the sound control zone 110.

For example, the vehicle system state information may include information corresponding to a state of a system of the vehicle including the sound control zone 110.

For example, the noise characteristic information may include information representing one or more characteristics of noise to be mitigated.

In one example, the noise characteristic information may include information relating to a frequency band of the noise to be mitigated; a level of the noise to be mitigated; a type of the noise to be mitigated; a source of the noise to be mitigated; one or more dominant peaks of the noise to be mitigated, e.g., relative to one or more other nearby peaks or all range frequencies, for example, a peak at −200 hz>10 db, a peak above 100-400 hz or 30-1000 hz energy levels, or the like; and/or an increased level over time at a specific frequency of the noise to be mitigated, or the like.

For example, the noise state information may include information corresponding to a state of the noise to be mitigated.

In one example, the noise state information may include an indication whether the noise to be mitigated includes transient noise or non-transient noise, or the like.

In some demonstrative aspects, controller 193 may be configured to train the PF NN 152, for example, based a noise error at one or more error sensing locations, for example, one or more physical and/or virtual residual-noise sensing locations 107, e.g., as described below.

In some demonstrative aspects, controller 193 may be configured to configure the PF NN 152, for example, based on a Transducer Transfer Function (TTF) setting of a TTF between the plurality of acoustic transducers 108 and one or more acoustic sensing locations, e.g., as described below.

In some demonstrative aspects, the one or more acoustic sensing locations may include a physical-sensing location of a physical acoustic sensor. For example, controller 193 may be configured to configure the PF NN 152, for example, based on a TTF setting of a TTF between an acoustic transducer 108 and an acoustic sensor physically located at an acoustic sensing location, e.g., as described below.

In some demonstrative aspects, the one or more acoustic sensing locations may include a virtual-sensing location of a virtual acoustic sensor. For example, controller 193 may be configured to configure the PF NN 152, for example, based on a TTF setting of a TTF between an acoustic transducer 108 and a virtual acoustic sensor at a virtual acoustic sensing location, e.g., as described below.

In some demonstrative aspects, the one or more acoustic sensing locations may include a residual noise sensing location within the sound control zone 110. For example, controller 193 may be configured to configure the PF NN 152, for example, based on a TTF setting of a TTF between an acoustic transducer 108 and a residual noise sensing location 107.

In some demonstrative aspects, the one or more acoustic sensing locations may include a monitoring sensing location. For example, controller 193 may be configured to configure the PF NN 152, for example, based on a TTF setting of a TTF between an acoustic transducer 108 and a monitoring sensing location 103.

In some demonstrative aspects, the one or more acoustic sensing locations may include a noise sensing location external to the sound control zone 110. For example, controller 193 may be configured to configure the PF NN 152, for example, based on a TTF setting of a TTF between an acoustic transducer 108 and a noise sensing location 105.

In some demonstrative aspects, controller 193 may include a TTF NN 154, which may be trained to determine the TTF setting, for example, based on the AAC configuration information 129, e.g., as described below.

In some demonstrative aspects, controller 193 may be configured to train the TTF NN 154, for example, based on sensed acoustic information corresponding to the one or more acoustic sensing locations, e.g., as described below.

For example, the sensed acoustic information corresponding to the one or more acoustic sensing locations may include acoustic information sensed by a physical acoustic sensor at a physical acoustic sensing location.

For example, the sensed acoustic information corresponding to the one or more acoustic sensing locations may include virtual acoustic information sensed by a virtual acoustic sensor at a virtual acoustic sensing location.

In some demonstrative aspects, acoustic information, denoted ê, of a virtual acoustic sensor, denoted e, at a virtual residual-noise sensing location, may be determined, for example, based on acoustic information, denoted p, which may be sensed by a physical acoustic sensor, denoted P, at a physical sensing location, e.g., as described below.

In some demonstrative aspects, the acoustic information ê of the virtual acoustic sensor e may be determined, for example, based on the acoustic information sensed by the physical acoustic sensor P, for example, in response to a sound control pattern, denoted s, output by an acoustic transducer, denoted S, and a noise signal, denoted R, from a noise source, e.g., as sensed by a reference (noise) acoustic sensor, denoted r, at a noise sensing location, e.g., as described below.

In some demonstrative aspects, a signal, denoted Pmtf, representing the noise signal from the noise source as sensed by the physical acoustic sensor P may be determined, for example, by subtracting from the acoustic information p an effect of the sound control pattern s, e.g., as follows:

$$P_{MTF} = p(\text{what mic } P \text{ senses}) - s * STF_p$$

wherein $STF_p$ denotes a transfer function, e.g., fine-tuned and/or real-time transfer function, between the acoustic transducer S and the physical acoustic sensor P.

In some demonstrative aspects, the acoustic information ê of the virtual acoustic sensor e may be determined, for example, based on the signal Pmtf, e.g., as follows:

$$ê = e_{estimated} = P_{mTF} * \widetilde{P2Vm} + R * \widetilde{MTF}_v$$

wherein $\widetilde{P2Vm}$ denotes a transfer function, e.g., a pre-calibrated transfer function when the acoustic transducer S is inactive, between the physical acoustic sensor P and the virtual acoustic sensor e, and wherein $\widetilde{MTF}_v$ denotes a transfer function, e.g., a pre-calibrated transfer function, between the reference sensor r and the virtual acoustic sensor e.

In some demonstrative aspects, a PF setting, e.g., a PF setting of PF NN 152, may be determined, for example, according to a criterion, which may be based on the estimated acoustic information ê of the virtual acoustic sensor e.

In one example, a PF setting, e.g., a PF setting of PF NN 152, may be determined, for example, according to the following minimization criterion:

$$\text{Argmin}_{PF}(R * PF * \widetilde{STF}_e - ê)$$

wherein $\widetilde{STF}_e$ denotes a transfer function, e.g., a pre-calibrated transfer function, between the acoustic transducer S and the virtual acoustic sensor e.

In another example, a PF setting, e.g., a PF setting of PF NN 152, may be determined, for example, according to the following minimization criterion:

$$\text{Argmin}_{PF}(R * PF * STF_p * \widetilde{P2Vs} - ê)$$

wherein $\widetilde{P2Vs}$ denotes a transfer function, e.g., a pre-calibrated transfer function when the acoustic transducer S is active, between the physical acoustic sensor P and the virtual acoustic sensor e, and wherein $STF_p$ denotes a transfer function, e.g., fine-tuned and/or real-time transfer function, between the acoustic transducer S and the physical acoustic sensor P.

In another example, a PF setting, e.g., a PF setting of PF NN 152, may be determined, for example, according to the following minimization criterion:

$$\text{Argmin}_{PF}(R * PF * \widetilde{STFp} * \widetilde{P2Vs} - ê)$$

wherein $\widetilde{STFp}$ denotes a transfer function, e.g., a pre-calibrated transfer function, between the acoustic transducer S and the physical acoustic sensor P.

In some demonstrative aspects, controller 193 may include the parameter extractor, which may be configured to determine extracted AAC parameter information, for example, based on the AAC configuration information, e.g., as described below.

In some demonstrative aspects, controller 193 may be configured to provide the NN input to NN 150 including the extracted AAC parameter information, e.g., as described below.

In some demonstrative aspects, controller 193 may be configured to provide the NN input to NN 150 including noise error information representing a noise error at one or more error sensing locations, e.g., as described below.

In some demonstrative aspects, controller 193 may be configured to provide the NN input to NN 150 based on the noise error information, e.g., as described below.

In some demonstrative aspects, controller 193 may be configured to determine a setting of one or more sound control parameters by configuring an the input of NN 150 based on the AAC information 129, and to determine the sound control pattern based on the setting of the one or more sound control parameters, e.g., as described below.

In other aspects, controller 193 may be configured to determine the setting of the one or more sound control parameters based on any other additional or alternative criterion relating to AAC information 129.

In some demonstrative aspects, the setting of the one or more sound control parameters may include a PF setting for determining the sound control pattern, for example, based on the plurality of noise inputs 104 and/or the plurality of residual-noise inputs 106, e.g., as described below.

In some demonstrative aspects, the setting of the one or more sound control parameters may include a plurality of prediction filter coefficients to configure the PF to be applied for determining the sound control pattern based on the plurality of noise inputs 104 and/or the plurality of residual-noise inputs 106, e.g., as described below.

In some demonstrative aspects, the setting of the one or more sound control parameters may include a prediction filter weight vector to be applied for determining the sound control pattern based on the plurality of noise inputs 104 and/or the plurality of residual-noise inputs 106, e.g., as described below.

In some demonstrative aspects, the setting of the one or more sound control parameters may include one or more path transfer functions, e.g., including one or more TTFs, for example, Speaker Transfer Functions (STFs), to be applied for determining the sound control pattern based on the plurality of noise inputs 104 and/or the plurality of residual-noise inputs 106, e.g., as described below.

In other aspects, the setting of the one or more sound control parameters may include a setting of one or more additional or alternative parameters, weights, coefficients, and/or functions to be applied for determining the sound control pattern based on the plurality of noise inputs 104 and/or the plurality of residual-noise inputs 106.

In some demonstrative aspects, controller 193 may determine sound control signal 109, for example, by applying an estimation function and/or a prediction function on noise inputs 104 and/or residual-noise inputs 106, e.g., as described below.

In some demonstrative aspects, controller 193 may include an estimator (also referred to as a "prediction unit") configured to apply the estimation or prediction function to noise inputs 104 and/or residual-noise inputs 106, e.g., as described below.

In some demonstrative aspects, controller 193 may be configured to cause the estimator or prediction unit to utilize one or more prediction parameters, e.g., for the estimation function, for example, based on the AAC information 129, e.g., as described below.

In one example, controller 193 may be configured to determine a first set of prediction parameters for a first AAC configuration of AAC system 100, e.g., based on first AAC information 129.

In another example, controller 193 may be configured to determine a second set of prediction parameters for a second AAC configuration of AAC system 100, e.g., based on second AAC information 129.

In some demonstrative aspects, the prediction parameters may include weights, coefficients, functions, and/or any other additional or alternative parameter to be utilized for determining the sound control pattern, e.g., as described below.

In some demonstrative aspects, the prediction parameters may include one or more path transfer function parameters of the estimation or prediction function, e.g., as described below.

In one example, the prediction parameters may include one or more TTFs, e.g., STFs, to be applied by controller 193 for determining the sound control pattern. In one example, the TTFs, e.g., STFs, may include a representation of acoustic paths from one or more of the acoustic transducers 108 to one or more of the noise sensing locations 105, the monitoring locations 103, and/or the residual-noise sensing locations 107.

In other aspects, the prediction parameters may include any other additional or alternative parameters.

In some demonstrative aspects, controller 193 may be configured to determine, and/or set one or more of the TTFs, e.g., STFs, based on the AAC information 129, e.g., as described below.

In some demonstrative aspects, controller 193 may be configured to determine, and/or set one or more of the prediction parameters based the AAC information 129, e.g., as described below.

In some demonstrative aspects, NN 150 may be trained to generate the NN output 159 of NN 150 including a setting of one or more AAC parameters, and controller 193 may be configured to generate the sound control signal based on the setting of the one or more AAC parameters, e.g., as described below.

In some demonstrative aspects, NN 150 may be trained to generate the NN output 159 including a setting of a prediction filter, a setting of a path transfer function, e.g., a TTF or an STF, and/or a setting of any other parameter, which may be utilized for determining, generating, configuring, and/or setting the sound control signal 109 to control acoustic transducer 108, e.g., as described below.

In some demonstrative aspects, NN 150 may be trained to generate the NN output 159 to configure the setting of the prediction filter, for example, based on the AAC information 129.

In some demonstrative aspects, the PF NN 152 may be trained to generate a prediction filter setting of at least one prediction filter based on the AAC information 129, e.g., as described below.

In some demonstrative aspects, PF NN 152 may be trained to model changes in an inner cabin of a vehicle, e.g., in an improved manner.

In some demonstrative aspects, the PF NN 152 may be implemented to provide the prediction filter setting, for example, to provide a technical solution configured to generate the sound control signal 109, for example, with reduced computation complexity, e.g., compared to an NN-based AAC systems utilizing a NN trained to directly output the acoustic sound control pattern configured to control the sound within sound control zone 110.

In one example, it may be assumed that changes to the PF setting may occur relatively slowly, and, accordingly, a workload on PF NN 152 may be relatively low, e.g., in real-time operation. For example, AAC controller 193 may be configured to sample the PF NN 152, e.g., every few cycles, and to overwrite an existing PF setting with an updated PF setting output by the PF NN 152.

In some demonstrative aspects, prediction filter NN 152 may be trained to output a plurality of PF coefficients, e.g., in the form of a prediction filter weight vector, for example, based on the AAC information 129, e.g., as described below.

In some demonstrative aspects, controller 193 may be configured to determine the sound control signal 109, for example, by applying to the plurality of reference-noise inputs 104 a PF according to the prediction filter coefficients determined by the PF NN 152, e.g., as described below.

In some demonstrative aspects, prediction filter NN 152 may be trained to generate the prediction filter setting of the prediction filter, for example, based on a path transfer function, for example, a TTF, e.g., an STF, between acoustic transducer 108 and an acoustic sensing location, for example, a residual noise sensing location 107, a monitoring location 103, and/or a noise sensing location 105, e.g., as described below.

In some demonstrative aspects, prediction filter NN 152 may be trained to generate the prediction filter setting of the prediction filter, for example, based on a path transfer function, for example, a TTF, e.g., an STF, between acoustic transducer 108 and a residual noise sensing location 107, e.g., as described below.

In some demonstrative aspects, NN 150 may include an STF NN 154 trained to generate a TTF setting, e.g., an STF setting, for example, corresponding to the path transfer function between acoustic transducer 108 and the residual-noise sensing location 107, e.g., as described below.

In some demonstrative aspects, prediction filter NN 152 may be trained to generate the prediction filter setting of the prediction filter, for example, based on a path transfer function, for example, a TTF, e.g., an STF, between acoustic transducer 108 and a noise sensing location 105, e.g., as described below.

In some demonstrative aspects, TTF (STF) NN 154 may be trained to generate a TTF setting, e.g., an STF setting, for example, corresponding to the path transfer function between acoustic transducer 108 and the residual-noise sensing location 105, e.g., as described below.

In some demonstrative aspects, prediction filter NN 152 may be trained to generate the prediction filter setting of the prediction filter, for example, based on a path transfer function, for example, a TTF, e.g., an STF, between acoustic transducer 108 and a monitoring location 103, e.g., as described below.

In some demonstrative aspects, NN 150 may include an STF NN 154 trained to generate a TTF setting, e.g., an STF setting, for example, corresponding to the path transfer function between acoustic transducer 108 and the monitoring location 103, e.g., as described below.

In some demonstrative aspects, TTF (STF) NN 154 may be trained to generate the TTF setting, e.g., the STF setting, of the path transfer function, for example, based on the AAC information 129, e.g., as described below.

In some demonstrative aspects, AAC controller 102 may include an Acoustic Feedback (AFB) mitigator (also referred to as "AFB controller", "AFB canceller", Feedback Canceller (FBC)", "Echo mitigator", or "Echo canceller"), which may be configured to mitigate AFB between acoustic transducers 108 and one or more acoustic sensors of AAC system 100, for example, one or more of reference noise acoustic sensors 119 and/or residual-noise sensors 121, e.g., as described below.

In one example, the AFB mitigator may be configured to mitigate AFB between one or more acoustic transducers 108 and one or more reference noise acoustic sensors 119, e.g., as described below.

In another example, the AFB mitigator may be configured to mitigate AFB between one or more acoustic transducers 108 and one or more residual-noise sensors 121, e.g., as described below.

In some demonstrative aspects, controller 193 may be configured to generate an AFB mitigation signal, for example, by applying an AFB setting to an acoustic transducer signal, for example, an acoustic transducer signal 109 to be provided to the one or more acoustic transducers 108, e.g., as described below.

In some demonstrative aspects, the AFB setting may include a plurality of AFB mitigation coefficients to be applied to the acoustic transducer signal, for example, to generate the AFB mitigation signal.

In some demonstrative aspects, controller 193 may be configured to determine the sound control pattern to be applied to the transducers 108m for example, based on the AFB mitigation signal, e.g., as described below.

In some demonstrative aspects, controller 193 may be configured to determine an AFB-mitigated signal corresponding to a particular acoustic sensor signal, for example, by subtracting the AFB mitigation signal from the particular acoustic sensor signal an AFB mitigation signal corresponding to the particular acoustic sensor signal, e.g., as described below.

In one example, controller 193 may be configured to determine an AFB mitigation signal corresponding to a noise input 106 from a reference noise sensor 119, for example, by applying to the acoustic transducer signal 109 an AFB setting corresponding to the reference noise sensor 119 and the acoustic transducers 108.

For example, controller 193 may be configured to determine an AFB-mitigated signal corresponding to the noise input 106 from the reference noise sensor 119, for example, by subtracting from the noise input 106 the AFB mitigation signal corresponding to the noise input 106.

In another example, controller 193 may be configured to determine an AFB mitigation signal corresponding to residual-noise input 104 from a residual-noise sensor 121, for example, by applying to the acoustic transducer signal 109 an AFB setting corresponding to the residual-noise sensor 121 and the acoustic transducers 108.

For example, controller 193 may be configured to determine an AFB-mitigated signal corresponding to the residual-noise input 104 from the residual-noise sensor 121, for example, by subtracting from the residual-noise input 104 the AFB mitigation signal corresponding to the residual-noise input 104.

In some demonstrative aspects, one or more operations and/or functionalities of the AFB mitigator may be implemented by an AFB mitigation NN, e.g., as described below.

In some demonstrative aspects, NN 150 may include an AFB mitigation NN 155, which may be trained to generate the NN output 159 including an AFB setting, for example, based on the NN input, e.g., as described below.

In some demonstrative aspects, the AFB setting may include a plurality of AFB coefficients to be applied to an acoustic an acoustic transducer signal, for example, an acoustic transducer signal 109 to be provided to the one or more acoustic transducers 108, e.g., as described below.

In some demonstrative aspects, AFB NN 155 may be configured to provide a technical solution to adapt the AFB setting, for example, to changes in an acoustic medium between an acoustic transducer of AAC system 100, e.g., acoustic transducer 108, and an acoustic sensor of the AAC system 100, e.g., reference noise sensor 119 and/or residual-noise sensor 121, as descried below.

In some demonstrative aspects, AFB NN 155 may be trained to generate the AFB setting based, for example, on the AAC configuration information 129, e.g., as described below.

In some demonstrative aspects, controller 193 may be configured to determine an AAC profile based on the AAC information 129, e.g., as described below.

In some demonstrative aspects, controller 193 may be configured to determine the sound control pattern for sound control signal 109 based on the AAC profile, e.g., as described below.

In some demonstrative aspects, controller 193 may be configured to set one or more parameters and/or attributes of the NN 150, for example, based on the AAC profile, e.g., as described below.

In some demonstrative aspects, the AAC profile may include a setting of one or more sound control parameters, which may be utilized in determining the sound control pattern for sound control signal 109, e.g., as described below.

In some demonstrative aspects, controller 193 may be configured to determine the sound control pattern for sound control signal 109, for example, based on the setting of the one or more sound control parameters, e.g., as described below.

In some demonstrative aspects, memory 198 may be configured to store a plurality of AAC profiles 199, e.g., as described below.

In some demonstrative aspects, an AAC profile 199 may include a setting of one or more sound control parameters corresponding to an AAC operational configuration of AAC system 100, e.g., as described below.

In one example, a first AAC profile 199 may correspond to a first AAC operation configuration of AAC system 100. According to this example, a first AAC profile 199 corresponding to the first AAC operation configuration of AAC system 100 may include, for example, a first setting of one or more sound control parameters. For example, the first setting of the one or more sound control parameters may be configured for sound control to be applied, e.g., when AAC system 100 is operated at a first operational condition.

In another example, a second AAC profile 199 may correspond to a second AAC operation configuration of AAC system 100. According to this example, a second AAC profile 199 corresponding to the second AAC operation configuration of AAC system 100 may include, for example, a second setting of one or more sound control parameters, e.g., different from the first setting. For example, the second setting of the one or more sound control parameters may be configured for sound control to be applied, e.g., when AAC system 100 is operated at a second operational condition, e.g., different from the first operational condition.

In some demonstrative aspects, controller 193 may be configured to select from the plurality of AAC profiles 199 a selected AAC profile, for example, based on the AAC information 129, and to determine the sound control pattern for the sound control signal 109, for example, based on the selected AAC profile, e.g., as described below.

In some demonstrative aspects, AAC profiles 199 may include one or more user-based profiles corresponding to one or more users, e.g., as described below.

In some demonstrative aspects, a user-based profile corresponding to a user may include, for example, a setting of one or more sound control parameters based on a preference of the user, e.g., as described below.

In some demonstrative aspects, the user-based profile may correspond to a user, which may be allowed to control a user preference with respect to the sound control zone 110, e.g., as described above.

In one example, a user-based profile may correspond to a user of the sound control zone 110. For example, a user-based profile of a driver of a vehicle may include, for example, a setting of one or more sound control parameters based on a preference of the driver with respect to the sound control zone 110 implemented with respect to a driver seat of the vehicle.

In another example, a user-based profile may correspond to a first user to control a user preference with respect to the sound control zone 110, which may be used by a second user. For example, the user-based profile of the driver of the vehicle may include, for example, a setting of one or more sound control parameters based on a preference of the driver with respect to the sound control zone 110 implemented with respect to one or more passenger seats of the vehicle.

In some demonstrative aspects, the AAC information 129 may include user identity information corresponding to an identity of a user, and controller 193 may select from the plurality of AAC profiles 199 a selected user-based profile based on the user identity information.

In one example, AAC profiles 199 may include a user-based profile corresponding to a driver of a vehicle. For example, the controller 193 may be configured to identify the identity information corresponding to the driver of the vehicle, for example, based on AAC information 129, e.g., received from a system of the vehicle. For example, controller 193 may select from the plurality of AAC profiles 199 a selected user-based profile corresponding to the driver, for example, based on the user identity information corresponding to the driver.

For example, a user-based profile corresponding to the driver may include information to define a setting of one or more sound control parameters for sound control zone 110 based on a preference of the driver.

In one example, the user-based profile corresponding to the driver may include information to define a setting of one or more sound control parameters for a driver sound control zone 110 corresponding to a seat of the driver. In another example, the user-based profile corresponding to the driver may include information to define a setting of one or more sound control parameters for a passenger sound control zone 110 corresponding to a seat of a passenger in the vehicle.

In some demonstrative aspects, controller 193 may be configured to determine the sound control pattern for the sound control signal 109 corresponding to the sound control zone 110, for example, based on setting of one or more sound control parameters for the sound control zone 110, e.g., according to the user-based profile corresponding to the driver.

Figure 4:
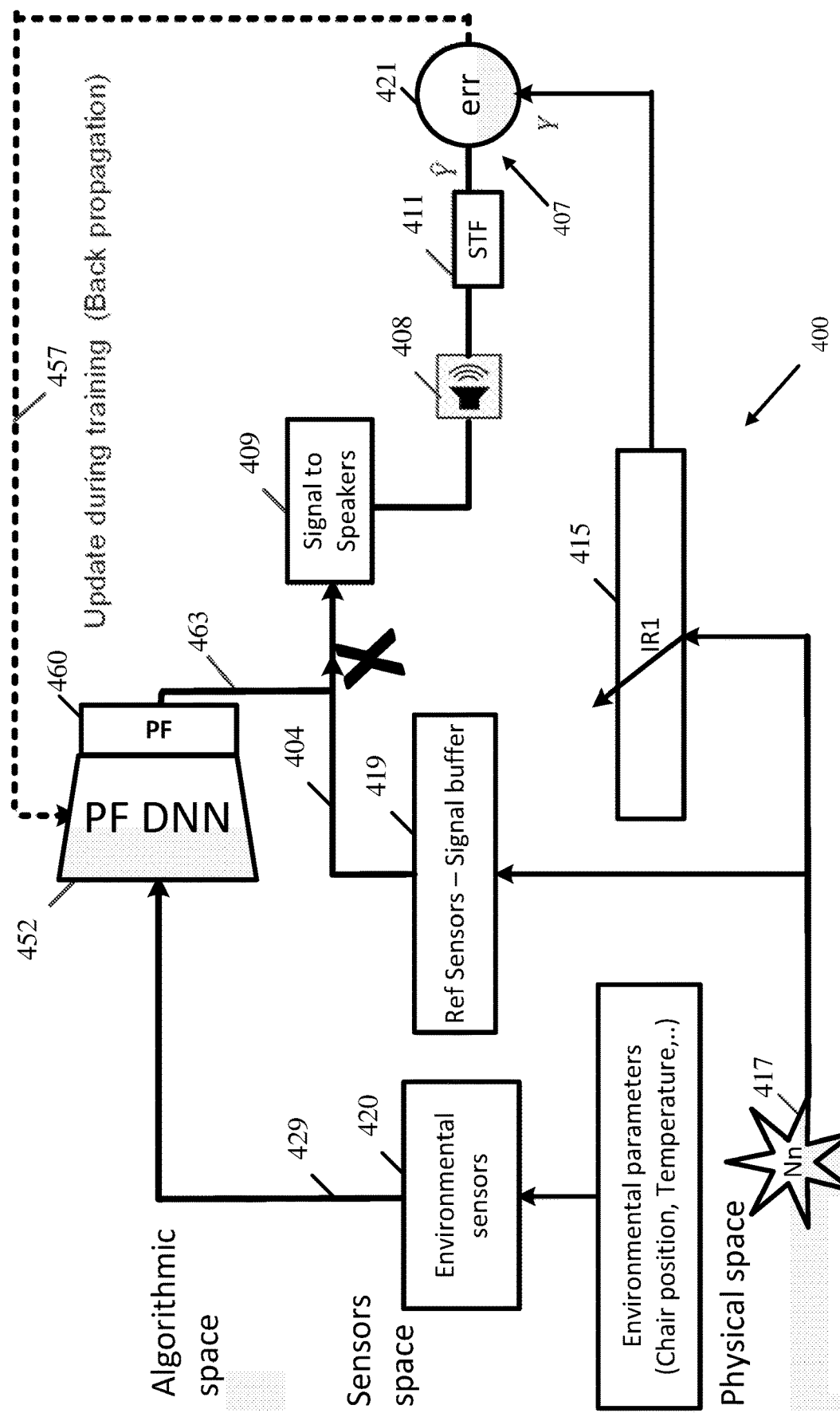
FIG. 4 is a schematic block diagram illustration of an NN-based AAC system, in accordance with some demonstrative aspects.

Reference is made to FIG. 4, which schematically illustrates an NN-based AAC system 400, in accordance with some demonstrative aspects.

For example, AAC system 100 (FIG. 1) may include one or more elements of AAC system 400 and/or may perform one or more operations and/or functionalities of AAC system 400.

In some demonstrative aspects, as shown in FIG. 4, AAC system 400 may include a PF NN 452, e.g., a PF DNN, trained to generate a PF setting of a prediction unit 460.

For example, PF NN 152 (FIG. 1) may include one or more elements of PF NN 452 and/or may perform one or more operations and/or functionalities of PF NN 452.

In some demonstrative aspects, as shown in FIG. 4, prediction unit 460 may be configured to predict and/or estimate an estimation function or a prediction function 463 to be applied to one or more noise inputs 404, for example, to generate a sound control pattern 409, e.g., as described below.

In some demonstrative aspects, as shown in FIG. 4, noise inputs 404 may be provided by one or more acoustic sensors 419, and may represent acoustic noise from at least one noise source 417. For example, acoustic sensors 419 may include one or more elements of noise sensors 119 (FIG. 1) and/or may perform one or more operations and/or functionalities of noise sensors 119 (FIG. 1).

In some demonstrative aspects, as shown in FIG. 4, sound control pattern 409 may be configured to control at least one acoustic transducer 408. For example, acoustic transducer 408 may include one or more elements of the one or more acoustic transducers 108 (FIG. 1) and/or may perform one or more operations and/or functionalities of the one or more acoustic transducers 108 (FIG. 1).

In some demonstrative aspects, as shown in FIG. 4, PF NN 452 may be configured to generate the PF setting of a prediction unit 460, for example, based on an NN input, which may include AAC information 429 from one or more information sources 420, e.g., environmental sources and/or any other sources. For example, AAC information 429 may include AAC information 129 (FIG. 1) from information sources 120 (FIG. 1).

In some demonstrative aspects, PF NN 452 may be trained to generate the PF setting for the prediction unit 460, for example, based on the AAC information 429.

In some demonstrative aspects, the noise inputs 404 and the AAC information 429 may be used as inputs to NN-based AAC system 400.

In some demonstrative aspects, an output of AAC system 400 may include the sound control pattern 409, e.g., which may be configured to mitigate noise from noise source 417, e.g., at the error sensing location 421.

In some demonstrative aspects, the PF NN 452 may be trained and/or calibrated, for example, based on a noise error, e.g., as described below.

In some demonstrative aspects, a noise error at an error sensing location 407 may be based, for example, on a difference between a noise signal, denoted Y, at the error sensing location 407, and an acoustic sound control pattern, denoted $\hat{Y}$, at the error sensing location 407.

In some demonstrative aspects, the acoustic sound control pattern $\hat{Y}$ at error sensing location 407 may be based on the sound control pattern 409 and a TTF (STF) 411 between acoustic transducer 408 and error sensing location 407.

In some demonstrative aspects, the noise signal Y at error sensing location 407 may be based on an impulse response 415, e.g., of an acoustic channel between noise source 417 and the error sensing location 407.

In some demonstrative aspects, the error sensing location 407 may include an error sensing location in a sound control zone, e.g., the sound control zone 110 (FIG. 2).

In one example, the noise error at the error sensing location 407 may be sensed by one or more residual noise sensors, e.g., residual noise sensors 121 (FIG. 1). For example, monitoring microphones, e.g., error microphones 121 (FIG. 1), may be implemented to sense a noise error, e.g., which may result from changes in acoustics of the NN-based AAC system 400, e.g., acoustic changes in a vehicle cabin implementing NN-based AAC system 400.

In another example, the noise error at the error sensing location 407 may a virtual residual noise, e.g., virtually sensed by a virtual sensor, at the error sensing location 407. For example, the noise error at the error sensing location 407 may be determined based on noise sensed by a monitoring sensor at a monitoring location, e.g., a monitoring location 103 (FIG. 1).

In some demonstrative aspects, PF NN 452 may be trained, for example, based on an error signal 457, which may correspond to the noise error at error sensing location 407.

In some demonstrative aspects, a residual noise sensor 421, e.g., an error microphone, may be configured to generate error signal 457, for example, during training of the PF NN 452. In other aspects, the error signal 457 may be determined based on a virtual acoustic signal of a virtual acoustic sensor at the error sensing location 407, e.g., as described above.

In some demonstrative aspects, for example, during training of the PF NN 452, a predefined noise pattern 417 may be generated, a predefined setting of AAC information 429 may be provided as the NN input to PF NN 452, and the error signal 457 may be determined.

In some demonstrative aspects, for example, during training of the PF NN 452, determination of the error signal 457 may be repeated, for example, for multiple different predefined noise patterns 417 and/or multiple different predefined settings of AAC information 429.

In some demonstrative aspects, for example, during training of the PF NN 452, the PF NN 452 may be trained, for example, based on a training criterion to minimize, or eliminate, the error signal 457.

Figure 5:
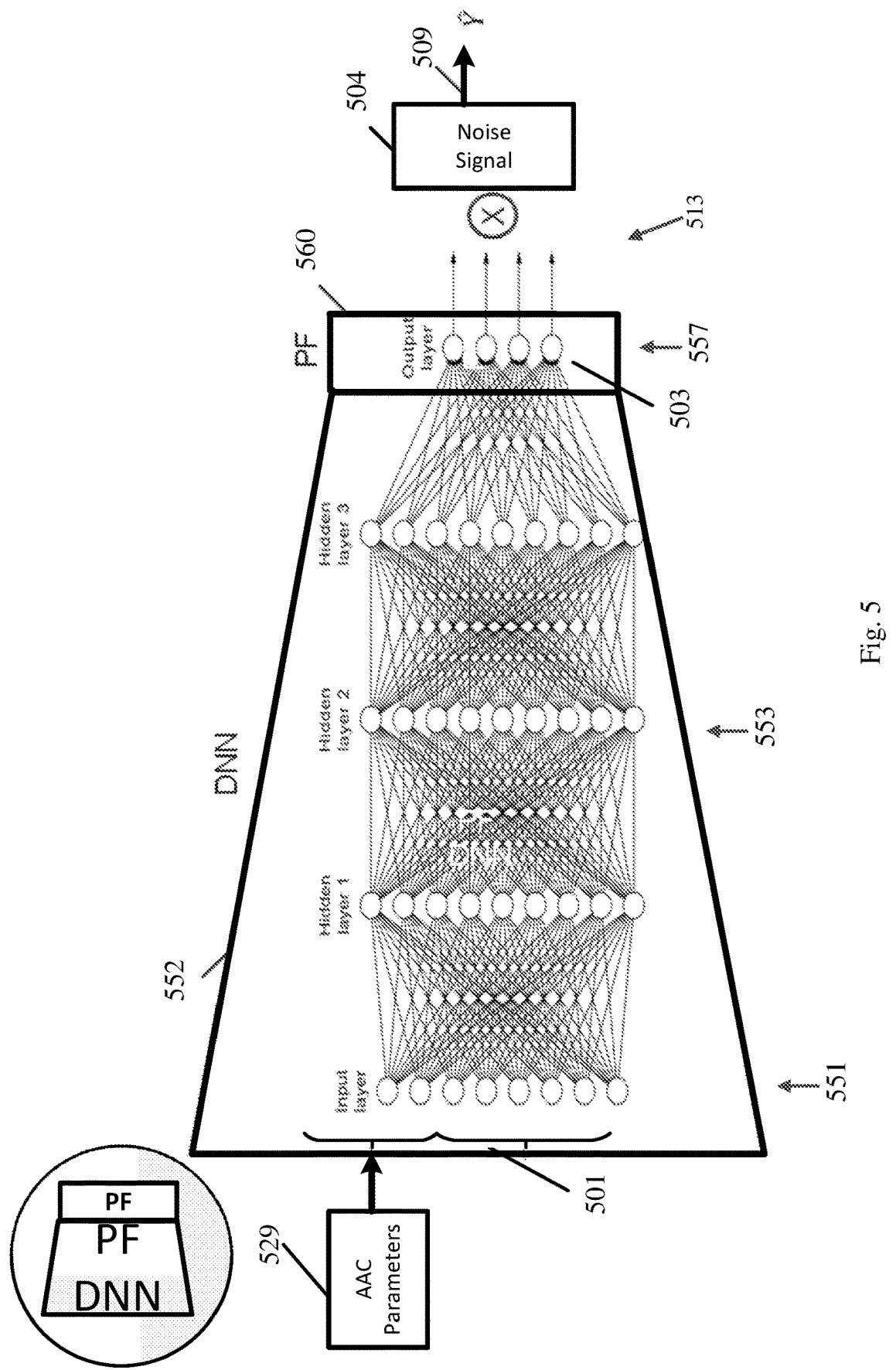
FIG. 5 is a schematic block diagram illustration of an NN-based Prediction Filter (PF), in accordance with some demonstrative aspects.

Reference is made to FIG. 5, which schematically illustrates an NN-based PF including a PF NN 552 to configure a setting of a prediction unit 560, in accordance with some demonstrative aspects.

For example, PF NN 452 (FIG. 4) may include one or more elements of PF NN 552 and/or may perform one or more operations and/or functionalities of PF NN 552; and/or prediction unit 460 (FIG. 4) may include one or more elements of prediction unit 562 and/or may perform one or more operations and/or functionalities of prediction unit 560.

In some demonstrative aspects, PF NN 552 may be trained to generate an NN output 503 including a PF setting for the prediction unit 560.

For example, PF NN 552 may be trained to generate the NN output 503 including a plurality of PF coefficients of a prediction function to be applied by the prediction unit 560. For example, PF NN 552 may be trained to generate the NN output 503 including a weight vector representing the plurality of PF coefficients.

In some demonstrative aspects, as shown in FIG. 5, prediction unit 560 may be configured to predict and/or estimate a prediction function 513 to be applied to a noise input 504, for example, to generate a sound control pattern 509.

In some demonstrative aspects, as shown in FIG. 5, PF NN 552 may be configured to generate the PF setting for the prediction unit 560, for example, based on an NN input 501, e.g., as described below.

In some demonstrative aspects, the NN input 501 may be configured to receive AAC information 529, e.g., from one or more information sources. For example, AAC information 529 may include AAC information 129 (FIG. 1) from information sources 120 (FIG. 1).

In some demonstrative aspects, AAC information 529 may include one or more vehicle/cabin parameters corresponding to a setting in a vehicle cabin, for example, in a vehicular AAC implementation, e.g., as described above.

In one example, AAC information 529 may include seat position information ("chair location") corresponding to a positioning of a driver seat and/or a positioning of one or more passenger seats in the vehicle cabin, e.g., as described above.

In another example, AAC information 529 may include temperature information corresponding to a temperature inside the vehicle cabin and/or a temperature outside the vehicle cabin, e.g., as described above.

In other aspects, AAC information 529 may include any other additional or alternative information, e.g., as described above.

In some demonstrative aspects, PF NN 552 may be trained to generate the NN output 513 including the PF setting for the prediction unit 560, for example, based on the AAC information 529.

In some demonstrative aspects, as shown in FIG. 5, PF NN 552 may include a plurality of layers including an input layer 551, a plurality of hidden layers 553, and an output layer 557.

In some demonstrative aspects, as shown in FIG. 5, the plurality of layers of PF NN 552 may be connected via a plurality of edges/nodes.

In some demonstrative aspects, as shown in FIG. 5, input layer 551 may be configured to receive the AAC information 529.

In some demonstrative aspects, as shown in FIG. 5, output layer 557 may be configured to provide the PF setting to prediction unit 560, for example, based on the AAC information 529.

In some demonstrative aspects, as shown in FIG. 5, an acoustic sound control pattern, denoted $\hat{Y}$, may be determined, for example, by applying the prediction function 503 to the noise input 504.

Figure 6:
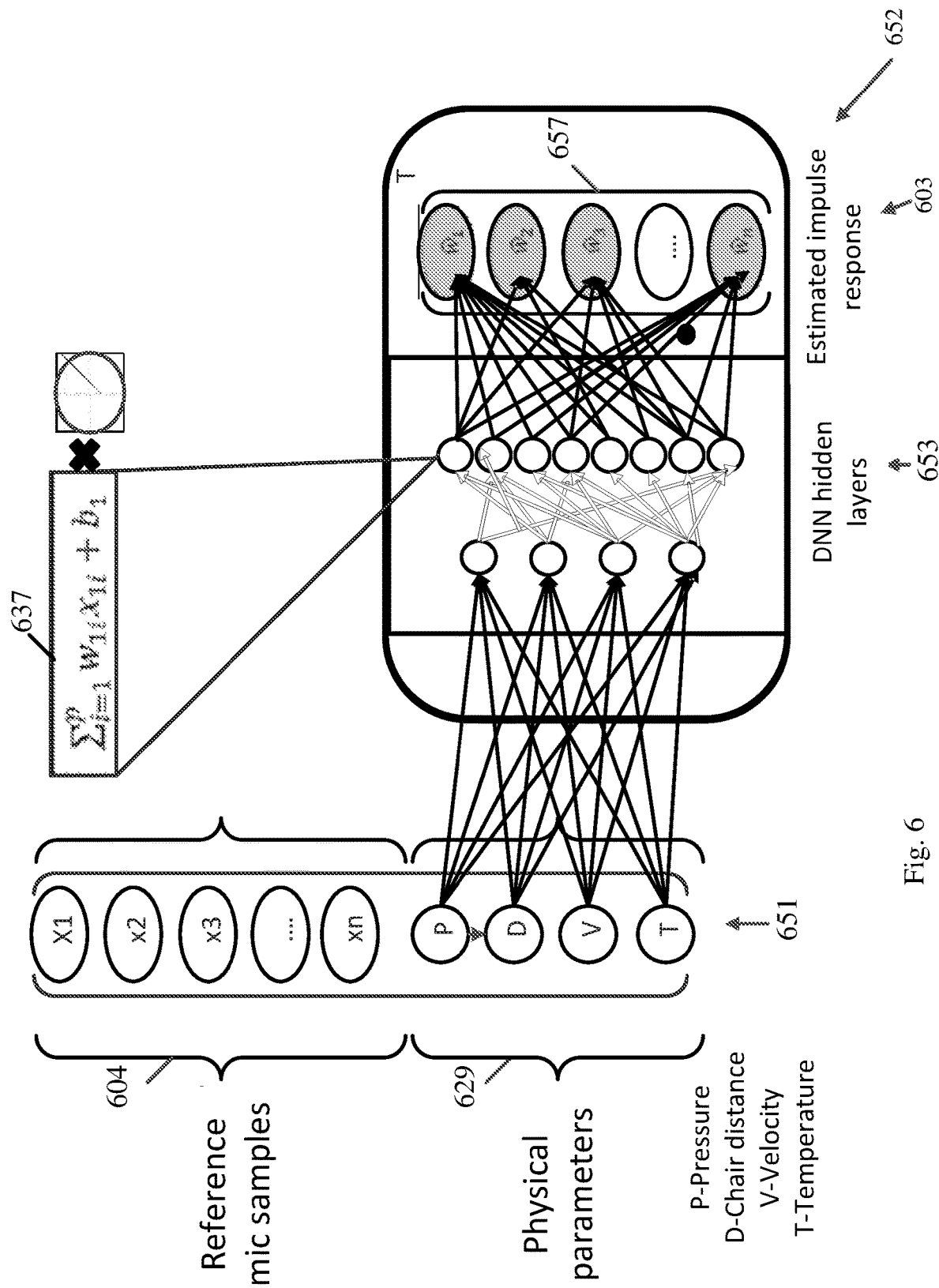
FIG. 6 is a schematic block diagram illustration of a PF NN, in accordance with some demonstrative aspects.

Reference is made to FIG. 6, which schematically illustrates a PF NN 652, in accordance with some demonstrative aspects.

For example, PF NN 452 (FIG. 4) and/or PF NN 552 (FIG. 5) may include one or more elements of PF NN 652 and/or may perform one or more operations and/or functionalities of PF NN 652.

In some demonstrative aspects, PF NN 652 may be trained to generate an NN output including a PF setting 603 for a prediction unit, e.g., prediction unit 550 (FIG. 5).

In some demonstrative aspects, PF NN 652 may be trained to generate the NN output including the PF setting 603, for example, to configure the prediction unit to predict and/or estimate a prediction function to be applied to a noise input 604, e.g., from one or more reference microphones.

In some demonstrative aspects, as shown in FIG. 6, PF NN 652 may be configured to receive an NN input including AAC information 629, e.g., from one or more AAC information sources. For example, AAC information 629 may include AAC information 129 (FIG. 1) from information sources 120 (FIG. 1).

In one example, as shown in FIG. 6, AAC information 629 may include information corresponding to one or more physical parameters.

For example, as shown in FIG. 6, the AAC information 629 may include pressure information, denoted P, corresponding to a pressure in a vehicle cabin.

For example, as shown in FIG. 6, the AAC information 629 may include chair distance information, denoted D, corresponding to a setting of one or more chairs in a vehicle cabin.

For example, as shown in FIG. 6, the AAC information 629 may include velocity information, denoted V, corresponding to a vehicle velocity.

For example, as shown in FIG. 6, the AAC information 629 may include temperature information, denoted T, corresponding to a temperature in a vehicle cabin.

In other aspects, AAC information 629 may include any other additional or alternative AAC configuration information, e.g., as described above.

In some demonstrative aspects, PF NN 652 may be trained to generate the PF setting 603 for the prediction unit, for example, based on the AAC information 629.

In some demonstrative aspects, as shown in FIG. 6, PF NN 652 may include a plurality of layers including an input layer 651, a plurality of hidden layers 653, and an output layer 657.

In some demonstrative aspects, as shown in FIG. 6, the plurality of layers of PF NN 652 may be connected via a plurality of edges.

In some demonstrative aspects, as shown in FIG. 6, input layer 651 may be configured to receive the NN input including the AAC information 629.

In some demonstrative aspects, as shown in FIG. 6, output layer 657 may be configured to provide the PF setting 603 to the prediction unit, for example, based on the AAC information 629.

In some demonstrative aspects, as shown in FIG. 6, an estimation function 637 may be applied to the hidden layers 653.

In some demonstrative aspects, as shown in FIG. 6, estimation function 637 may include a non nonlinear function.

In other aspects, estimation function 637 may include a linear function 637.

Referring back to FIG. 4, an NN-based AAC system, e.g., NN-based AA system 400, may utilize a PF NN, which may be configured to process a NN input including extracted AAC information of one or more extracted AAC parameters.

In some demonstrative aspects, the extracted AAC information of the one or more extracted AAC parameters, may be utilized, for example, in addition to AAC information 429 or instead of AAC information 429.

In some demonstrative aspects, the extracted AAC information may correspond to one or more AAC parameters, which may not be sensed and/or detected, e.g., directly, for example, via the one or more information sources 420.

In some demonstrative aspects, the extracted AAC information of the extracted AAC parameters may be extracted, for example, based on some or all of the plurality of noise inputs 404, e.g., as described below.

In some demonstrative aspects, the extracted AAC information of the extracted AAC parameters may be utilized, for example, to model one or parameters, which may not be sensed and/or detected, for example, via the one or more information sources 420.

In some demonstrative aspects, the extracted AAC information of the extracted AAC parameters may include information extracted from some or all of the AAC information 429.

In some demonstrative aspects, the extracted AAC information of the extracted AAC parameters may be implemented, for example, to provide a technical solution, which may simplify an AAC architecture of NN-based AAC system 400.

In some demonstrative aspects, the extracted AAC information of the extracted AAC parameters may be implemented, for example, to provide a technical solution to reduce a computational workload of NN-based AAC system 400.

Figure 7:
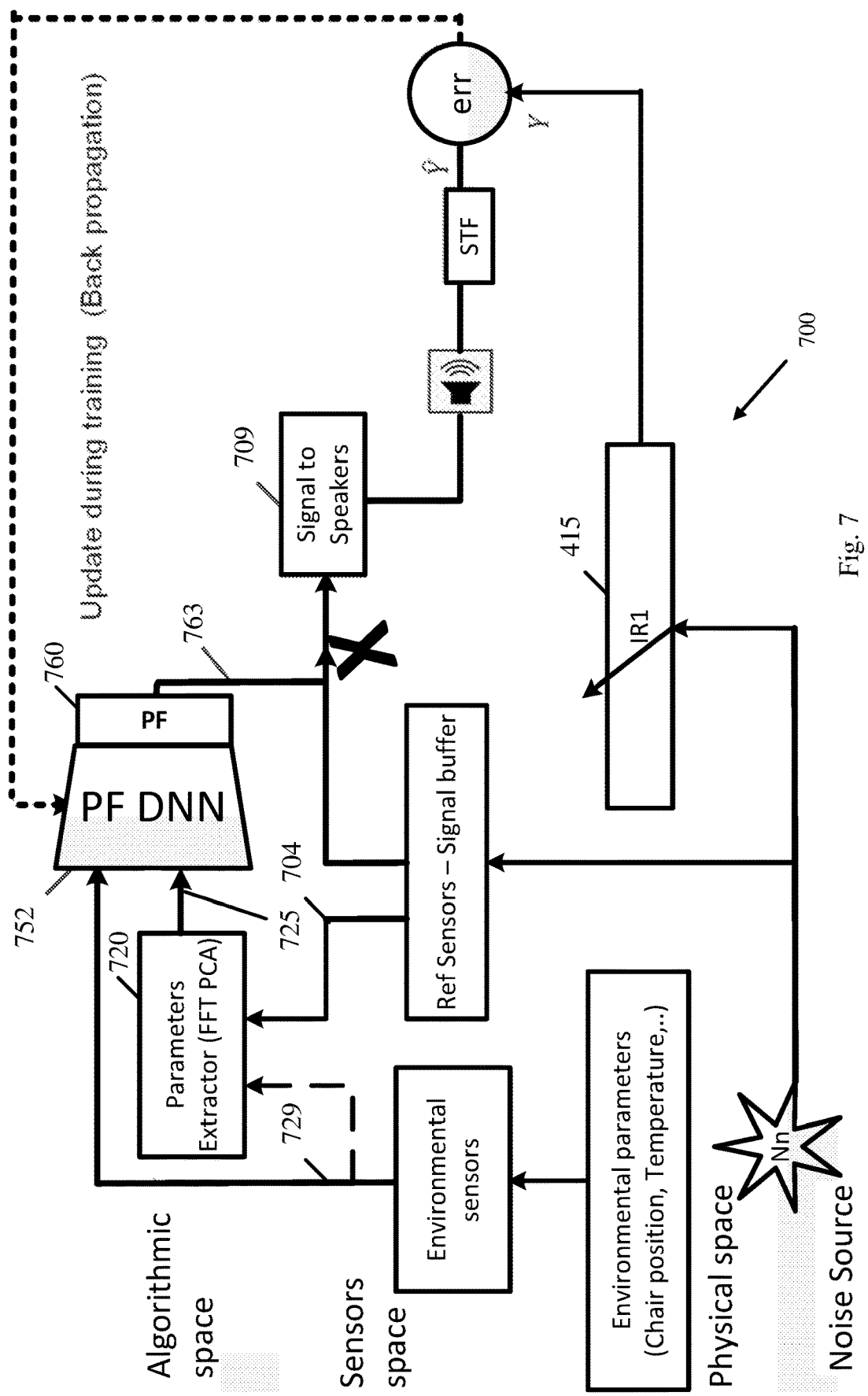
FIG. 7 is a schematic block diagram illustration of an NN-based AAC system, in accordance with some demonstrative aspects.

Reference is made to FIG. 7, which schematically illustrates an NN-based AAC system 700, in accordance with some demonstrative aspects.

For example, AAC system 100 (FIG. 1) may include one or more elements of NN-based AAC system 700 and/or may perform one or more operations and/or functionalities of NN-based AAC system 700.

For example, NN-based AAC system 700 may include one or more elements of NN-based AAC system 400 (FIG. 4) and/or may perform one or more operations and/or functionalities of NN-based AAC system 400 (FIG. 4).

In some demonstrative aspects, as shown in FIG. 7, AAC system 700 may include a PF NN 752, which may be trained to generate a PF setting for a prediction unit 760, e.g., as described above.

In some demonstrative aspects, as shown in FIG. 7, prediction unit 760 may be configured to predict and/or estimate an estimation function or a prediction function 763 to be applied to one or more noise inputs 704, for example, to generate a sound control pattern 709, e.g., as described above.

In some demonstrative aspects, as shown in FIG. 7, noise inputs 704 may be provided by one or more acoustic sensors, and may represent acoustic noise from a noise source, e.g., as described above.

For example, PF NN 452 (FIG. 4) may include one or more elements of PF NN 752 and/or may perform one or more operations and/or functionalities of PF NN 752; and/or prediction unit 460 (FIG. 4) may include one or more elements of prediction unit 760 and/or may perform one or more operations and/or functionalities of prediction unit 760.

In some demonstrative aspects, PF NN 752 may be trained to generate the PF setting for the prediction unit 760, for example, based on AAC information 729 from one or more AAC information sources. For example, AAC information 729 may include AAC information 129 (FIG. 1) from information sources 120 (FIG. 1), e.g., as described above.

In some demonstrative aspects, NN-based AAC system 700 may include an AAC parameter extractor 720, which may be configured to provide extracted AAC information 725 corresponding to one or more AAC parameters, e.g., as described below.

In some demonstrative aspects, as shown in FIG. 7, AAC parameter extractor 720 may be configured to extract the extracted AAC information 725, for example, based on acoustic noise information from the one or more noise inputs 704.

In some demonstrative aspects, AAC parameter extractor 720 may be configured to generate the extracted AAC information 725, for example, based on AAC information 729, e.g., in addition to or instead of, some or all of the plurality of noise inputs 704.

In some demonstrative aspects, AAC parameter extractor 720 may be configured to generate the extracted AAC information 725, for example, by applying a predefined reference-noise extraction to the plurality of noise inputs 704 and/or to the AAC information 729, e.g., as described below.

In some demonstrative aspects, AAC parameter extractor 720 may be configured to generate the extracted AAC information 725 according to a predefined reference-noise extraction function, which may be based, for example, on a Principle Component Analysis (PCA) technique.

In other aspects, any other additional or alternative technique, method and/or mechanism may be implemented to generate the extracted AAC information 725.

In some demonstrative aspects, the AAC parameter extractor 720 may be configured to determine one or more principle components, for example, based on the plurality of noise inputs 704 and/or the AAC information 729, e.g., based on the PCA technique.

In some demonstrative aspects, AAC parameter extractor 720 may be configured to determine the extracted AAC parameter information 725, for example, based on sensor information 704 from one or more sensors, e.g., as described below.

In some demonstrative aspects, AAC parameter extractor 720 may include a PCA extractor, which may be configured to determine the extracted AAC parameter information 725, for example, based on PCA of the sensor information 704, for example, in a time domain or in a frequency domain.

In some demonstrative aspects, AAC parameter extractor 720 may be configured to determine the extracted AAC parameter information 725, for example, based on PCA of noise sensor information from one or more noise sensors.

In some demonstrative aspects, AAC parameter extractor 720 may be configured to determine the extracted AAC parameter information 725, for example, based on PCA of residual noise sensor information from one or more residual noise sensors.

In some demonstrative aspects, AAC parameter extractor 720 may be configured to determine the extracted AAC parameter information 725, for example, based on PCA of monitoring sensor information from one or more monitoring sensors.

In some demonstrative aspects, AAC parameter extractor 720 may be configured to determine the extracted AAC parameter information 725, for example, based on PCA of virtual sensor information from one or more virtual sensors.

In some demonstrative aspects, AAC parameter extractor 720 may be configured to determine the extracted AAC parameter information 725 including, for example, at least one of road type information, cabin state information, passenger position information, vehicle system state information, noise characteristic information, and/or noise state information, e.g., as described above.

In other aspects, AAC parameter extractor 720 may be configured to determine the extracted AAC parameter information 725 including any other additional or alternative type of information.

In some demonstrative aspects, as shown in FIG. 7, PF NN 752 may be trained to generate the PF setting for the prediction unit 760, for example, based on the plurality of AAC parameters 725.

In some demonstrative aspects, as shown in FIG. 7, PF NN 752 may be trained to generate the PF setting for the prediction unit 760, for example, based on the AAC information 729 and the plurality of AAC parameters 725.

In some demonstrative aspects, as shown in FIG. 7, PF NN 752 may be configured to generate the PF setting of a prediction unit 760, for example, based on an NN input, which may include the extracted AAC information 725, e.g., in addition to, or instead of, one or more components of the AAC information 729.

In some demonstrative aspects, prediction unit 760 may determine the prediction function 763 based on the PF setting for the prediction unit 760.

In some demonstrative aspects, a controller, e.g., AAC controller 102 (FIG. 1) and/or controller 193 (FIG. 1), may be configured to determine a sound control pattern 709, for example, by applying the prediction function 763 to the noise inputs 704, e.g., as described above.

In some demonstrative aspects, as shown in FIG. 7, sound control pattern 709 may be applied to one or more acoustic transducers, for example, to control sound in a sound control zone, e.g., as described above.

In some demonstrative aspects, the PF NN 752 may be trained and/or calibrated, for example, based on a noise error, e.g., as described below.

In some demonstrative aspects, a noise error at an error sensing location may be based, for example, on a difference between a noise signal, denoted Y, at the error sensing location, and an acoustic sound control pattern, denoted $\hat{Y}$, at the error sensing location.

In some demonstrative aspects, as shown in FIG. 7, the acoustic sound control pattern $\hat{Y}$ at the error sensing location may be based on the sound control pattern 709 and a TTF, e.g., STF, between acoustic transducer and the error sensing location, which may include, for example, a physical error sensing location or a virtual error sensing location, e.g., as described above.

In some demonstrative aspects, PF NN 752 may be trained, for example, based on an error signal, which may correspond to the noise error at error sensing location, e.g., as described above.

In some demonstrative aspects, for example, during training of the PF NN 752, a predefined noise pattern may be generated, a predefined setting of AAC information 729 and a predefined setting of extracted AAC information 725 may be provided as the NN input to PF NN 752, and the error signal may be determined.

In some demonstrative aspects, for example, during training of the PF NN 752, determination of the error signal may be repeated, for example, for multiple different predefined noise patterns, multiple different predefined settings of AAC information 729, and/or multiple different predefined settings of extracted AAC information 725.

In some demonstrative aspects, for example, during training of the PF NN 752, the PF NN 752 may be trained, for example, based on a training criterion to minimize, or eliminate, the error signal.

Figure 8:
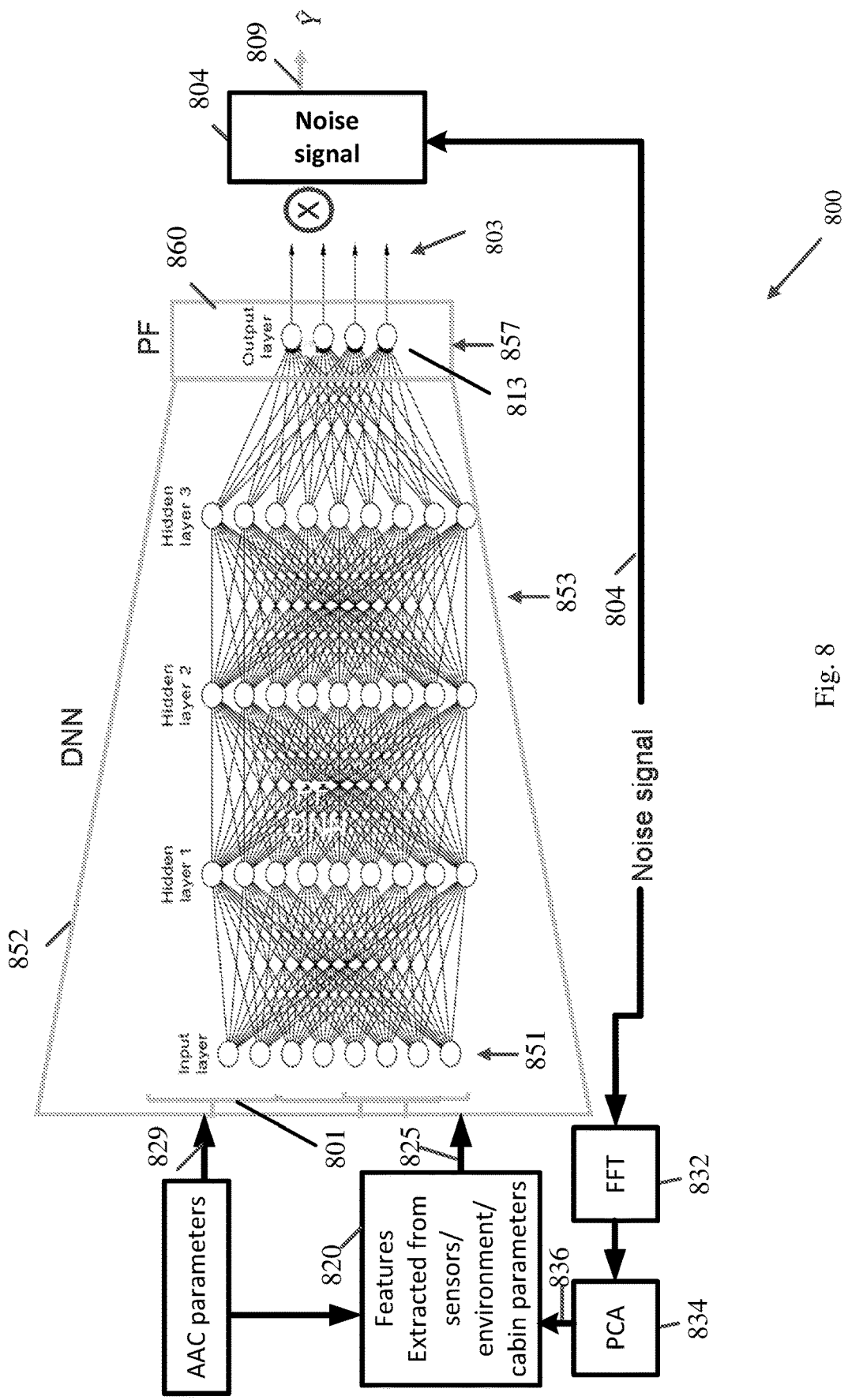
FIG. 8 is a schematic block diagram illustration of an NN-based PF, in accordance with some demonstrative aspects.

Reference is made to FIG. 8, which schematically illustrates an NN-based PF including a PF NN 852 to configure a setting of a prediction unit 860, in accordance with some demonstrative aspects.

For example, PF NN 752 (FIG. 7) may include one or more elements of PF NN 852 and/or may perform one or more operations and/or functionalities of PF NN 852; and/or prediction unit 760 (FIG. 7) may include one or more elements of prediction unit 860 and/or may perform one or more operations and/or functionalities of prediction unit 860.

In some demonstrative aspects, PF NN 852 may be trained to generate an NN output 813 including a PF setting for the prediction unit 860.

In some demonstrative aspects, as shown in FIG. 8, prediction unit 860 may be configured to predict and/or estimate a prediction function 803 to be applied to a noise input 804, for example, to generate a sound control pattern 809.

In some demonstrative aspects, as shown in FIG. 8, PF NN 852 may be configured to generate the PF setting for the prediction unit 860, for example, based on an NN input 801, e.g., as described below. For example, NN output 813 may include a plurality of PF coefficients to configure the prediction function 803 for the prediction unit 860, e.g., as described above.

In some demonstrative aspects, the NN input 801 may be configured to receive AAC information 829, e.g., from one or more information sources. For example, AAC information 829 may include AAC information 129 (FIG. 1) from information sources 120 (FIG. 1).

In some demonstrative aspects, AAC information 829 may include one or more vehicle/cabin parameters corresponding to a setting in a vehicle cabin, for example, in a vehicular AAC implementation, e.g., as described above.

In other aspects, AAC information 829 may include any other additional or alternative information, e.g., as described above.

In some demonstrative aspects, as shown in FIG. 8, PF NN 852 may be configured to generate the PF setting for the prediction unit 860, for example, based on extracted feature information, which may be extracted, for example, based on sensor information from one or more sensors, for example, one or more physical sensors and/or virtual sensors, e.g., noise sensors, monitoring sensors and/or residual noise sensors, e.g., as described below.

In some demonstrative aspects, the NN input 801 may be configured to receive extracted AAC information 825, e.g., from an AAC parameter extractor 820, e.g., as described below.

In some demonstrative aspects, AAC parameter extractor 820 may be configured to extract the extracted AAC information 825, for example, from AAC information 829 and/or from noise input 804. For example, AAC parameter extractor 820 may include one or more elements of AAC parameter extractor 720 (FIG. 7), and/or may perform one or more operations and/or functionalities of AAC parameter extractor 720 (FIG. 7).

In some demonstrative aspects, as shown in FIG. 8, AAC parameter extractor 820 may be configured to extract the extracted AAC information 825, for example, based on PCA information 836, which may be determined based on the noise input 804, e.g., as described below.

In some demonstrative aspects, as shown in FIG. 8, the noise input 804 may be transformed from a time domain to a frequency domain, for example, using A Fast Fourier Transformation (FFT) 832.

In some demonstrative aspects, as shown in FIG. 8, PCA information 836 may include one or more principle components, which may be determined, for example, by applying a PCA to the noise input 804, e.g., in the frequency domain. In other aspects, the PCA information 836 may include one or more principle components, which may be determined, for example, by applying the PCA to the noise input 804, for example, in the time domain.

In some demonstrative aspects, as shown in FIG. 8, AAC parameter extractor 820 may be configured to determine the extracted AAC information 825, for example, based on the one or more principle components 836.

In some demonstrative aspects, PF NN 852 may be trained to generate the NN output 803 including the PF setting for the prediction unit 860, for example, based on the AAC information 829 and the extracted AAC information 825.

In some demonstrative aspects, as shown in FIG. 8, PF NN 852 may include a plurality of layers including an input layer 851, a plurality of hidden layers 853, and an output layer 857.

In some demonstrative aspects, as shown in FIG. 8, the plurality of layers of PF NN 852 may be connected via a plurality of edges/nodes.

In some demonstrative aspects, as shown in FIG. 8, input layer 851 may be configured to receive the AAC information 829 and the extracted AAC information 825.

In some demonstrative aspects, as shown in FIG. 8, output layer 857 may be configured to provide the PF setting to prediction unit 860, for example, based on the AAC information 829 and the extracted AAC information 825.

In some demonstrative aspects, AAC parameter extractor 820 may be configured to generate the extracted AAC information 825 including, for example, extracted road type information, for example, based on the noise inputs 804 and/or the AAC information 829, e.g., as described below.

In some demonstrative aspects, AAC parameter extractor 820 may be configured to generate the extracted AAC information 825 including any other additional or alternative extracted AAC information, e.g., as described above.

In some demonstrative aspects, AAC parameter extractor 820 may be configured to determine the road type information, for example, based on a road noise pattern and/or a plurality of reference noise patterns corresponding to a plurality of road types, e.g., as described below.

Figure 9:
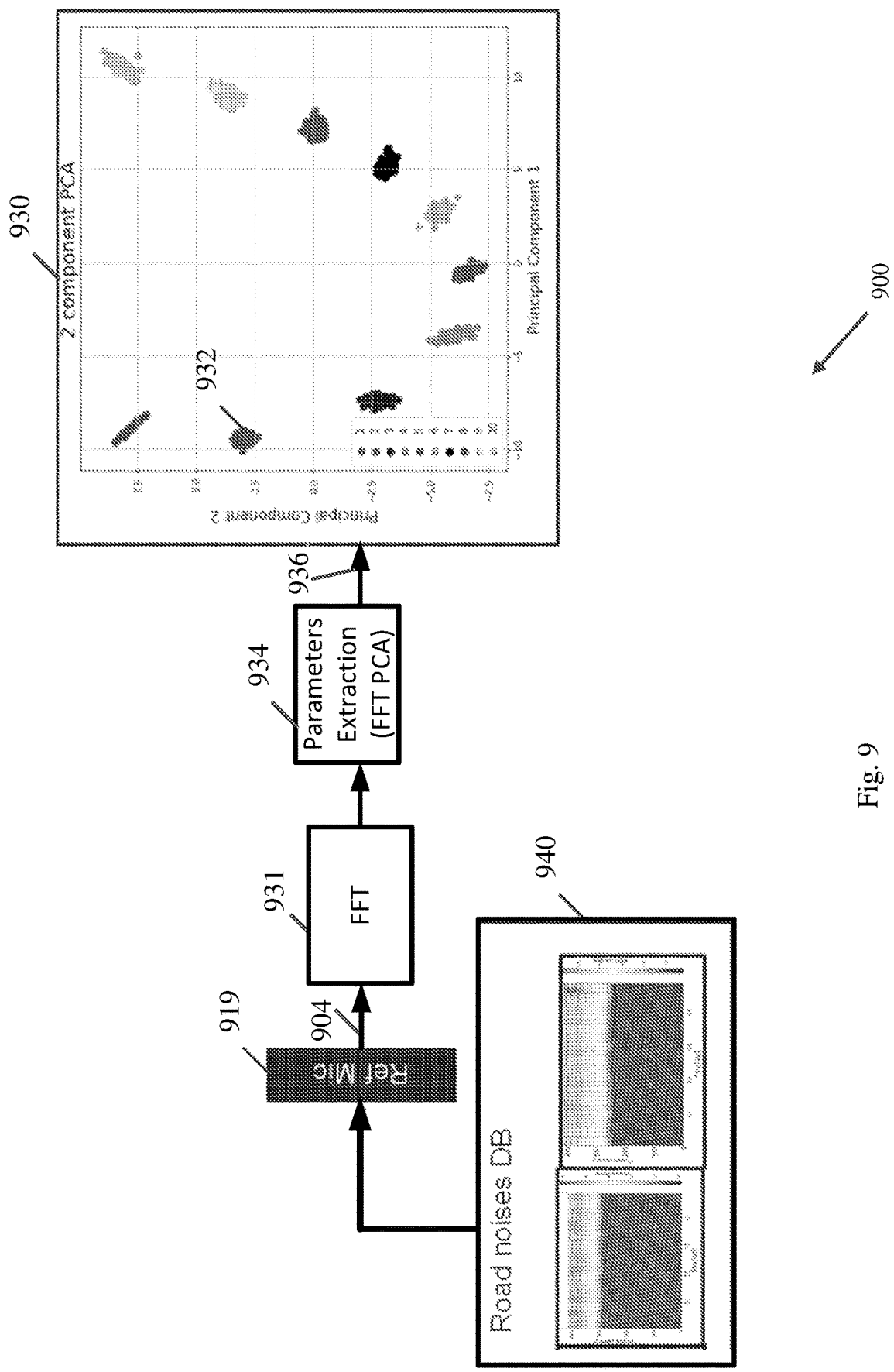
FIG. 9 is a schematic illustration of an AAC parameter extraction scheme to extract AAC parameter information, in accordance with some demonstrative aspects.

Reference is made to FIG. 9, which schematically illustrates an AAC parameter extraction scheme 900 to configure extraction of AAC information, in accordance with some demonstrative aspects.

In some demonstrative aspects, AAC parameter extraction scheme 900 may be configured to extract a road type parameter, e.g., as described below. In other aspects, AAC parameter extraction scheme 900 may be configured to extract any other additional or alternative AAC parameter information, e.g., as described above.

In some demonstrative aspects, as shown in FIG. 9, AAC parameter extraction scheme 900 may include an AAC parameter extractor 920. For example, AAC parameter extractor 820 (FIG. 8) may include one or more elements of AAC parameter extractor 920 and/or may perform one or more operations and/or functionalities of AAC parameter extractor 920.

In some demonstrative aspects, AAC parameter extractor 920 may be configured to extract AAC parameter information, e.g., including a road type parameter, for example, based on noise inputs 904, which may be received from one or more acoustic sensors 919 for example, reference noise sensors and/or monitoring sensors, e.g., reference noise sensors 119 (FIG. 1) and/or monitoring sensors at the monitoring sensing locations 103 (FIG. 2).

In some demonstrative aspects, as shown in FIG. 9, AAC parameter extractor 920 may extract AAC parameter information, e.g., including the road type parameter, for example, based on a 2D principle components reference map 930.

In some demonstrative aspects, the 2D principle components reference map 930 may include a plurality of 2D principle components 932 corresponding to a respective plurality of AAC parameter options, e.g., a plurality of road types.

In some demonstrative aspects, the 2D principle components reference map 930 may be determined, for example, during training of an AAC system, e.g., AAC system 700 (FIG. 7).

In some demonstrative aspects, the 2D principle components reference map 930 may be determined, for example, by applying to the reference noise sensors 919 predefined noise patterns corresponding to the plurality of AAC parameter options, for example, the plurality of road types, e.g., from a database (DB) 940 of predefined AAC parameter noise patterns, e.g., road noise patterns corresponding to the plurality of road types. For example, a particular 2D principle component 932 corresponding to a respective particular road type may be determined, for example, by applying to the reference noise sensors 919 a predefined noise pattern from DB 940 corresponding to the particular road type.

In some demonstrative aspects, as shown in FIG. 9, AAC parameters extraction scheme 900 may include an FFT block 931 configured to convert a noise input 904 from the reference noise sensors 919 from the time-domain to the frequency-domain.

In some demonstrative aspects, as shown in FIG. 9, AAC parameter extractor 920 may extract one or more principle components 936 from the noise input 904 in the frequency-domain, for example, based on a PCA of the noise input 904 in the frequency-domain.

In some demonstrative aspects, as shown in FIG. 9, AAC parameter extractor 920 may determine the AAC parameter information, e.g., including the road type parameter, for example, based on a correlation between the one or more principle components 936 from the noise inputs 904 and the plurality of 2D principle components 936 in the 2D principle components reference map 930.

Referring back to FIG. 4, in some demonstrative aspects, prediction filter NN 452 may be trained to generate the prediction filter setting of the prediction filter 460, for example, based on a path transfer function, e.g., a TTF or an STF, between acoustic transducer 408 and one or more acoustic sensing locations, e.g., error sensing location 407.

In some demonstrative aspects, the prediction filter NN 452 may be trained to generate the prediction filter setting of the prediction filter 460 based on a path transfer function between acoustic transducer 408 and error sensing location 407, e.g., as described below.

In other aspects, the prediction filter NN 452 may be trained to generate the prediction filter setting of the prediction filter 460 based on one or more path transfer functions between acoustic transducer 408 and one or more additional or alternative acoustic sensing locations, e.g., one or more noise sensing locations, one or more residual-noise sensing locations, and/or one or more monitoring sensing locations, e.g., as described above.

In some demonstrative aspects, prediction filter NN 452 may be trained to generate the prediction filter setting of the prediction filter 460, for example, based on a TTF, e.g., an STF, setting of the TTF (STF) between acoustic transducer 408 and the one or more acoustic sensing locations, e.g., error sensing location 407, e.g., as described below.

In some demonstrative aspects, the TTF (STF) setting of the TTF (STF) between acoustic transducer 408 and an acoustic sensing location may be determined, for example, using a TTF (STF) NN, for example, TTF (STF) NN 154 (FIG. 1), e.g., as described below.

In some demonstrative aspects, the TTF (STF) setting of the TTF (STF) between acoustic transducer 408 and error sensing location 407 may be determined, for example, using a TTF (STF) NN, for example, TTF (STF) NN 154 (FIG. 1), e.g., as described below.

In some demonstrative aspects, TTF (STF) NN, e.g., TTF (STF) NN 154 (FIG. 1), may be trained, for example, to generate the TTF (STF) setting of the TTF (STF), for example, based on the AAC information 429, e.g., as described below.

Figure 10:
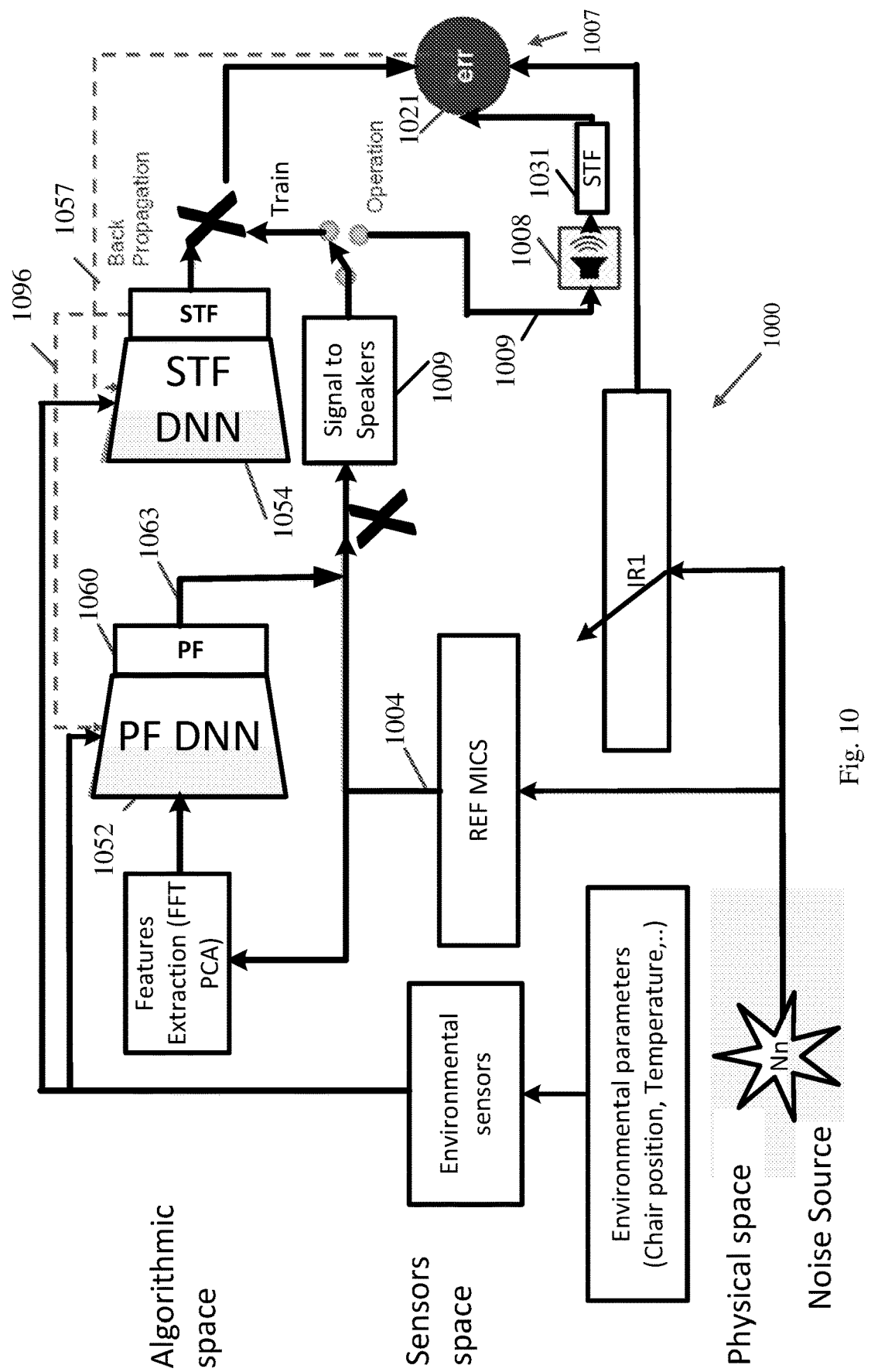
FIG. 10 is a schematic block diagram illustration of an NN-based AAC system, in accordance with some demonstrative aspects.

Reference is made to FIG. 10, which schematically illustrates an NN-based AAC system 1000, in accordance with some demonstrative aspects. For example, AAC system 100 (FIG. 1) may include one or more elements of AAC system 1000 and/or may perform one or more operations and/or functionalities of AAC system 1000.

In some demonstrative aspects, as shown in FIG. 10, NN-based AAC system 1000 may include a PF NN 1052, which may be trained to generate a PF setting for a prediction unit 1060, e.g., as described above.

In some demonstrative aspects, as shown in FIG. 10, prediction unit 1060 may be configured to predict and/or estimate an estimation function or a prediction function 1063 to be applied to one or more noise inputs 1004, for example, to generate a sound control pattern 1009, e.g., as described above.

In some demonstrative aspects, the sound control pattern 1009 may be applied to control an acoustic transducer 1008, for example, to control sound at a sound control zone, e.g., as described above.

In some demonstrative aspects, as shown in FIG. 10, noise inputs 1004 may be provided by one or more acoustic sensors, and may represent acoustic noise from a noise source, e.g., as described above.

For example, PF NN 452 (FIG. 4) may include one or more elements of PF NN 1052 and/or may perform one or more operations and/or functionalities of PF NN 1052; and/or prediction unit 460 (FIG. 4) may include one or more elements of prediction unit 1060 and/or may perform one or more operations and/or functionalities of prediction unit 1060.

In some demonstrative aspects, as shown in FIG. 10, PF NN 1052 may be trained to generate the PF setting for the prediction unit 1060, for example, based on AAC information from one or more AAC information sources, and/or based on extracted AAC information from an AAC parameter extractor, e.g., as described above.

In some demonstrative aspects, PF NN 1052 may be trained to generate the PF setting for the prediction unit 1060, for example, based on a TTF (STF) 1031 between an acoustic transducer 1008 and one or more acoustic sensing locations, e.g., as described below.

In some demonstrative aspects, PF NN 1052 may be trained to generate the prediction filter setting of the prediction filter 1060 based on a path transfer function between acoustic transducer 1008 and an error sensing location 1007, e.g., as described below.

In other aspects, PF NN 1052 may be trained to generate the prediction filter setting of the prediction filter 1060 based on one or more path transfer functions between acoustic transducer 1008 and one or more additional or alternative acoustic sensing locations, e.g., one or more noise sensing locations, one or more residual-noise sensing locations, and/or one or more monitoring sensing locations.

In one example, PF NN 1052 may be trained to generate the prediction filter setting of the prediction filter 1060 based on a path transfer function between acoustic transducer 1008 and a monitoring sensing location 103 (FIG. 2), for example, which may be used to estimate a virtual error at error sensing location 1007, e.g., as described above.

In some demonstrative aspects, as shown in FIG. 10, PF NN 1052 may be trained to generate the PF setting for the prediction unit 1060, for example, based on a TTF (STF) 1031 between an acoustic transducer 1008 and error sensing location 1007, e.g., in the sound control zone.

In some demonstrative aspects, as shown in FIG. 10, PF NN 1052 may be trained to learn the TTF NN space, for example, between one or more transducers 1008 and one or more acoustic sensing locations, for example, error sensing locations 1007, monitoring locations (FIG. 2), and/or noise sensing locations 105 (FIG. 2), e.g., as described below.

In some demonstrative aspects, the error sensing location 1007 may include an error sensing location in a sound control zone, e.g., the sound control zone 110 (FIG. 2). For example, the noise error at the error sensing location 1007 may be sensed by one or more residual noise sensors, e.g., residual noise sensors 121 (FIG. 1). For example, monitoring microphones, e.g., error microphones 121 (FIG. 1), may be implemented to sense a noise error, e.g., which may result from changes in acoustics of the NN-based AAC system 1000, e.g., acoustic changes in a vehicle cabin implementing NN-based AAC system 1000.

In some demonstrative aspects, as shown in FIG. 10, AAC system 1000 may include a TTF (STF) NN 1054, which may be trained to generate TTF (STF) setting information 1096 representing an estimated TTF (STF) setting between the acoustic transducer 1008 and the one or more acoustic sensing locations, for example, including the error sensing location 1007, e.g., as described below. For example, TTF (STF) NN 154 (FIG. 1) may include one or more elements of TTF (STF) NN 1054 and/or may perform one or more operations and/or functionalities of TTF (STF) NN 1054.

In some demonstrative aspects, TTF (STF) NN 1154 and/or PF NN 1052 may be trained separately. In other aspects, TTF (STF) NN 1154 and/or PF NN 1052 may be trained in parallel.

In some demonstrative aspects, the TTF (STF) NN 1054 may be trained and/or calibrated, for example, based on a noise error at the one or more acoustic sensing locations, for example, including the error sensing location 1007, e.g., as described below.

In some demonstrative aspects, an AAC system, e.g., AAC system 1000, may utilize a TTF (STF) NN, e.g. TTF (STF) NN 1054, to estimate the TTF (STF) between the acoustic transducer 1008 and the one or more acoustic sensing locations, e.g., including the error sensing location 1007, for example, to provide a more accurate estimation of the actual TTF (STF).

In some demonstrative aspects, the noise error at the error sensing location 1007 may be based, for example, on a difference between a noise signal at the error sensing location 1007, and an acoustic sound control pattern at the error sensing location 1007.

In some demonstrative aspects, the acoustic sound control pattern at error sensing location 1007 may be based on the sound control pattern 1009 and the TTF (STF) 1031 between acoustic transducer 1008 and error sensing location 1007.

In some demonstrative aspects, the noise signal at error sensing location 1007 may be based on an impulse response of an acoustic channel between the noise source and the error sensing location 1007.

In some demonstrative aspects, the TTF (STF) NN 1054 may be trained to generate TTF (STF) setting information 1096, for example, for a plurality of acoustic transducer-sensor pairs in AAC system 1000. For example, an acoustic transducer-sensor pair, e.g., each acoustic transducer-sensor pair, may include a different combination of an acoustic transducer and an acoustic sensor, e.g., an error microphone, a monitoring microphone, virtual sensor and/or a noise microphone, of the AAC system 1000.

In some demonstrative aspects, the TTF (STF) setting per scenario and per acoustic transducer-sensor pair may be implemented to provide a technical solution to support improved, e.g., optimal, setting of the TTF (STF).

In some demonstrative aspects, TTF (STF) NN 1054 may be trained, for example, based on an error signal 1057, which may correspond to the noise error at error sensing location 1007.

In some demonstrative aspects, a residual noise sensor 1021, e.g., an error microphone, may be configured to generate error signal 1057, for example, during training of the TTF (STF) NN 1054.

In some demonstrative aspects, for example, during training of the TTF (STF) NN 1054, a predefined noise pattern may be generated, a predefined setting of AAC information may be provided as NN input to TTF (STF) NN 1054, and the error signal 1057 may be determined, e.g., as described below.

In some demonstrative aspects, for example, during training of the TTF (STF) NN 1054, determination of the error signal 1057 may be repeated, for example, for multiple different predefined noise patterns and/or multiple different predefined settings of the AAC information, e.g., as described below.

In some demonstrative aspects, for example, during training of the TTF (STF) NN 1054, the TTF (STF) NN 1054 may be trained, for example, based on a training criterion to minimize, or eliminate, the error signal 1057, e.g., as described below.

Figure 11:
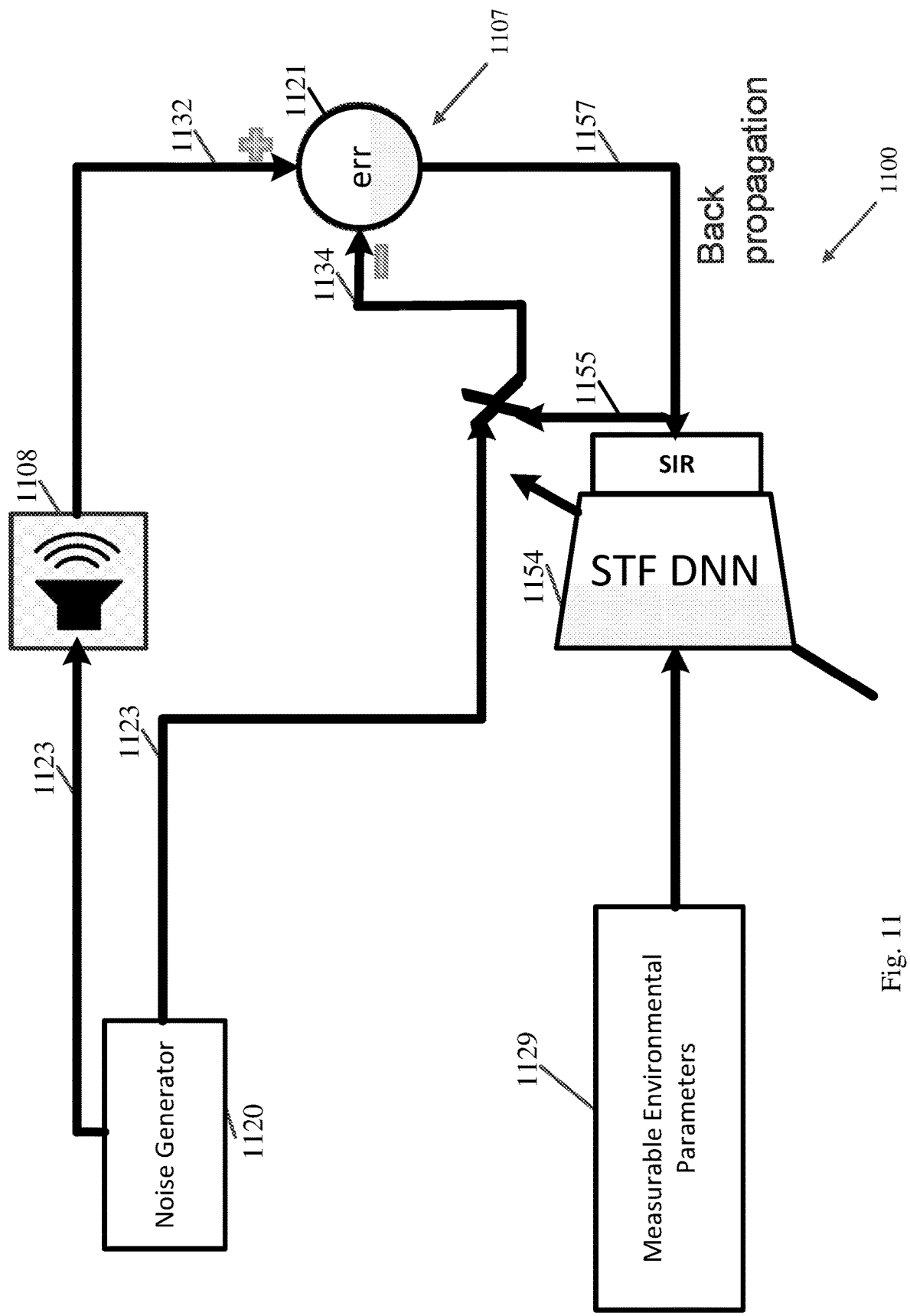
FIG. 11 is a schematic block diagram illustration of a training scheme to train a Transducer Transfer Function NN, in accordance with some demonstrative aspects.

Reference is made to FIG. 11, which schematically illustrates a training scheme 1100 to train a TTF (STF) NN 1154, in accordance with some demonstrative aspects.

For example, TTF (STF) TF NN 1054 (FIG. 10) may include one or more elements of TTF (STF) NN 1154 and/or may perform one or more operations and/or functionalities of TTF (STF) NN 1154.

In some demonstrative aspects, the TTF (STF) NN 1154 may be trained to generate a TTF (STF) setting 1155 of a TTF (STF) between an acoustic transducer 1108 and an acoustic sensing location 1107, e.g., error sensing location, a monitoring sensing location, and/or a noise sensing location.

In some demonstrative aspects, the TTF (STF) NN 1154 may be trained to generate the TTF (STF) setting 1155, for example, based on AAC information 1129. For example, AAC information 1129 may include AAC information 129 (FIG. 1) from information sources 120 (FIG. 1).

In some demonstrative aspects, as shown in FIG. 11, TTF (STF) NN 1154 may be trained based on a sensed acoustic signal 1157 at an acoustic sensing location 1107. In one example, signal 1157 may include an error signal from an error microphone 1121 at error sensing location 1107.

In some demonstrative aspects, error signal 1157 may be based on a noise difference between a first signal 1132 and a second signal 1134, e.g., as described below.

In some demonstrative aspects, the first signal 1132 may be based on a sound control pattern 1123 from a noise generator 1120, which may be applied to the acoustic transducer 1108, and received by error microphone 1121 at acoustic sensing location 1107, for example, the error sensing location 1107, e.g., via an actual TTF (STF) between acoustic transducer 1108 and the acoustic sensing location 1107, e.g., the error sensing location 1107.

In some demonstrative aspects, the second signal 1134 may be generated, for example, by applying the TTF (STF) setting 1155, which is generated by the TTF (STF) NN 1154, to the sound control pattern 1123 from the noise generator 1120.

In some demonstrative aspects, for example, during training of the TTF (STF) NN 1154, a predefined noise pattern 1123 may be generated by noise generator 1120, a predefined setting of AAC information 1129 may be provided as NN input to TTF (STF) NN 1154, and the error signal 1157 may be determined.

In some demonstrative aspects, for example, during training of the TTF (STF) NN 1154, determination of the sensed acoustic signal 1157, e.g., error signal 1157, may be repeated, for example, for multiple different predefined noise patterns 1123 and/or multiple different predefined settings of the AAC information 1129.

In some demonstrative aspects, for example, during training of the TTF (STF) NN 1154, the TTF (STF) NN 10154 may be trained, for example, based on a training criterion to minimize, or eliminate, the sensed acoustic signal 1157, e.g., error signal 1157.

In some demonstrative aspects, the output of the TTF (STF) NN 1154 may include a vector of secondary transfer functions. For example, during training, this vector of secondary transfer functions may be compared to an estimated TTF (STF), e.g., based on the signal 1132.

Figure 12:
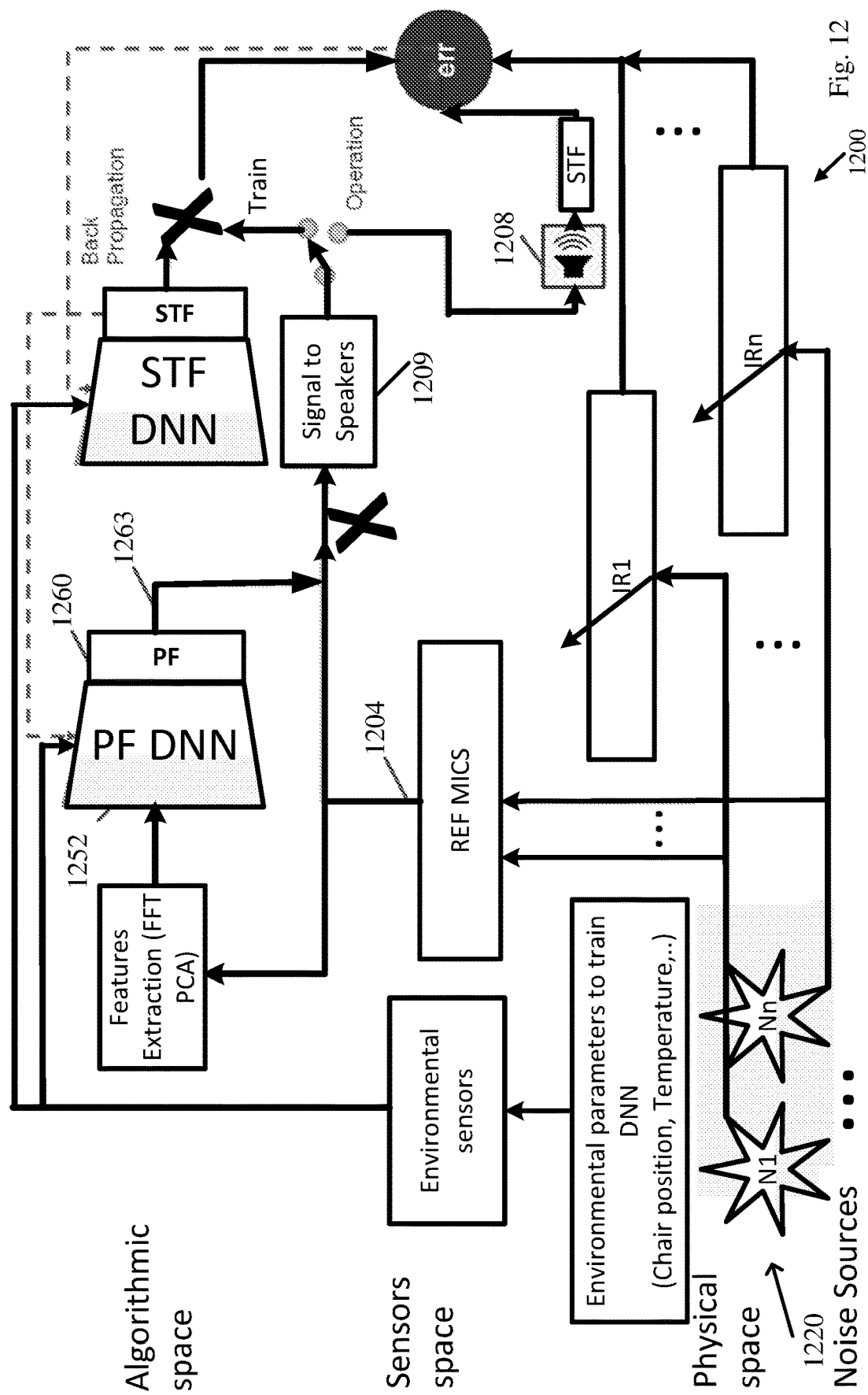
FIG. 12 is a schematic block diagram illustration of an AAC system, in accordance with some demonstrative aspects.

Reference is made to FIG. 12, which schematically illustrates an NN-based AAC system 1200, in accordance with some demonstrative aspects.

For example, AAC system 100 (FIG. 1) may include one or more elements of AAC system 1200 and/or may perform one or more operations and/or functionalities of AAC system 1200.

In some demonstrative aspects, AAC system 1200 may include a Multiple-Input-Multiple-Output (MIMO) AAC system, which may be configured to mitigate noise from a plurality of noise sources 1220, e.g., as described below.

In some demonstrative aspects, as shown in FIG. 12, NN-based AAC system 1200 may include a PF NN 1252, which may be trained to generate a PF setting for a prediction unit 1260.

In some demonstrative aspects, as shown in FIG. 12, prediction unit 1260 may be configured to predict and/or estimate an estimation function or a prediction function 1263 to be applied to one or more noise inputs 1204, for example, to generate a sound control pattern 1209, e.g., during an operation mode of AAC system 1200.

In some demonstrative aspects, the sound control pattern 1209 may be applied to control one or more acoustic transducers 1208, for example, to control sound at a sound control zone, e.g., as described above.

In some demonstrative aspects, as shown in FIG. 12, noise inputs 1204 may be provided by one or more acoustic sensors, and may represent acoustic noise from the plurality of noise sources 1220, e.g., as described above.

For example, PF NN 452 (FIG. 4) may include one or more elements of PF NN 1052 and/or may perform one or more operations and/or functionalities of PF NN 1252; and/or prediction unit 460 (FIG. 4) may include one or more elements of prediction unit 1260 and/or may perform one or more operations and/or functionalities of prediction unit 1260.

In some demonstrative aspects, PF NN 1252 may be trained to generate the PF setting for the prediction unit 1260, for example, based on AAC information from one or more AAC information sources, and/or based on extracted AAC information from an AAC parameter extractor, e.g., as described above.

For example, as shown in FIG. 12, PF NN 1252 may be trained, for example, according to a forward propagation during a training session, for example, using the TTF (STF) in the training loop.

Figure 13:
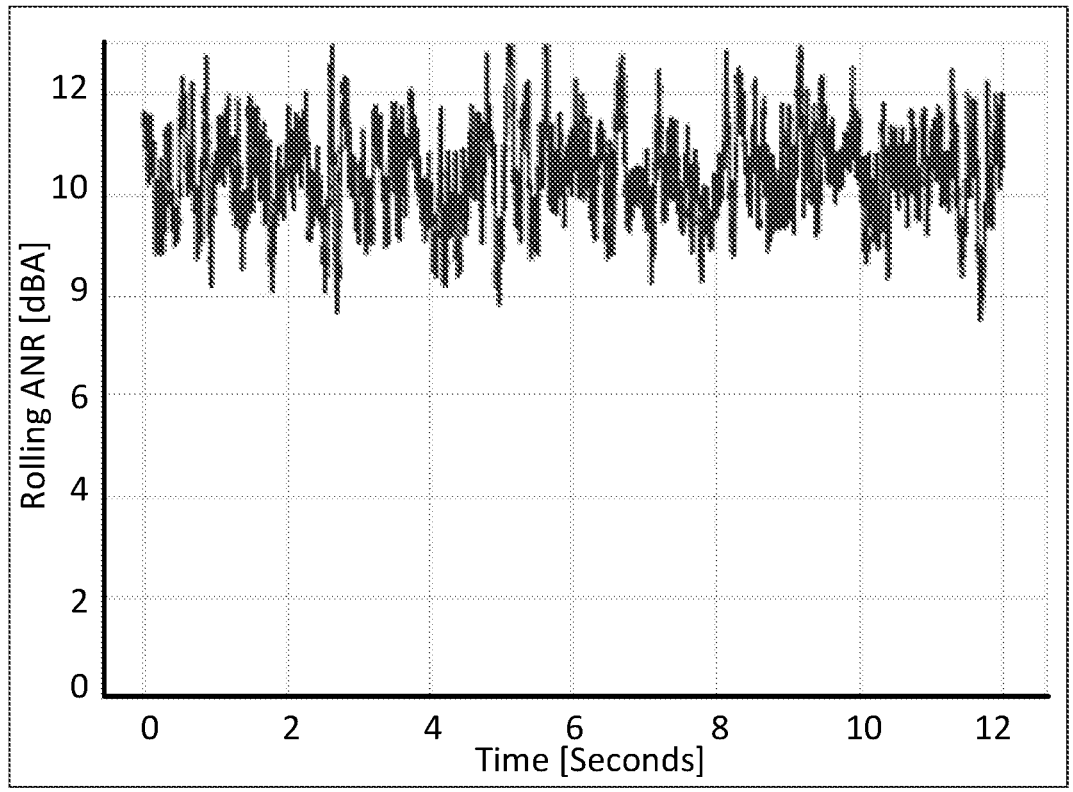
FIG. 13 is a schematic illustration of a graph depicting Active Noise Reduction (ANR) of an NN-based AAC system versus time, in accordance with some demonstrative aspects.

Reference is made to FIG. 13, which schematically illustrates a graph 1320 depicting a performance of Active Noise Reduction (ANR) of an NN-based AAC system versus time, in accordance with some demonstrative aspects.

In one example, AAC system 100 (FIG. 1), AAC system 400 (FIG. 4), AAC system 800 (FIG. 8), and/or AAC system 1200 (FIG. 12) may be configured to provide a technical solution to support an ANR performance, which may be generally similar to, or even better than, the ANR performance of graph 1320.

In some demonstrative aspects, as can be seen from graph 1320, the NN-based AAC system may achieve an effective ANR after a relatively short period of time, e.g., less than 1 second.

Figure 14A:
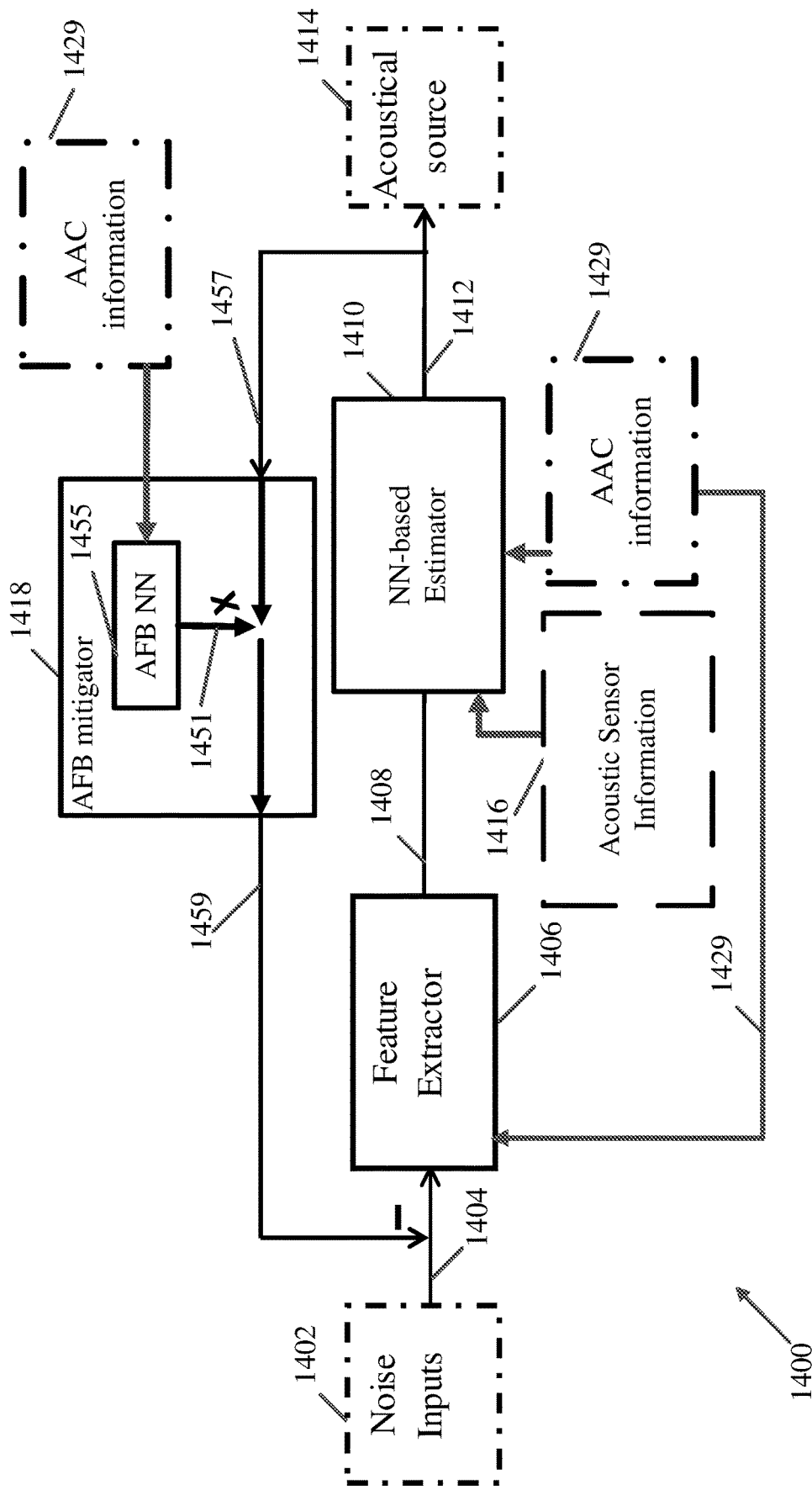
FIG. 14A is a schematic block diagram illustration of an NN-based controller, in accordance with some demonstrative aspects.

Reference is made to FIG. 14A, which schematically illustrates an NN-based controller 1400, in accordance with some demonstrative aspects. In some aspects, AAC controller 102 (FIG. 1) and/or controller 193 (FIG. 1) may perform, for example, one or more functionalities and/or operations of controller 1400.

In some demonstrative aspects, controller 1400 may receive AAC information 1429, e.g., including the AAC information 129 (FIG. 1).

In some demonstrative aspects, controller 1400 may receive a plurality of inputs 1404, e.g., including inputs 104 (FIG. 1), representing acoustic noise at a plurality of predefined noise sensing locations, e.g., locations 105 (FIG. 2). Controller 1400 may generate a sound control signal 1412 to control at least one acoustic transducer 1414, e.g., acoustic transducer 108 (FIG. 1).

In some demonstrative aspects, controller 1400 may include an NN-based estimator ("prediction unit") 1410 to estimate sound control signal 1412, for example, based on an NN input 1408, which may be based at least on inputs 1404.

In some demonstrative aspects, NN-based estimator 1410 may include one or more elements of NN 150 (FIG. 1) and/or may perform one or more operations and/or functionalities of NN 150 (FIG. 1).

In some demonstrative aspects, NN-based estimator 1410 may include one or more elements of PF NN 152 (FIG. 1) and/or may perform one or more operations and/or functionalities of PF NN 152 (FIG. 1).

In some demonstrative aspects, NN-based estimator 1410 may include one or more elements of PF NN 452 (FIG. 1) and/or PF 460 (FIG. 4), and/or may perform one or more operations and/or functionalities of PF NN 452 (FIG. 1) and/or PF 460 (FIG. 4).

In some demonstrative aspects, NN-based estimator 1410 may include one or more elements of TTF (STF) NN 154 (FIG. 1) and/or may perform one or more operations and/or functionalities of TTF (STF) NN 154 (FIG. 1).

In some demonstrative aspects, NN-based estimator 1410 may include one or more elements of TTF (STF) NN 1054 (FIG. 10), and/or may perform one or more operations and/or functionalities of TTF (STF) NN 1054 (FIG. 10).

In some demonstrative aspects, NN-based estimator 1410 may be trained to generate signal 1412, for example, based on the AAC information 1429, e.g., as described above.

In some demonstrative aspects, NN-based estimator 1410 may include a NN, e.g., NN 150 (FIG. 1), which may be trained to directly generate signal 1412, for example, based on NN input 1408 and the AAC information 1429, e.g., as described above.

In some demonstrative aspects, NN-based estimator 1410 may include a PF NN, e.g., PF NN 452 (FIG. 4), and a PF, e.g., PF 460 (FIG. 4). For example, the PF NN, e.g., PF NN 452 (FIG. 4), may be trained to generate a PF setting of the PF, e.g., PF 460 (FIG. 4), and the PF, e.g., PF 460 (FIG. 4), may generate the signal 1412 by applying the PF setting to NN input 1408, e.g., as described above.

In some demonstrative aspects, e.g., as shown in FIG. 14A, controller 1400 may include an extractor 1406 to extract a plurality of reference acoustic patterns, e.g., disjoint reference acoustic patterns, from inputs 1404. According to these aspects, input 1408 may include one or more of the plurality of reference acoustic patterns.

In some demonstrative aspects, controller 1400 may generate signal 1412 configured to reduce and/or eliminate the noise produced by one or more noise sources, e.g., as described above.

In some demonstrative aspects, controller 1400 may generate sound control signal 1412 configured to reduce and/or eliminate the noise energy and/or wave amplitude of one or more sound patterns within the sound control zone, while the noise energy and/or wave amplitude of one or more other sound patterns may not be affected within the sound control zone.

In some demonstrative aspects, sound control signal 1412 may be configured to reduce and/or eliminate the noise produced by one or more vehicular systems, e.g., as described above.

In some demonstrative aspects, feature extractor 1406 may be configured to determine, update, and/or adjust, e.g., in real-time, a setting of at least one acoustic pattern extractor parameter, for example, based on the AAC information 1429, and to determine the plurality of reference acoustic patterns for NN input 1408, for example, based on the acoustic pattern extractor parameter setting, e.g., as described above.

In other aspects, controller 1400 may not include extractor 1406. Accordingly, NN input 1408 may include inputs 1404 and/or any other input based on inputs 1404.

In some demonstrative aspects, NN-based estimator 1410 may apply any suitable linear and/or non-linear estimation function to input 1408. For example, the estimation function implemented by NN-based estimator 1410 may include a non-linear estimation function, e.g., a radial basis function.

In other aspects, any other additional or alternative suitable estimation function may be implemented by NN-based estimator 1410.

In some demonstrative aspects, NN-based estimator 1410 may be configured to generate the sound control signal 1412, for example, based on one or more inputs of acoustic sensor information 1416 corresponding to one or more acoustic sensing locations, e.g., as described above.

In some demonstrative aspects, the one or more inputs of acoustic sensor information 1416 may include residual noise sensor information corresponding to one or more residual noise sensing locations, for example, one or more residual noise sensing locations 107 (FIG. 2), e.g., as described above.

In some demonstrative aspects, the one or more inputs of acoustic sensor information 1416 may include monitoring sensor information corresponding to one or more residual monitoring locations, for example, one or more monitoring locations 102 (FIG. 2), e.g., as described above.

In some demonstrative aspects, the one or more inputs of acoustic sensor information 1416 may include information from an acoustic sensor at an acoustic sensing location, e.g., as described above.

In some demonstrative aspects, the one or more inputs of acoustic sensor information 1416 may include virtual sensor information corresponding to a virtual acoustic sensor at a virtual acoustic sensing location, e.g., as described above.

In some demonstrative aspects, the one or more inputs of acoustic sensor information 1416 may include at least one virtual microphone input corresponding to a residual noise ("noise error") sensed by at least one virtual error sensor at least one particular residual-noise sensor location of locations 107 (FIG. 2). For example, controller 1400 may evaluate the noise error at the particular residual-noise sensor location based on inputs 1408 and the predicted noise signal 1412, e.g., as described below.

In some demonstrative aspects, NN-based estimator 1410 may include a multi-input-multi-output (MIMO) prediction unit configured, for example, to generate a plurality of sound control patterns corresponding to an n-th sample, e.g., including M control patterns, denoted $y_1(n) \ldots y_M(n)$, to drive a plurality of M respective acoustic transducers 1414, e.g., based on the inputs 1408.

In some demonstrative aspects, as shown in FIG. 14A, controller 1400 may include an AFB mitigator component ("Echo Canceller") 1418 configured to reduce, remove, and/or cancel, partially or entirely, a portion of the signal generated by the acoustic transducer 1414 from an input signal 1404.

In one example, AFB mitigator 1418 may be configured to mitigate AFB between acoustic transducer 1414, e.g., one or more acoustic transducers 108 (FIG. 1), and one or more noise inputs 1402, e.g., noise inputs 160 (FIG. 1).

In some demonstrative aspects, AFB mitigator 1418 may be configured to generate an AFB mitigation signal 1459, for example, by applying an AFB setting 1451 to an acoustic transducer signal 1457, which may include, or may be based on, the acoustic transducer signal 1412 to be provided to the acoustic transducer 1414, e.g., as described below.

In some demonstrative aspects, the AFB setting 1451 may include a plurality of AFB mitigation coefficients to be applied to the acoustic transducer signal 1457, for example, to generate the AFB mitigation signal 1459. For example, AFB mitigator 1418 may be configured to filter the acoustic transducer signal 1457 according to the AFB setting 1451, for example, based on a product of the acoustic transducer signal 1457 with the AFB mitigation coefficients.

In some demonstrative aspects, controller 1400 may be configured to determine an AFB-mitigated signal, for example, by subtracting the AFB mitigation signal 1459 from the input signal 1404.

In some demonstrative aspects, AFB mitigator 1418 may include an AFB mitigation NN 1455, which may be trained to generate the AFB setting 1451, for example, based on the AAC information 1429. For example, AFB mitigation NN 155 (FIG. 1) may include AFB mitigation NN 1455 and/or may perform one or more operations and/or functionalities of AFB mitigation NN 1455.

Figure 14B:
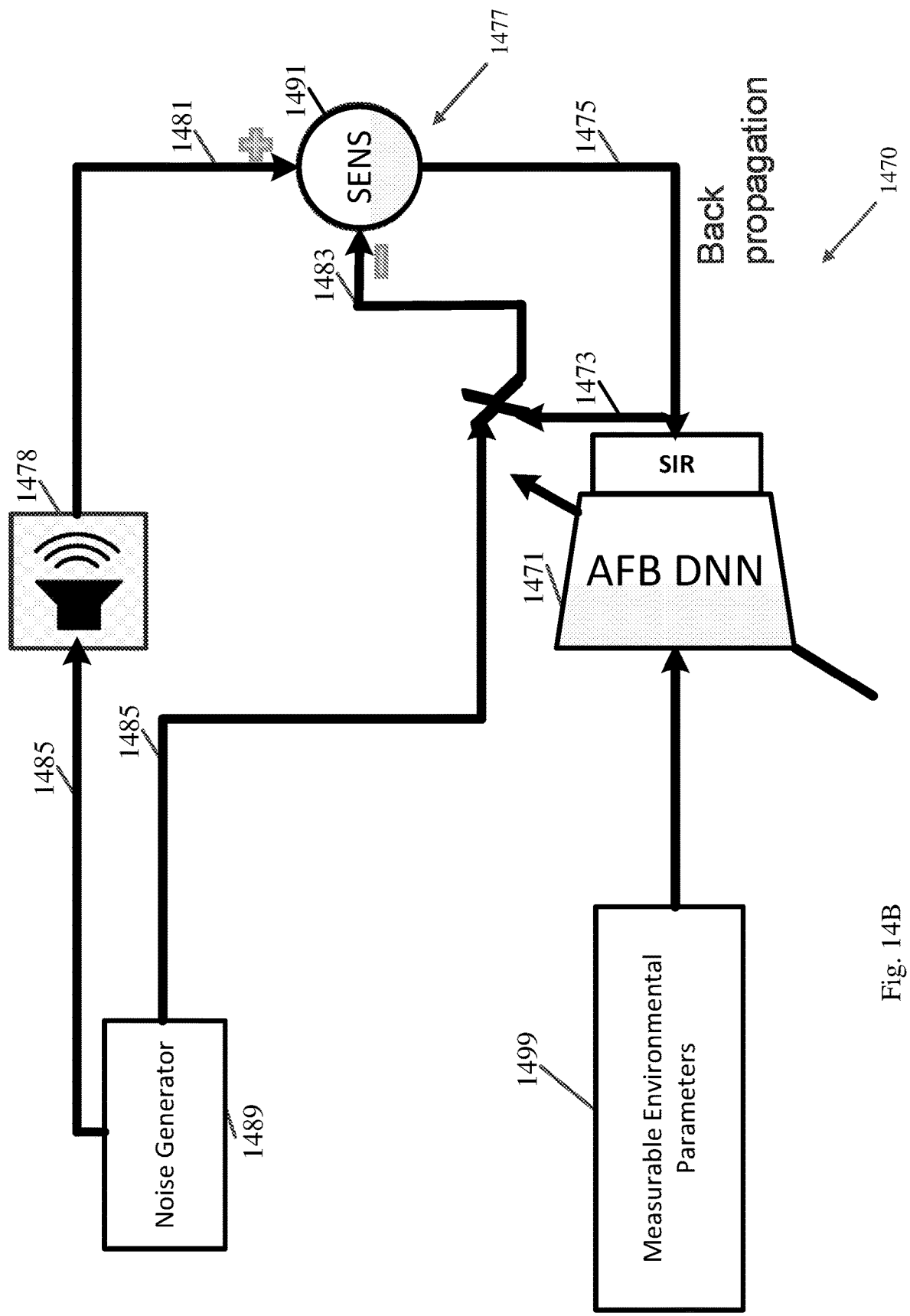
FIG. 14B is a schematic block diagram illustration of a training scheme to train an Acoustic Feedback (AFB) mitigator NN, in accordance with some demonstrative aspects.

Reference is made to FIG. 14B, which schematically illustrates a training scheme 1470 to train an AFB mitigation NN 1471, in accordance with some demonstrative aspects.

For example, AFB mitigation NN 1455 (FIG. 14A) may include one or more elements of AFB mitigation NN 1471 and/or may perform one or more operations and/or functionalities of AFB mitigation NN 1471.

In some demonstrative aspects, AFB mitigation NN 1471 may be trained to generate an AFB mitigation setting 1473 to be applied for AFB mitigation between an acoustic transducer 1478 and an acoustic sensing location 1477, e.g., an error sensing location, a monitoring sensing location, and/or a noise sensing location.

In some demonstrative aspects, AFB mitigation NN 1471 may be trained to generate the AFB setting 1473, for example, based on AAC information 1499. For example, AAC information 1499 may include AAC information 129 (FIG. 1) from information sources 120 (FIG. 1).

In some demonstrative aspects, as shown in FIG. 14B, AFB mitigation NN 1471 may be trained based on a sensed acoustic signal 1475 at an acoustic sensing location 1477. In one example, signal 1475 may be sensed by an acoustic sensor 1491 at acoustic sensing location 1477.

In one example, acoustic sensor 1491 may include a noise sensor, e.g., reference noise sensor 119 (FIG. 1).

In another example, acoustic sensor 1491 may include a residual-noise sensor, e.g., residual-noise sensor 121 (FIG. 1).

In some demonstrative aspects, signal 1475 may be based on a difference between a first signal 1481 and a second signal 1483, e.g., as described below.

In some demonstrative aspects, the first signal 1481 may be based on a sound control pattern 1485 from a noise generator 1489, which may be applied to the acoustic transducer 1478, and received by acoustic sensor 1491 at acoustic sensing location 1477, e.g., via an actual TTF (STF) between acoustic transducer 1478 and the acoustic sensing location 1477.

In some demonstrative aspects, the second signal 1483 may be generated, for example, by applying the AFB setting 1473, which is generated by the AFB mitigation NN 1471, to the sound control pattern 1485 from the noise generator 1489.

In some demonstrative aspects, for example, during training of the AFB mitigation NN 1471, a predefined noise pattern 1485 may be generated by noise generator 1489, a predefined setting of AAC information 1499 may be provided as NN input to AFB mitigation NN 1471, and the signal 1475 may be determined.

In some demonstrative aspects, for example, during training of the AFB mitigation NN 1471, determination of the sensed acoustic signal 1475, may be repeated, for example, for multiple different predefined noise patterns 1485 and/or multiple different predefined settings of the AAC information 1499.

In some demonstrative aspects, for example, during training of the AFB mitigation NN 1471, the AFB mitigation NN 1471 may be trained, for example, based on a training criterion to minimize, or eliminate, the sensed acoustic signal 1475.

Figure 15:
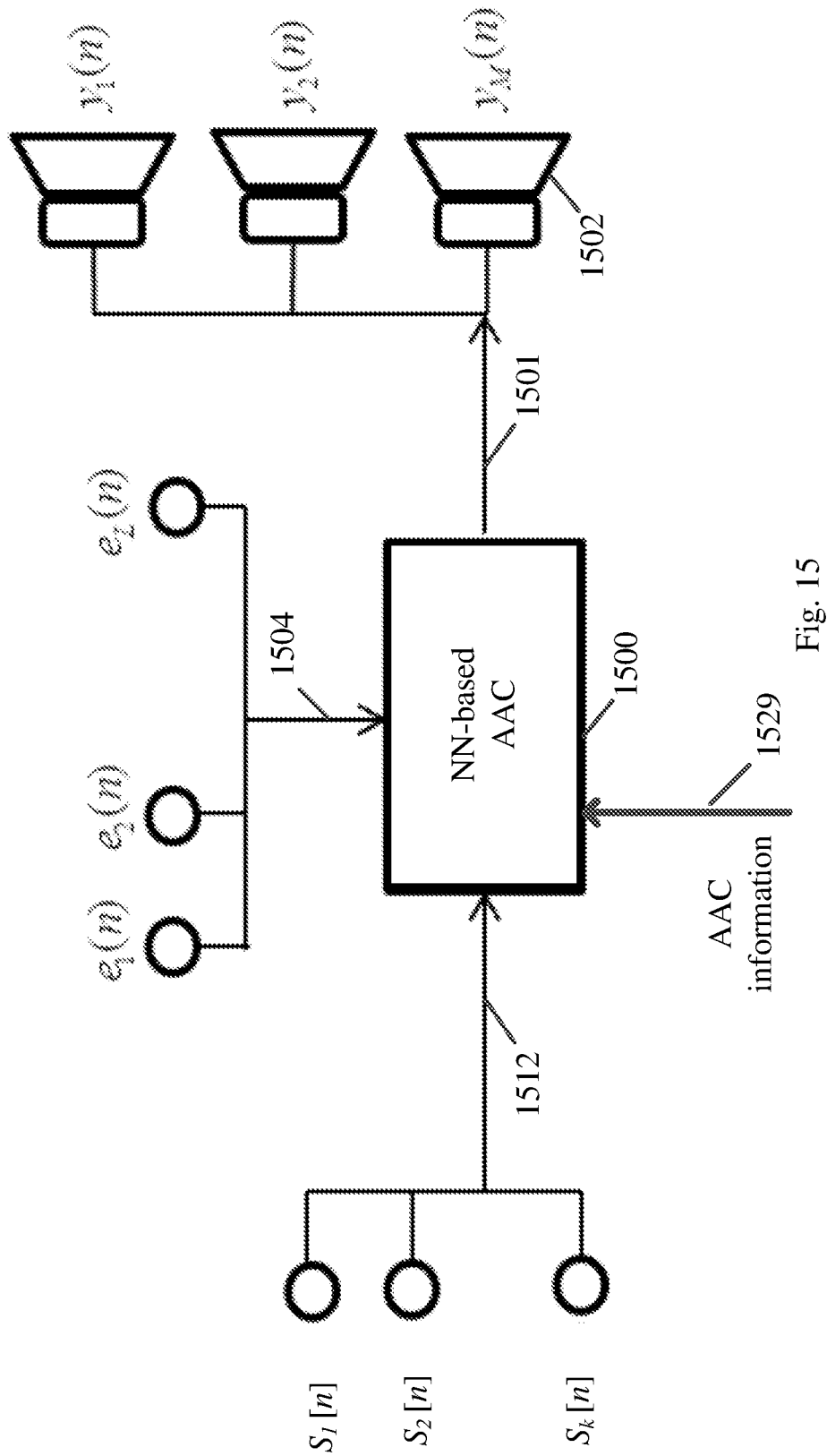
FIG. 15 is a schematic block diagram illustration of an NN-based Multiple-Input-Multiple-Output (MIMO) prediction unit, in accordance with some demonstrative aspects.

Reference is now made to FIG. 15, which schematically illustrates a MIMO prediction unit 1500, in accordance with some demonstrative aspects. In some demonstrative aspects, NN-based estimator 1410 (FIG. 14A) may include MIMO prediction unit 1500, and/or perform one or more functionalities of, and/or operations of, MIMO prediction unit 1500.

In some demonstrative aspects, as shown in FIG. 15, prediction unit 1500 may be configured to receive AAC information 1529, e.g., including the AAC information 129 (FIG. 1).

In some demonstrative aspects, as shown in FIG. 15, prediction unit 1500 may be configured to receive an input 1512, e.g., which may be based on the noise inputs 1402 (FIG. 14A). For example, input 1512 may be based on an output from extractor 1406 (FIG. 14A), e.g., as described above.

In some demonstrative aspects, as shown in FIG. 15, prediction unit 1500 may be configured to drive a loudspeaker array 1502 including M acoustic transducers, e.g., acoustic transducers 108 (FIG. 2). For example, prediction unit 1500 may generate a controller output 1501 including the M sound control patterns $y_1(n) \ldots y_M(n)$, to drive a plurality of M respective acoustic transducers, e.g., acoustic transducers 108 (FIG. 2), for example, based on the inputs 1408 (FIG. 14A).

In some demonstrative aspects, interference (cross-talk) between two or more of the M acoustic transducers of array 1502 may occur, for example, when two or more, e.g., some or all of, the M acoustic transducers generate the control noise pattern, e.g., simultaneously.

In some demonstrative aspects, prediction unit 1500 may generate output 1501 configured to control array 1502 to generate a substantially optimal sound control pattern, e.g., while simultaneously optimizing the input signals to each speaker in array 1502. For example, prediction unit 1500 may control the multi-channel speakers of array 1502, e.g., while cancelling the interference between the speakers.

Figure 16:
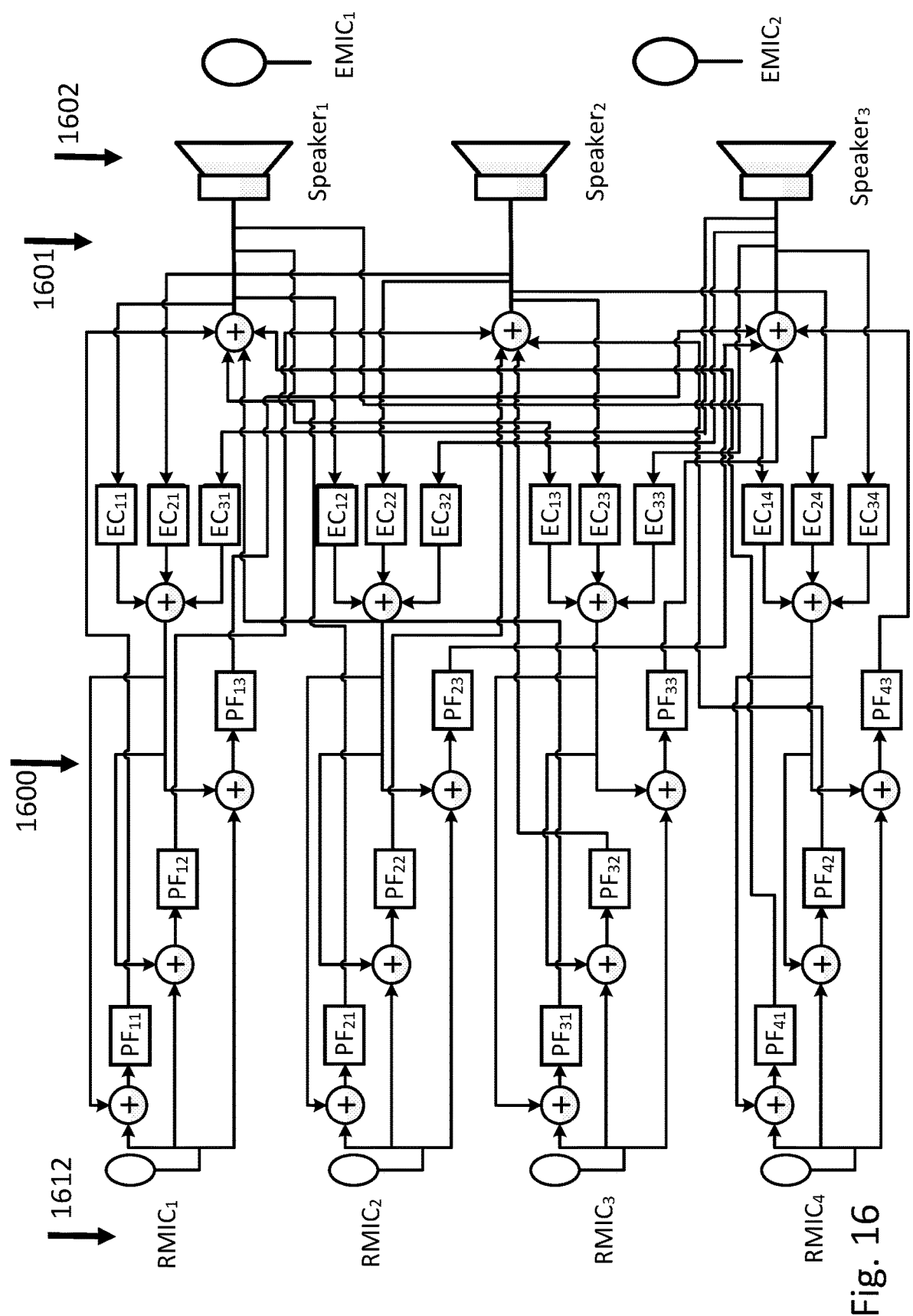
FIG. 16 is a schematic illustration of an implementation of components of a controller of an AAC system, in accordance with some demonstrative aspects.

Reference is made to FIG. 16, which schematically illustrates an implementation of a controller 1600 in an AAC system, in accordance with some demonstrative aspects. For example, controller 193 (FIG. 1), controller 1400 (FIG. 14A) and/or NN-based AAC system 400 (FIG. 4) may include one or more elements of controller 1600 (FIG. 16) and/or may perform one or more operations and/or functionalities of controller 1600.

In some demonstrative aspects, controller 1600 may be configured to receive inputs 1612 including residual noise from a plurality of Microphones (RMIC), and to generate output signals 1601 to drive a speaker array 1602 including M acoustic transducers, e.g., three speakers or any other number of speakers. For example, the inputs 1612 may include inputs 106 (FIG. 1), inputs 1416 (FIG. 14A) and/or inputs 404 (FIG. 4).

In some demonstrative aspects, as shown in FIG. 16, controller 1600 may include a plurality of Prediction Filters, denoted PF, on paths between inputs 1612 and outputs signals 1601.

In some demonstrative aspects, controller 1600 may include a PF NN, e.g., PF NN 152 (FIG. 1) and/or PF NN 452 (FIG. 4), which may be configured to configure, determine, update and/or set one or parameters of one or more of the PFs on one or more paths between inputs 1612 and outputs signals 1601, for example, based on AAC information 129 (FIG. 1), e.g., as described above.

In some demonstrative aspects, controller 1600 may include an AFB NN, e.g., AFB NN 155 (FIG. 1) and/or AFB NN 1455 (FIG. 14A), which may be configured to configure, determine, update and/or set one or more parameters of one or more of the AFB settings, e.g., EC settings, to be applied on one or more paths between output signals 1601 and inputs 1612, for example, based on AAC information 129 (FIG. 1), e.g., as described above.

Referring back to FIG. 1, in some demonstrative aspects, AAC controller 193 may be configured according to a hybrid PF scheme, e.g., as described below.

In some demonstrative aspects, the hybrid PF scheme may be configured to utilize at least one NN-based noise prediction filter and/or at least one NN-based residual-noise prediction filter, e.g., as described below.

In some demonstrative aspects, the NN-based noise prediction filter may be configured to be applied to a prediction filter input, which may be based on the noise input 104, e.g., as described below.

In some demonstrative aspects, the NN-based residual-noise prediction filter may be configured to be applied to a prediction filter input, which may be based on acoustic sensor information at one or more acoustic sensing locations, e.g., as described below. For example, the acoustic sensor information at the one or more acoustic sensing locations may include the residual-noise input 106 at residual-noise sensing location 107, and/or the monitoring input at monitoring location 103, e.g., as described above.

Figure 17:
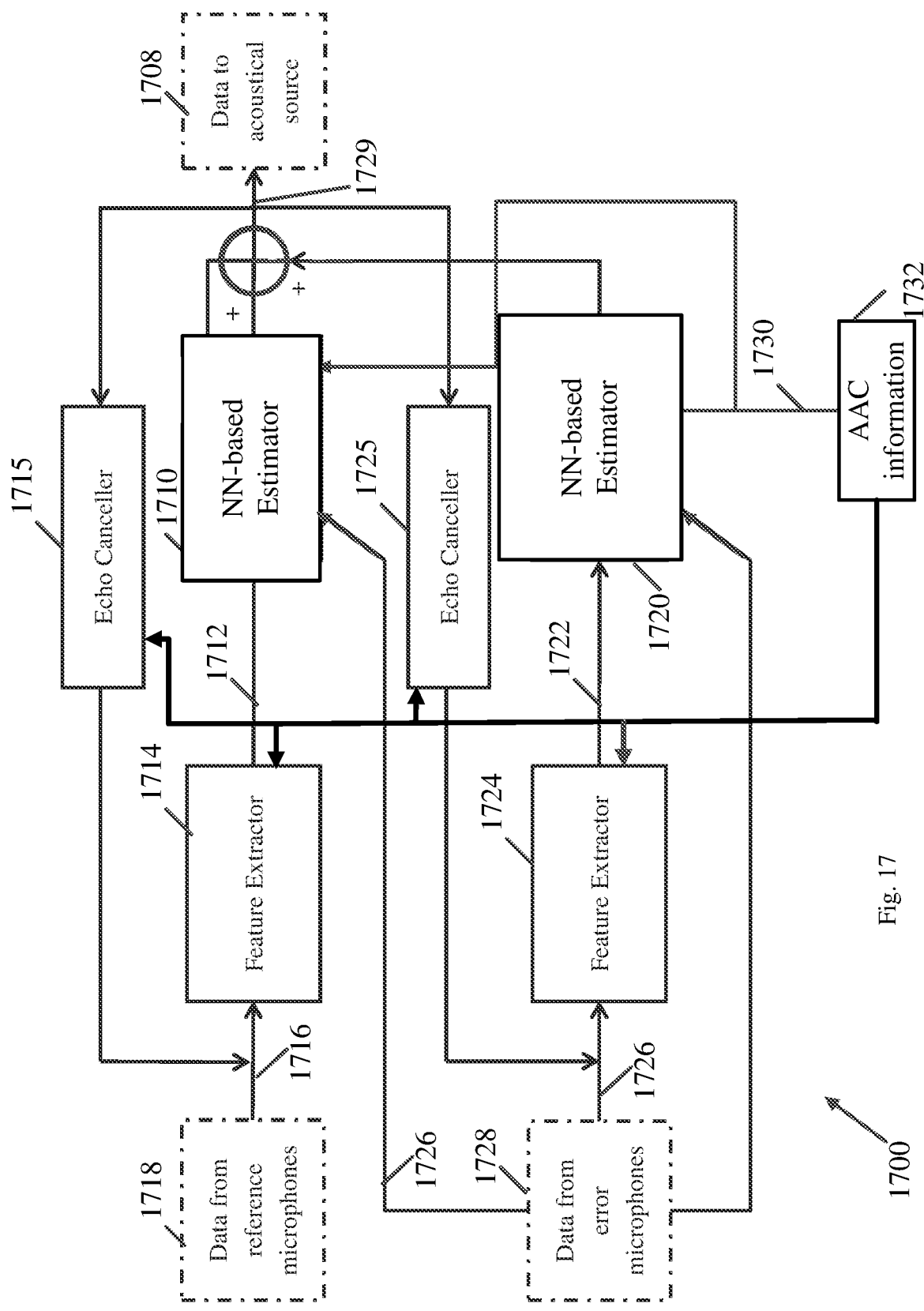
FIG. 17 is a schematic block diagram illustration of a controller, in accordance with some demonstrative aspects.

Reference is now made to FIG. 17, which schematically illustrates a controller 1700, in accordance with some demonstrative aspects. For example, controller 193 (FIG. 1) may include one or more elements of controller 1700 and/or may perform one or more operations and/or functionalities of controller 1700.

In some demonstrative aspects, controller 1700 may be configured according to the hybrid PF scheme.

In some demonstrative aspects, as shown in FIG. 17, controller 1700 may include at least one of an NN-based estimator 1710, and/or an NN-based estimator 1720, e.g., as described below.

In some demonstrative aspects, as shown in FIG. 17, the NN-based estimator 1710 may include a noise NN-based estimator to be applied to an NN-based estimator input 1712, which may be based on a noise input 1716, for example, from one or more noise sensors 1718 ("reference microphones"). For example, the NN-based estimator input 1712 may be based on noise input 104 (FIG. 1).

In some demonstrative aspects, the NN-based estimator 1720 may include a residual-noise NN-based estimator to be applied to an NN-based estimator input 1722, which may be based on a residual-noise input 1726. For example, the residual-noise input 1726 may include acoustic sensor information at one or more acoustic sensing locations. For example, residual-noise input 1726 may represent, for example, residual noise sensed by one or more residual-noise sensors 1728 ("error microphones") at one or more residual-noise sensing locations, e.g., as described above. For example, NN-based estimator input 1722 may be based on residual-noise input 106 (FIG. 1). For example, NN-based estimator 1710 and/or NN-based estimator 1720 may be configured to perform one or more operations and/or functionalities of an NN-based PF, e.g., NN-based PF 152 (FIG. 1) and/or NN-based PF 452 (FIG. 4), as described above.

In some demonstrative aspects, input 1726 may include at least one virtual microphone input corresponding to a residual noise ("noise error") sensed by at least one virtual error sensor at virtual sensing location. For example, controller 1700 may evaluate the noise error at a virtual sensing location based on input 1726 and the predicted noise signal 1729.

In some demonstrative aspects, as shown in FIG. 17, controller 1700 may generate a sound control signal 1729 based on an output of the prediction unit 1710 and an output of the NN-based estimator 1720, and may output the sound control signal 1729 to an acoustic transducer 1708.

In some demonstrative aspects, controller 1700 may generate sound control signal 1729 configured to reduce and/or eliminate the noise energy and/or wave amplitude of one or more sound patterns within a sound control zone, while the noise energy and/or wave amplitude of one or more other sound patterns may not be affected within the sound control zone, e.g., as described below.

In some demonstrative aspects, e.g., as shown in FIG. 17, controller 1700 may include an extractor 1714 to extract a plurality of reference acoustic patterns, e.g., disjoint reference acoustic patterns, from input 1716. According to these aspects, NN-based estimator input 1712 may include the plurality of reference acoustic patterns, e.g., the disjoint reference acoustic patterns. In other aspects, extractor 1714 may be excluded, and NN-based estimator input 1712 may be generated directly or indirectly based on input 1716, e.g., according to any other algorithm and/or calculation.

In some demonstrative aspects, e.g., as shown in FIG. 17, controller 1700 may include an extractor 1724 to extract a plurality of residual-noise acoustic patterns, e.g., disjoint residual-noise acoustic patterns, from input 1726. According to these aspects, NN-based estimator input 1722 may include the plurality of residual-noise acoustic patterns, e.g., the disjoint residual-noise acoustic patterns. In other aspects, extractor 1724 may be excluded, and NN-based estimator input 1722 may be generated directly or indirectly based on input 1726, e.g., according to any other algorithm and/or calculation.

In some demonstrative aspects, as shown in FIG. 17, controller 1700 may include an echo processing component ("Echo Canceller") 1715 configured to reduce, remove, and/or cancel, partially or entirely, a portion of the signal generated by the speaker 1708 from the reference acoustic information 1716 of the reference microphones 1718, e.g., as described above.

In some demonstrative aspects, echo canceller 1715 may include an AFB mitigation NN, e.g., AFB NN 155 (FIG. 1), which may be trained to generate EC coefficients for echo canceller 1715, for example, based on the AAC information 1732, e.g., as described above.

In some demonstrative aspects, as shown in FIG. 17, controller 1700 may include an echo processing component ("Echo Canceller") 1725 configured to reduce, remove, and/or cancel, partially or entirely, a portion of the signal generated by the speaker 1708 from the acoustic information 1726, e.g., at an output signal of the residual-noise microphone 1728, e.g., as described above.

In some demonstrative aspects, echo canceller 1725 may include an AFB mitigation NN, e.g., AFB NN 155 (FIG. 1), which may be trained to generate EC coefficients for echo canceller 1725, for example, based on the AAC information 1732, e.g., as described above.

In some demonstrative aspects, controller 1700 may be configured to determine, update, and/or adjust, e.g., in real-time, a setting of at least one acoustic pattern extractor parameter of extractor 1714 and/or extractor 1724, for example, based on the AAC information 1732. For example, extractor 1714 may be configured to determine the plurality of reference acoustic patterns, e.g., the disjoint reference acoustic patterns, for input 1712, for example, based on the acoustic pattern extractor parameter setting, which is based on the AAC information 1732. For example, extractor 1724 may be configured to determine the plurality of residual-noise acoustic patterns, e.g., the disjoint residual-noise acoustic patterns, for input 1722, for example, based on the acoustic pattern extractor parameter setting, which is based on the AAC information 1732.

Figure 18:
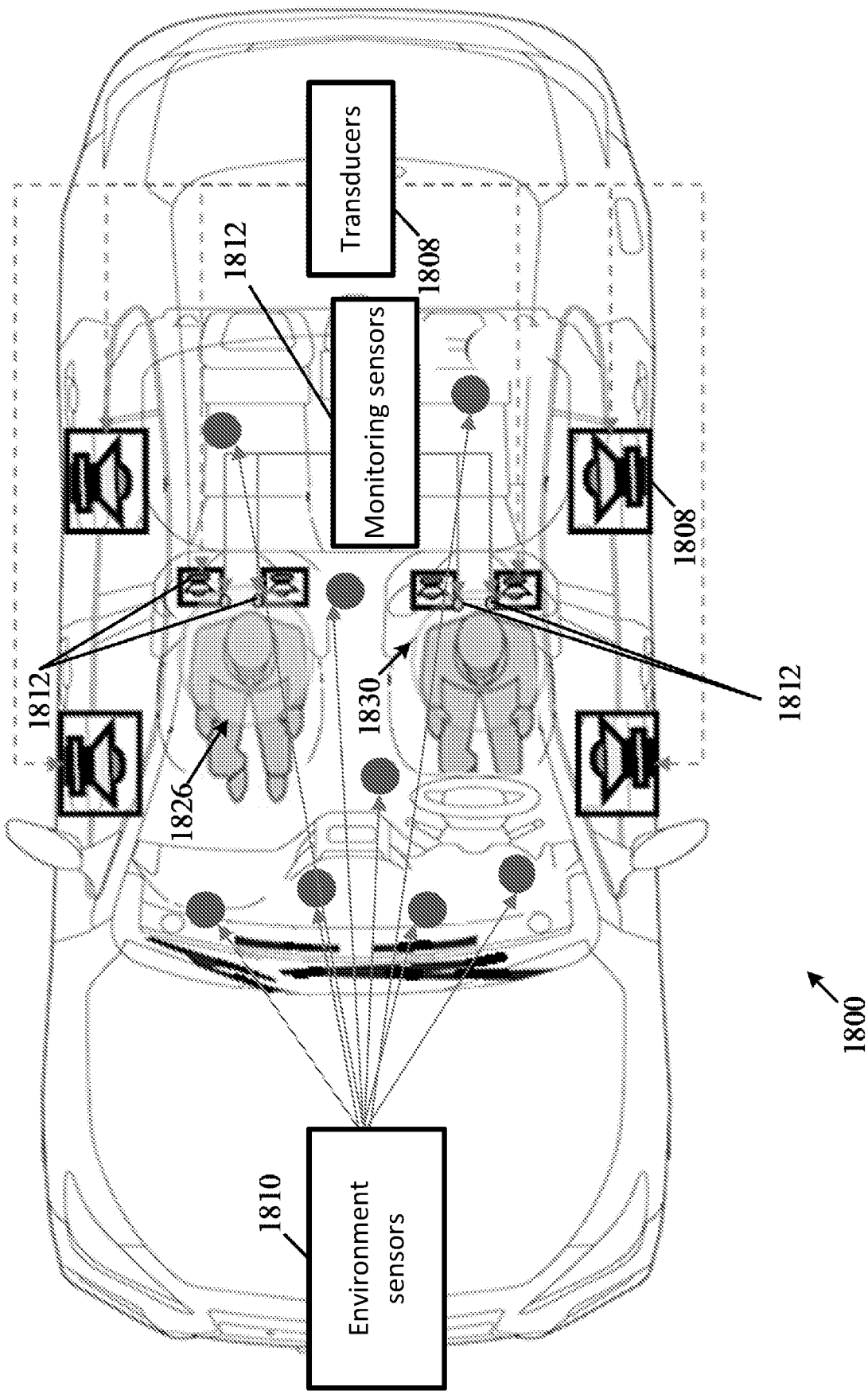
FIG. 18 is a schematic illustration of a vehicle including an AAC system, in accordance with some demonstrative aspects.

Reference is made to FIG. 18, which schematically illustrates a vehicle 1800 including an AAC system, in accordance with some demonstrative aspects.

In one example, vehicle 1840 may include one or more elements and/or components of AAC system 100 (FIG. 1), which may be configured, for example, for controlling sound within one or more sound control zones within vehicle 1800.

In some demonstrative aspects, as shown in FIG. 18, vehicle 1800 may include a plurality of speakers 1808, a plurality of reference sensors ("environment microphones") 1810, and a plurality of residual-noise sensors ("monitoring microphones") 1812.

In some demonstrative aspects, vehicle 1800 may include AAC controller 102 (FIG. 1) configured to control the plurality of speakers 1808 to provide a first sound control zone 1830 for a driver of the vehicle 1800, e.g., at a location of a headrest of a driver seat.

In some demonstrative aspects, AAC controller 102 (FIG. 1) may be configured to control the plurality of speakers 1808 to provide a second sound control zone 1826, for example, for a passenger, e.g., at a front seat near the driver seat, for example, at a location of a headrest of the passenger seat.

In some demonstrative aspects, as shown in FIG. 18, the plurality of monitoring microphones 1812 may be located within the first and/or second sound control zones 1830 and 1826.

In some demonstrative aspects, as shown in FIG. 18, the plurality of environment microphones 1810 may be located in an environment outside the sound control zones 1830 and 1826.

In other aspects, vehicle 1800 may include any other number of the plurality of speakers 1808, the plurality of monitoring microphones 1812, and/or the plurality of environment microphones 1810, any other arrangement, positions and/or locations of the plurality of speakers 1808, the plurality of monitoring microphones 1812, and/or the plurality of environment microphones 1810, and/or any other additional or alternative components.

Figure 19:
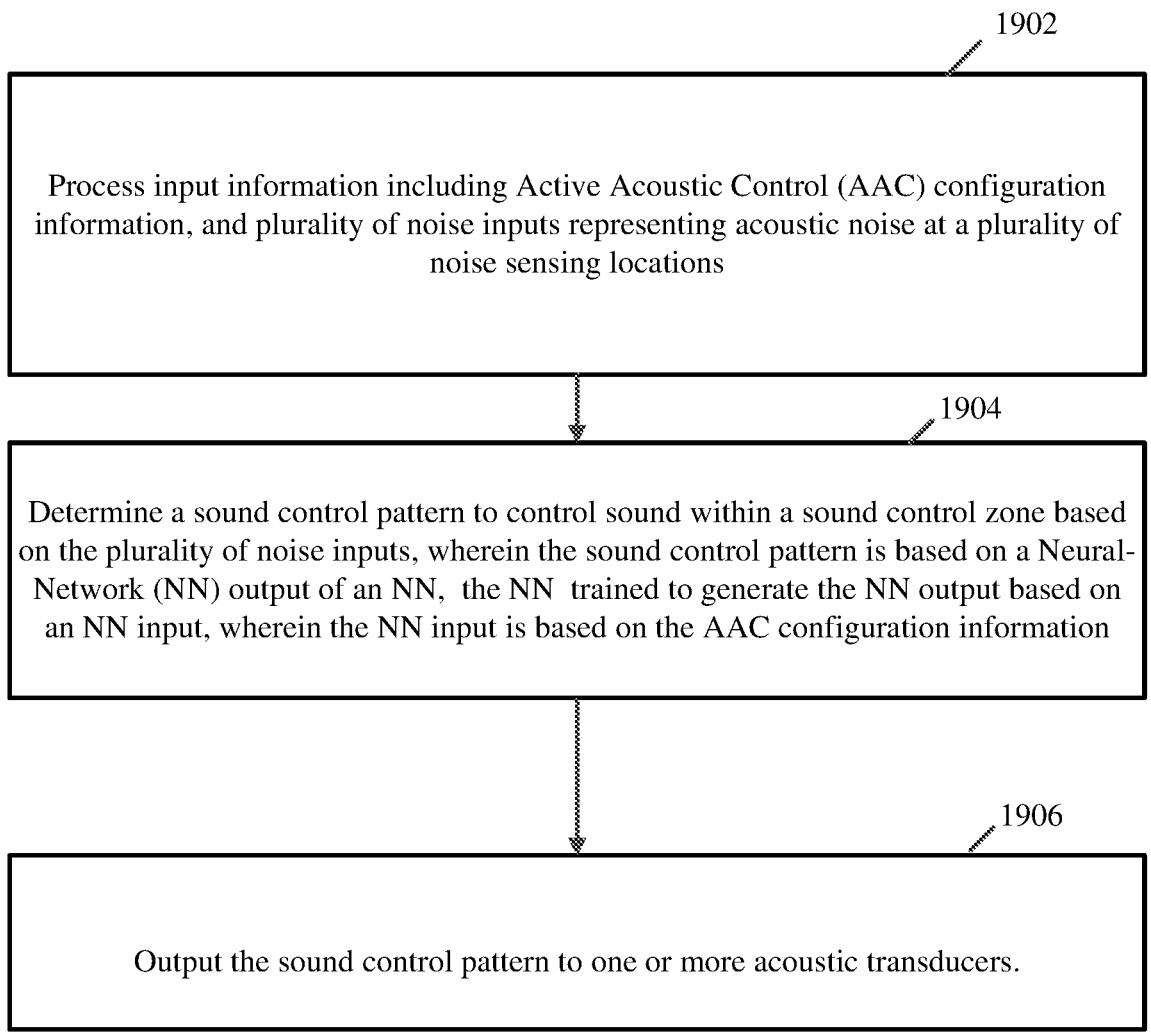
FIG. 19 is a schematic flow-chart illustration of a method of NN-based AAC, in accordance with some demonstrative aspects.

Reference is made to FIG. 19, which illustrates a method of NN-based AAC. For example, one or more of the operations of FIG. 19 may be performed by one or more components of an AAC system, e.g., AAC system 100 (FIG. 1), AA system 400 (FIG. 4), AAC system 700 (FIG. 7), AAC system 1000 (FIG. 10), and/or AAC system 1200 (FIG. 12), a controller, e.g., controller 102 (FIG. 1), controller 193 (FIG. 1), controller and/or 1400 (FIG. 14A), MIMO prediction unit 1500 (FIG. 15), controller 1600 (FIG. 16), and/or controller 1700 (FIG. 7).

In some demonstrative aspects, as indicated at block 1902, the method may include processing input information including Active Acoustic Control (AAC) configuration information, and plurality of noise inputs representing acoustic noise at a plurality of noise sensing locations, e.g., in a vehicle. For example, controller 193 (FIG. 1) may be configured to process input information 195 (FIG. 1) including the noise inputs 104 (FIG. 1) (FIG. 1), and/or the AAC input 129 (FIG. 1), e.g., as described above.

In some demonstrative aspects, as indicated at block 1904, the method may include determining a sound control pattern to control sound within a sound control zone based on the plurality of noise inputs. For example, the sound control pattern may be based on an NN output of an NN trained to generate the NN output based on an NN input. For example, the NN input may be based on the AAC configuration information. For example, controller 193 (FIG. 1) may be configured to determine the sound control pattern based on the plurality of noise inputs 104 (FIG. 1), for example, by determining the sound control pattern based on an NN output of NN 150 (FIG. 1), which may be trained to generate the NN output based on an NN input including the AAC configuration information 129 (FIG. 1), e.g., as described above.

In some demonstrative aspects, as indicated at block 1906, the method may include outputting the sound control pattern to one or more acoustic transducers. For example, controller 193 (FIG. 1) may be configured to output sound control signal 109 (FIG. 1) to control acoustic transducers 108 (FIG. 1) to generate the sound control pattern, e.g., as described above.

Figure 20:
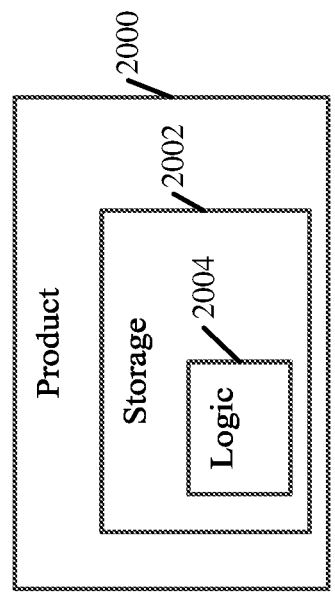
FIG. 20 is a schematic block diagram illustration of a product of manufacture, in accordance with some demonstrative aspects.

Reference is made to FIG. 20, which schematically illustrates a product of manufacture 2000, in accordance with some demonstrative aspects. Product 2000 may include one or more tangible computer-readable ("machine readable") non-transitory storage media 2002, which may include computer-executable instructions, e.g., implemented by logic 2004, operable to, when executed by at least one processor, e.g., a computer processor, enable the at least one processor to implement one or more operations of one or more elements of AAC system 100 (FIG. 1), controller 102 (FIG. 1), controller 193 (FIG. 1), NN 150 (FIG. 1), AAC system 400 (FIG. 4), AAC system 700 (FIG. 7), AAC system 1000 (FIG. 10), AAC system 1200 (FIG. 12), controller 1400 (FIG. 14A), MIMO prediction unit 1500 (FIG. 15), and/or controller 1700 (FIG. 7); to cause, trigger, and/or control one or more elements of AAC system 100 (FIG. 1), controller 102 (FIG. 1), controller 193 (FIG. 1), NN 150 (FIG. 1), AAC system 400 (FIG. 4), AAC system 700 (FIG. 7), AAC system 1000 (FIG. 10), AAC system 1200 (FIG. 12), controller 1400 (FIG. 14A), MIMO prediction unit 1500 (FIG. 15), and/or controller 1700 (FIG. 7) to perform one or more operations, and/or to perform, trigger and/or implement one or more operations, communications and/or functionalities described above with reference to FIGS. 1-19, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2000 and/or machine-readable storage media 2002 may include one or more types of computer-readable storage media capable of storing data, including volatile memory, non-volatile memory, removable or non-removable memory, erasable or non-erasable memory, writeable or re-writeable memory, and the like. For example, machine-readable storage media 2002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising an input to receive input information, the input information comprising Active Acoustic Control (AAC) configuration information; and a plurality of noise inputs representing acoustic noise at a plurality of noise sensing locations; a controller comprising logic and circuitry, the controller configured to process the input information to determine a sound control pattern to control sound within a sound control zone based on the plurality of noise inputs, wherein the controller comprises a Neural-Network (NN) trained to generate an NN output based on an NN input, wherein the NN input is based on the AAC configuration information, wherein the controller is configured to generate the sound control pattern based on the NN output; and an output to output the sound control pattern to one or more acoustic transducers.

Example 2 includes the subject matter of Example 1, wherein the NN comprises a Prediction Filter (PF) NN trained to generate the NN output comprising a PF setting based on the NN input, wherein the controller is configured to generate the sound control pattern by applying to noise information a PF, which is configured according to the PF setting, wherein the noise information is based on the plurality of noise inputs.

Example 3 includes the subject matter of Example 2, and optionally, wherein the PF setting comprises a plurality of PF coefficients.

Example 4 includes the subject matter of Example 2 or 3, and optionally, wherein the controller comprises a parameter extractor configured to determine extracted AAC parameter information based on sensor information from one or more sensors, wherein the NN input comprises the extracted AAC parameter information.

Example 5 includes the subject matter of Example 4, and optionally, wherein the parameter extractor comprises a Principal Component Analysis (PCA) extractor configured to determine the extracted AAC parameter information based on PCA of the sensor information.

Example 6 includes the subject matter of Example 4 or 5, and optionally, wherein the sensor information comprises at least one of noise sensor information from one or more noise sensors, residual noise sensor information from one or more residual noise sensors, monitoring sensor information from one or more monitoring sensors, or virtual sensor information from one or more virtual sensors.

Example 7 includes the subject matter of any one of Examples 4-6, and optionally, wherein the extracted AAC parameter information comprises at least one of road type information, cabin state information, passenger position information, vehicle system state information, noise characteristic information, or noise state information, wherein the road type information comprises information corresponding to a type of road traveled by a vehicle comprising the sound control zone, wherein the cabin state information comprises information corresponding to a state of a cabin of the vehicle, wherein the passenger position information comprises information corresponding to a position of one or more passengers in the cabin of the vehicle, wherein the vehicle system state information comprises information corresponding to a state of a system of the vehicle, wherein the noise characteristic information comprises information representing one or more characteristics of noise to be mitigated, wherein the noise state information comprises information corresponding to a state of the noise to be mitigated.

Example 8 includes the subject matter of any one of Examples 2-7, and optionally, wherein the controller is configured to train the PF NN based a noise error at one or more error sensing locations.

Example 9 includes the subject matter of any one of Examples 2-8, and optionally, wherein the controller is to configure the PF NN based on a Transducer Transfer Function (TTF) setting of a TTF between the one or more acoustic transducers and one or more acoustic sensing locations.

Example 10 includes the subject matter of Example 9, and optionally, wherein the one or more acoustic sensing locations comprises at least one of a residual noise sensing location within the sound control zone, a monitoring sensing location, or a noise sensing location external to the sound control zone.

Example 11 includes the subject matter of any one of Examples 2-10, and optionally, wherein the controller comprises a Transducer Transfer Function (TTF) NN trained to determine a TTF setting based on the AAC configuration information, wherein the TTF setting comprises a setting of a TTF between the one or more acoustic transducers and one or more acoustic sensing locations, wherein the controller is to configure the PF NN based on the TTF setting.

Example 12 includes the subject matter of Example 11, and optionally, wherein the one or more acoustic sensing locations comprises at least one of a residual noise sensing location within the sound control zone, a monitoring sensing location external to the sound control zone, or a noise sensing location external to the sound control zone.

Example 13 includes the subject matter of Example 11 or 12, and optionally, wherein the controller is configured to train the TTF NN based on sensed acoustic information corresponding to the one or more acoustic sensing locations.

Example 14 includes the subject matter of any one of Examples 2-13, and optionally, wherein the input information comprises noise error information representing a noise error at one or more error sensing locations, wherein the controller is configured to determine the noise information based on the noise error information.

Example 15 includes the subject matter of any one of Examples 1-14, and optionally, wherein the controller comprises a parameter extractor configured to determine extracted AAC parameter information based on the AAC configuration information, wherein the NN input comprises the extracted AAC parameter information.

Example 16 includes the subject matter of any one of Examples 1-15, and optionally, wherein the NN input comprises noise error information representing a noise error at one or more error sensing locations.

Example 17 includes the subject matter of any one of Examples 1-16, and optionally, wherein the input information comprises noise error information representing a noise error at one or more error sensing locations, wherein the NN input is based on the noise error information.

Example 18 includes the subject matter of any one of Examples 1-17, and optionally, wherein the NN comprises an Acoustic Feedback (AFB) mitigator NN trained to generate the NN output comprising an AFB setting based on the NN input, wherein the controller is configured to generate an AFB mitigation signal by applying the AFB setting to an acoustic transducer signal according to the sound control pattern, wherein the controller is to determine the sound control pattern based on the AFB mitigation signal.

Example 19 includes the subject matter of Example 1, and optionally, wherein the NN is trained to generate the NN output based on the NN input comprising the AAC configuration information and noise information based on the plurality of noise inputs.

Example 20 includes the subject matter of any one of Examples 1-19, and optionally, wherein the AAC configuration information comprises information corresponding to a configuration of AAC in the sound control zone.

Example 21 includes the subject matter of any one of Examples 1-20, and optionally, wherein the AAC configuration information comprises information representing a spectral distribution of acoustic signals in at least one of the sound control zone or an environment of the sound control zone.

Example 22 includes the subject matter of any one of Examples 1-21, and optionally, wherein the AAC configuration information comprises information representing one or more parameters affecting a real-time configuration of AAC in the sound control zone.

Example 23 includes the subject matter of any one of Examples 1-22, and optionally, wherein the AAC configuration information comprises information representing one or more physical properties of the sound control zone.

Example 24 includes the subject matter of any one of Examples 1-23, and optionally, wherein the AAC configuration information comprises information representing one or more acoustic properties of the sound control zone.

Example 25 includes the subject matter of any one of Examples 1-24, and optionally, wherein the plurality of noise inputs is based on noise sensed by one or more acoustic sensors, wherein the AAC configuration information comprises information from one or more information sources, which are different from the one or more acoustic sensors.

Example 26 includes the subject matter of any one of Examples 1-25, and optionally, wherein the plurality of noise inputs is based on noise sensed by one or more acoustic sensors, wherein the AAC configuration information comprises information from one or more information sources, which are independent of the one or more acoustic sensors.

Example 27 includes the subject matter of any one of Examples 1-26, and optionally, wherein the AAC configuration information comprises vehicle speed information corresponding to a speed of a vehicle comprising the sound control zone.

Example 28 includes the subject matter of any one of Examples 1-27, and optionally, wherein the AAC configuration information comprises engine information corresponding to an engine of a vehicle comprising the sound control zone.

Example 29 includes the subject matter of any one of Examples 1-28, and optionally, wherein the AAC configuration information comprises at least one of braking system information, road detection information, steering information, tire information, seat information, vehicle type information, or opening-state information, wherein the braking system information comprises information corresponding to a braking system of a vehicle comprising the sound control zone, the road detection information comprises information from a road detection system of the vehicle, the steering information comprises information corresponding to a steering system of the vehicle, the tire information comprises information corresponding to one or more tires of the vehicle, the seat information comprises information corresponding to at least one of a position or occupancy of one or more seats of the vehicle, the vehicle type information comprises information corresponding to a type of the vehicle, the opening-state information comprises information corresponding to a state of an opening of the vehicle.

Example 30 includes the subject matter of any one of Examples 1-29, and optionally, wherein the AAC configuration information comprises passenger information corresponding to one or more passengers of a vehicle comprising the sound control zone.

Example 31 includes the subject matter of any one of Examples 1-30, and optionally, wherein the AAC configuration information comprises audio-system information corresponding to an audio-system of a vehicle comprising the sound control zone.

Example 32 includes the subject matter of any one of Examples 1-31, and optionally, wherein the AAC configuration information comprises climate information corresponding to at least one of a climate inside the sound control zone or a climate outside the sound control zone.

Example 33 includes the subject matter of any one of Examples 1-32, and optionally, wherein the AAC configuration information comprises user position information corresponding to a position of at least one of a head or an ear of a user in the sound control zone.

Example 34 includes the subject matter of any one of Examples 1-33, and optionally, wherein the AAC configuration information comprises user identity information corresponding to an identity of a user to control a user preference with respect to the sound control zone.

Example 35 includes the subject matter of any one of Examples 1-34, and optionally, wherein the AAC configuration information comprises vehicular system configuration information corresponding to a configuration of a mode of operation of one or more vehicular systems of a vehicle comprising the sound control zone.

Example 36 includes the subject matter of any one of Examples 1-35, and optionally, wherein the AAC configuration information comprises vehicular sensor information from one or more vehicular sensors of a vehicle comprising the sound control zone.

Example 37 includes the subject matter of any one of Examples 1-36, and optionally, wherein the NN is trained to generate the NN output comprising a setting of one or more AAC parameters, wherein the controller is configured to generate the sound control pattern based on the setting of the one or more AAC parameters.

Example 38 includes the subject matter of Example 37, and optionally, wherein the setting of the one or more AAC parameters comprises a setting of at least one of a prediction filter, or a path transfer function.

Example 39 includes the subject matter of any one of Examples 1-38, and optionally, wherein the input is configured to receive the AAC configuration information via a system bus of a vehicle comprising the sound control zone.

Example 40 includes the subject matter of Example 39, and optionally, wherein the input is configured to receive the AAC configuration information via at least one of Controller Area Network (CAN) bus information received via a CAN bus of the vehicle, A to B (A2B) bus information received via an A2B bus of the vehicle, Media Oriented Systems Transport (MOST) bus information received via a MOST bus of the vehicle, wireless communication information received over a wireless communication link, or Ethernet bus information received via an Ethernet bus of the vehicle.

Example 41 includes the subject matter of any one of Examples 1-40, and optionally, wherein the NN comprises a Deep NN (DNN).

Example 42 includes an active Acoustic Control (AAC) system comprising one or more acoustic transducers; a plurality of noise sensing acoustic sensors to generate a plurality of noise inputs representing acoustic noise at a plurality of noise sensing locations; and a controller to process input information comprising AAC configuration information and the plurality of noise inputs, wherein the controller is to determine a sound control pattern to control sound within a sound control zone based on the plurality of noise inputs, and to output the sound control pattern to the one or more acoustic transducers, wherein the controller comprises a Neural-Network (NN) trained to generate an NN output based on an NN input, wherein the NN input is based on the AAC configuration information, wherein the controller is configured to generate the sound control pattern based on the NN output.

Example 43 includes the AAC system of Example 42, and optionally, including the apparatus of any of Examples 1-41.

Example 44 includes a vehicle including a plurality of seats, and the system of any of Examples 42-43.

Example 45 includes a product comprising one or more tangible computer-readable non-transitory storage media comprising instructions operable to, when executed by at least one processor, enable the at least one processor to cause an Active Acoustic Control (AAC) system to control sound within a sound control zone, the instructions, when executed, to cause the AAC system to process input information including Active Acoustic Control (AAC) configuration information, and plurality of noise inputs representing acoustic noise at a plurality of noise sensing locations; determine a sound control pattern to control sound within a sound control zone based on the plurality of noise inputs, wherein the sound control pattern is based on a Neural Network (NN) output of an NN trained to generate the NN output based on an NN input, wherein the NN input is based on the AAC configuration information; and output the sound control pattern to one or more acoustic transducers.

Example 46 includes the subject matter of Example 45, and optionally, wherein the processor is configured to cause the AAC system to perform one or more operations according to any of Examples 1-41.

Example 47 includes a system comprising the apparatus of any of Examples 1-41.

Example 48 comprises an apparatus comprising means for executing any of the described operations of Examples 1-41.

Example 49 comprises an apparatus comprising: a memory interface; and processing circuitry configured to: perform any of the described operations of Examples 1-41.

Example 50 comprises a method comprising any of the described operations of Examples 1-41.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   an input to receive input information, the input information comprising:
      Active Acoustic Control (AAC) configuration information, the AAC configuration information comprising information representing one or more parameters affecting a real-time configuration of AAC in a sound control zone; and
      a plurality of noise inputs representing acoustic noise at a plurality of noise sensing locations;
   a controller comprising logic and circuitry, the controller configured to process the input information to determine a sound control pattern to control sound within the sound control zone based on the plurality of noise inputs, wherein the controller comprises a Neural-Network (NN) trained to generate an NN output based on an NN input, wherein the NN input is based on the AAC configuration information, wherein the controller is configured to generate the sound control pattern based on the NN output; and
   an output to output the sound control pattern to one or more acoustic transducers.

2. The apparatus of claim 1, wherein the NN comprises a Prediction Filter (PF) NN trained to generate the NN output comprising a PF setting based on the NN input, wherein the controller is configured to generate the sound control pattern by applying to noise information a PF, which is configured according to the PF setting, wherein the noise information is based on the plurality of noise inputs.

3. The apparatus of claim 2, wherein the controller comprises a parameter extractor configured to determine extracted AAC parameter information based on sensor information from one or more sensors, wherein the NN input comprises the extracted AAC parameter information.

4. The apparatus of claim 3, wherein the parameter extractor comprises a Principal Component Analysis (PCA) extractor configured to determine the extracted AAC parameter information based on PCA of the sensor information.

5. The apparatus of claim 3, wherein the sensor information comprises at least one of noise sensor information from one or more noise sensors, residual noise sensor information from one or more residual noise sensors, monitoring sensor information from one or more monitoring sensors, or virtual sensor information from one or more virtual sensors.

6. The apparatus of claim 3, wherein the extracted AAC parameter information comprises at least one of road type information, cabin state information, passenger position information, vehicle system state information, noise characteristic information, or noise state information, wherein the road type information comprises information corresponding to a type of road traveled by a vehicle comprising the sound control zone, wherein the cabin state information comprises information corresponding to a state of a cabin of the vehicle, wherein the passenger position information comprises information corresponding to a position of one or more passengers in the cabin of the vehicle, wherein the vehicle system state information comprises information corresponding to a state of a system of the vehicle, wherein the noise characteristic information comprises information representing one or more characteristics of noise to be mitigated, wherein the noise state information comprises information corresponding to a state of the noise to be mitigated.

7. The apparatus of claim 2, wherein the controller is configured to train the PF NN based a noise error at one or more error sensing locations.

8. The apparatus of claim 2, wherein the controller is to configure the PF NN based on a Transducer Transfer Function (TTF) setting of a TTF between the one or more acoustic transducers and one or more acoustic sensing locations.

9. The apparatus of claim 2, wherein the controller comprises a Transducer Transfer Function (TTF) NN trained to determine a TTF setting based on the AAC configuration information, wherein the TTF setting comprises a setting of a TTF between the one or more acoustic transducers and one or more acoustic sensing locations, wherein the controller is to configure the PF NN based on the TTF setting.

10. The apparatus of claim 2, wherein the input information comprises noise error information representing a noise error at one or more error sensing locations, wherein the controller is configured to determine the noise information based on the noise error information.

11. The apparatus of claim 1, wherein the controller comprises a parameter extractor configured to determine extracted AAC parameter information based on the AAC configuration information, wherein the NN input comprises the extracted AAC parameter information.

12. The apparatus of claim 1, wherein the NN input comprises noise error information representing a noise error at one or more error sensing locations.

13. The apparatus of claim 1, wherein the NN comprises an Acoustic Feedback (AFB) mitigator NN trained to generate the NN output comprising an AFB setting based on the NN input, wherein the controller is configured to determine an AFB mitigation signal by applying the AFB setting to an acoustic transducer signal according to the sound control pattern, wherein the controller is to determine the sound control pattern based on the AFB mitigation signal.

14. The apparatus of claim 1, wherein the NN is trained to generate the NN output based on the NN input comprising the AAC configuration information and noise information based on the plurality of noise inputs.

15. The apparatus of claim 1, wherein the AAC configuration information comprises information representing a spectral distribution of acoustic signals in at least one of the sound control zone or an environment of the sound control zone.

16. The apparatus of claim 1, wherein the AAC configuration information comprises at least one of speed information, engine information, vehicular-system information, climate information, user position information, road type information, braking system information, steering information, tire information, seat information, vehicle type information, or opening-state information, wherein the speed information comprises information corresponding to a speed of a vehicle comprising the sound control zone, the engine information comprises information corresponding to an engine of the vehicle, the vehicular-system information comprises information corresponding to a vehicular system of the vehicle, the climate information comprises information corresponding to at least one of a climate inside the sound control zone or a climate outside the sound control zone, the user position information comprises information corresponding to a position of at least one of a user, a head of the user or an ear of the user in the sound control zone, the road type information comprises information corresponding to a type of road traveled by the vehicle, the braking system information comprises information corresponding to a braking system of the vehicle, the steering information comprises information corresponding to a steering system of the vehicle, the tire information comprises information corresponding to one or more tires of the vehicle, the seat information comprises information corresponding to at least one of a position or an occupancy of one or more seats of the vehicle, the vehicle type information comprises information corresponding to a type of the vehicle, the opening-state information comprises information corresponding to a state of at least one opening of the vehicle.

17. The apparatus of claim 1, wherein the AAC configuration information comprises information representing one or more physical properties of the sound control zone.

18. The apparatus of claim 1, wherein the AAC configuration information comprises information representing one or more acoustic properties of the sound control zone.

19. An Active Acoustic Control (AAC) system comprising:
    one or more acoustic transducers;
    a plurality of noise sensing acoustic sensors to generate a plurality of noise inputs representing acoustic noise at a plurality of noise sensing locations; and
    a controller to process input information comprising AAC configuration information and the plurality of noise inputs, wherein the AAC configuration information comprises information representing one or more parameters affecting a real-time configuration of AAC in a sound control zone, wherein the controller is to determine a sound control pattern to control sound within the sound control zone based on the plurality of noise inputs, and to output the sound control pattern to the one or more acoustic transducers, wherein the controller comprises a Neural-Network (NN) trained to generate an NN output based on an NN input, wherein the NN input is based on the AAC configuration information, wherein the controller is configured to generate the sound control pattern based on the NN output.

20. The AAC system of claim 19, wherein the NN comprises a Prediction Filter (PF) NN trained to generate the NN output comprising a PF setting based on the NN input, wherein the controller is configured to generate the sound control pattern by applying to noise information a PF, which is configured according to the PF setting, wherein the noise information is based on the plurality of noise inputs.

21. A product comprising one or more tangible computer-readable non-transitory storage media comprising instructions operable to, when executed by at least one processor, enable the at least one processor to cause an Active Acoustic Control (AAC) system to control sound within a sound control zone, the instructions, when executed, to cause the AAC system to:

process input information comprising:
Active Acoustic Control (AAC) configuration information, the AAC configuration information comprising information representing one or more parameters affecting a real-time configuration of AAC in the sound control zone; and
a plurality of noise inputs representing acoustic noise at a plurality of noise sensing locations;
determine a sound control pattern to control sound within the sound control zone based on the plurality of noise inputs, wherein the sound control pattern is based on a Neural Network (NN) output of an NN trained to generate the NN output based on an NN input, wherein the NN input is based on the AAC configuration information; and
output the sound control pattern to one or more acoustic transducers.

22. The product of claim 21, wherein the AAC configuration information comprises information representing a spectral distribution of acoustic signals in at least one of the sound control zone or an environment of the sound control zone.

* * * * *